(12) United States Patent
Takami

(10) Patent No.: US 8,721,482 B2
(45) Date of Patent: May 13, 2014

(54) HYBRID DRIVE SYSTEM

(75) Inventor: Shigeki Takami, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 291 days.

(21) Appl. No.: 13/254,753

(22) PCT Filed: Jan. 25, 2010

(86) PCT No.: PCT/JP2010/051303
§ 371 (c)(1),
(2), (4) Date: Sep. 2, 2011

(87) PCT Pub. No.: WO2010/113537
PCT Pub. Date: Oct. 7, 2010

(65) Prior Publication Data
US 2011/0319224 A1    Dec. 29, 2011

(30) Foreign Application Priority Data

Mar. 31, 2009  (JP) .................................. 2009-085565
Sep. 14, 2009  (JP) .................................. 2009-211659

(51) Int. Cl.
*B60K 6/365*        (2007.10)
(52) U.S. Cl.
USPC .................................. 475/5; 475/282; 475/290
(58) Field of Classification Search
USPC .............................. 475/5, 275–291, 296, 330
See application file for complete search history.

(56) References Cited

U.S. PATENT DOCUMENTS

| | | | | |
|---|---|---|---|---|
| 7,128,675 B2 * | 10/2006 | Klemen et al. | ..................... | 475/5 |
| 7,367,911 B2 * | 5/2008 | Raghavan et al. | ......... | 180/65.25 |
| 2006/0276288 A1 * | 12/2006 | Iwanaka et al. | ................... | 475/5 |
| 2007/0265127 A1 * | 11/2007 | Raghavan et al. | ................ | 475/5 |
| 2008/0171625 A1 | 7/2008 | Goldschmidt et al. | | |
| 2008/0207374 A1 | 8/2008 | Iwanaka et al. | | |
| 2011/0245003 A1 * | 10/2011 | Takami | .............................. | 475/5 |
| 2011/0312463 A1 * | 12/2011 | Park | ................... | 475/5 |

FOREIGN PATENT DOCUMENTS

| | | |
|---|---|---|
| DE | 10 2004 053 044 A1 | 5/2006 |
| FR | 677386 | 3/1930 |
| JP | 2007314034 A * | 12/2007 |
| JP | A-2008-120139 | 5/2008 |
| JP | A-2008-207657 | 9/2008 |
| WO | WO 2008/105194 A1 | 9/2008 |

OTHER PUBLICATIONS

Partial translation of Notification of Reasons for Refusal issued in Japanese Patent Application No. JP2009-211659 mailed Apr. 12, 2012.
International Search Report dated Apr. 27, 2010 in International Application No. PCT/JP2010/051303.

* cited by examiner

*Primary Examiner* — Roger Pang
(74) *Attorney, Agent, or Firm* — Oliff PLC

(57) ABSTRACT

A hybrid drive system configured with a power split device that performs a differential operation with at least three rotating elements including an input rotating element, a reaction force rotating element, and an output rotating element that is connected to the output member so that driving force is transmitted. A reduction gear that performs a differential operation with at least four rotating elements including an input rotating element, a stationary element, a first output rotating element, and a second output rotating element. A control portion selects an operating mode of the hybrid drive system, from among a first split mode, and a second split mode.

36 Claims, 30 Drawing Sheets

| MODE \ ENGAGEMENT DEVICE | C1(E1) | C2(E2) |
|---|---|---|
| FIRST SPLIT | ○ | |
| PARALLEL | ○ | ○ |
| SECOND SPLIT | | ○ |

| MODE \ ENGAGEMENT DEVICE | B1(EE1) | B2(EE2) |
|---|---|---|
| FIRST SPLIT | ○ | |
| PARALLEL | ○ | ○ |
| SECOND SPLIT | | ○ |

| MODE \ ENGAGEMENT DEVICE | B1(EE1) | B2(EE2) | B3(EE3) |
|---|---|---|---|
| THIRD SPLIT | | | O |
| FIRST SPLIT | O | | |
| SECOND SPLIT | | O | |
| FIRST PARALLEL | | O | O |
| SECOND PARALLEL | O | O | |

| MODE \ ENGAGEMENT DEVICE | B1(EE1) | C1(EE2) | C2(EE3) |
|---|---|---|---|
| THIRD SPLIT | | | ○ |
| FIRST SPLIT | ○ | | |
| SECOND SPLIT | | ○ | |
| FIRST PARALLEL | | ○ | ○ |
| SECOND PARALLEL | ○ | ○ | |

| MODE \ ENGAGEMENT DEVICE | C1(EE1) | C2(EE2) | C3(EE3) |
|---|---|---|---|
| THIRD SPLIT | | | ○ |
| FIRST SPLIT | ○ | | |
| SECOND SPLIT | | ○ | |
| FIRST PARALLEL | | ○ | ○ |
| SECOND PARALLEL | ○ | ○ | |

| MODE \ ENGAGEMENT DEVICE | C1(EE1) | C2(EE2) | B1(EE3) |
|---|---|---|---|
| THIRD SPLIT | | | O |
| FIRST SPLIT | O | | |
| SECOND SPLIT | | O | |
| FIRST PARALLEL | | O | O |
| SECOND PARALLEL | O | O | |

HYBRID DRIVE SYSTEM

TECHNICAL FIELD

The present invention relates to a hybrid drive system used in a hybrid vehicle provided with two rotating electrical machines, in addition to an engine, as driving force sources.

BACKGROUND ART

In recent years, hybrid vehicles that improve fuel efficiency of an engine and reduce exhaust gas by using an engine in combination with a rotating electrical machine as a source for driving force have been put into practical use. Japanese Patent Application Publication No. 2008-120139 (JP-A-2008-120139), for example, describes one example of such a drive system used in a hybrid vehicle. The drive system described in JP-A-2008-120139 is a so-called split hybrid drive system that distributes driving force from the engine to an output member side and a first rotating electrical machine side using a power split device. As shown in FIGS. 1 and 2 of JP-A-2008-120139, in this hybrid drive system, an engine 1, a first rotating electrical machine 2, and an output member 5 are connected to rotating elements, respectively, of a power split device 4 that performs a differential operation using at least three rotating elements. Also, the output member 5 is connected to the output side of a speed change mechanism 6 that is capable of setting at least two speed ratios, i.e., hi and low, and a second rotating electrical machine 3 is connected to the input side of the speed change mechanism 6. Further, a clutch mechanism 8 is provided that selectively connects the engine 1 to the second rotating electrical machine 3. As a result, this hybrid drive system achieves various operating modes and have superb power transmission efficiency.

With the hybrid drive system described in JP-A-2008-120139, as the vehicle speed increases, the operating mode switches from a mode in which the clutch mechanism 8 is released and the power distributed from the engine 1 and the decelerated power from the second rotating electrical machine 3 are both directly transmitted to the output member 5, to a mechanical lock-up mode which is a parallel mode, and then to an output split mode in a so-called overdrive state in which the rotation speed of the output member is increased by the engine rotation, in that order. With this hybrid drive system structure, power circulation when the second electrical rotating machine 3 is used to generate power and the first rotating electrical machine 2 is used for powering in the output split mode can be suppressed by providing the clutch mechanism 8.

As is described in paragraph [0062] of JP-A-2008-120139, this hybrid drive system is structured such that when switching to the output split mode, the speed change mechanism 6 is first placed in a neutral state with the rotation speed of the first motor-generator 2 being zero or a low rotation speed close to zero. Then when the second motor-generator 3 and the engine are rotating in synchronization, the clutch mechanism 8 is engaged, thus completing the switch to the output split mode.

That is, in the system described in JP-A-2008-120139, when an attempt is made to switch the second electrical rotating machine between the output member side and the input rotating element side (i.e., the engine side) of the power split device, it is necessary to first place the speed change mechanism provided between the second electrical rotating machine and the output member in a neutral state, then synchronize the second electrical rotating machine with the input rotating element of the power split device, and then engage the clutch mechanism. However, this operation may result in shift shock being generated during the switch or a drop in driving force, and thus an unpleasant sensation may be imparted to an occupant.

SUMMARY OF THE INVENTION

The present invention provides a hybrid drive system that includes a power split device, and splits the power from an engine and transmits it to a first rotating electrical machine and an output member side, suppresses power circulation that may occur at high running speeds in an overdrive state, and inhibits shift shock and a drop in driving force when switching modes.

A first aspect of the present invention relates to a hybrid drive system that includes an input member that is connected to an engine so that driving force is transmitted; an output member that is connected to a wheel so that driving force is transmitted; a first rotating electrical machine; a second rotating electrical machine; a power split device that performs a differential operation with at least three rotating elements including an input rotating element that is connected to the input member so that driving force is transmitted, a reaction force rotating element that is connected to the first rotating electrical machine so that driving force is transmitted, and an output rotating element that is connected to the output member so that driving force is transmitted; a reduction gear that performs a differential operation with at least four rotating elements including an input rotating element that is connected to the second rotating electrical machine so that driving force is transmitted, a stationary element that is held against rotation or selectively held against rotation, a first output rotating element, and a second output rotating element; and a control portion that selects an operating mode of the hybrid drive system, from among a first split mode wherein first rotation of the input rotating element of the reduction gear is decelerated by the reduction gear and is transmitted to the output member via the first output rotating element, and a second split mode wherein second rotation of the input rotating element of the reduction gear is transmitted to the input rotating element of the power split device via the second output rotating element and is slower than the first rotation.

Incidentally, the term "drivingly connected" in this application refers to a state in which the two rotating elements are connected in a manner that enables driving force to be transmitted, and is used as a concept that includes a state in which the two rotating elements are connected so as to rotate together, or a state in which the two rotating elements are connected in a manner that enables driving force to be transmitted via one or two or more transmitting members. Examples of such a transmitting member includes various types of members that transmit rotation at the same rotation speed or that transmit rotation after changing the rotation speed, such as a shaft, a gear mechanism, a belt, or a chain or the like. However, when the rotating elements of the differential gear units (devices) are referred to as being drivingly connected, it refers to a state in which three rotating elements of the differential gear units are drivingly connected together not via other rotating elements. Also, in this application, the term rotating electrical machine is used as a concept that also includes any of a motor (i.e., an electric motor), a generator, and a motor-generator that can function as both a motor and a generator as needed.

In this hybrid drive system as well, providing the power split device enables the driving force transmitted from the engine to the power split device via the input member to be distributed to the first rotating electrical machine and the output member side. Furthermore, the hybrid drive system of this application is provided with a reduction gear that performs a differential operation with at least four rotating elements. The second rotating electrical machine is drivingly connected to the input rotating element of this reduction gear. The reduction gear has a stationary element that is held against rotation or selectively held against rotation. The rotation of the second rotating electrical machine is decelerated and transmitted to the first output rotating element and the second output rotating element of the reduction gear. That is, in the first split mode, the first rotation is transmitted to the output member via the first output rotating element, and in the second split mode, the second rotation that is slower than the first rotation is transmitted to the input rotating element of the power split device via the second output rotating element.

In other words, this hybrid drive system switches the operating mode between a first split mode that transmits first rotation that is decelerated rotation of the input rotating element of the reduction gear to the second output rotating element via the first output rotating element, and a second split mode that transmits second rotation that is rotation of the input rotating element of the reduction gear that has been decelerated more than the first rotation to the input rotating element of the power split device via the second output rotating element. Here, the first split mode is a mode that transmits the decelerated rotation of the second rotating electrical machine directly to the output member, while the second split mode is a mode that transmits the decelerated rotation of the second rotating electrical machine to the input rotating element of the power split device. Providing the second split mode in this way enables power circulation to be suppressed. That is, in the second split mode, even when the first rotating electrical machine is in performing powering and the second rotating electrical machine is generating power, the driving force of the engine is transmitted directly to the second rotating electrical machine, so it is possible to suppress power circulation from the driving force generated by powering the first rotating electrical machine being used to generate power with the second rotating electrical machine. Also at this time, the decelerated rotation from the second rotating electrical machine is transmitted to the input rotating element of the power split device without going through the output member. Therefore, the driving force of the engine is canceled out by the driving force of the second rotating electrical machine, so the amount of reaction force that needs to be generated by powering the first rotating electrical machine can be reduced. As a result, the energy efficiency of the hybrid drive system when the first rotating electrical machine is performing powering and the second rotating electrical machine is generating power can be increased.

Furthermore, with the power split device, as the vehicle speed increases, the rotation of the first rotating electrical machine changes from positive rotation to negative rotation, the rotation of the reaction force rotating element also changes from positive rotation to negative rotation, and the rotation of the output rotating element of the power split device also changes. Therefore, the second output rotating element of the reduction gear is made to correspond to the input rotating element of the power split device so that they are synchronized, and the first output rotating element of the reduction gear is made to correspond to the output rotating element of the power split device so that they are synchronized. As a result, the mode can be switched without placing the speed change mechanism in neutral, which makes it possible to avoid shift shock or a drop in the driving force when switching modes. With this structure, two rotating elements of the power split device need only correspond to the first output rotating element and the second rotating element of the reduction gear, so the gear ratio at the point the mode is switched can be set appropriately. Also, the reduction gear functions both to decelerate the rotation of the second rotating electrical machine and perform a synchronized switch.

Here, the order of the rotation speeds of the input rotating element, the stationary element, the first output rotating element, and the second output rotating element of the reduction gear may be i) the stationary element, ii) the second output rotating element, iii) the first output rotating element, and iv) the input rotating element.

According to this structure, the rotation of the second rotating electrical machine that is drivingly connected to the input rotating element of the reduction gear can be decelerated and then transmitted to the first output rotating element and the second output rotating element. Also at this time, the second rotation that is slower than the first rotation that is transmitted from the input rotating element of the reduction gear to the first output rotating element, i.e., the second rotation that is decelerated more than the first rotation, can be transmitted to the second output rotating element. Therefore, according to this structure, the first split mode and the second split mode can be realized appropriately.

Also, the hybrid drive system may also include a first split mode engagement device that is engaged to realize the first split mode, and a second split mode engagement device that is engaged to realize the second split mode.

According to this structure, the first split mode or the second split mode can be selectively realized by engaging either the first split mode engagement device or the second split mode engagement device and releasing the other. Accordingly, it is possible to easily switch between two modes by switching the engagement state of the two engagement devices.

Also, the switch from the first split mode into the second split mode may be performed by engaging the second split mode engagement device when the rotation speeds of engagement members on both sides of the second split mode engagement device are the same. The switch from the second split mode into the first split mode may be performed by engaging the first split mode engagement device when the rotation speeds of engagement members on both sides of the first split mode engagement device are the same.

According to this structure, a switch between the first split mode and the second split mode can be performed with substantially no shock from engagement of either the first split mode engagement device or the second split mode engagement device.

Also, at least the second split mode engagement device may be a mesh type engagement device wherein engaging members on both sides of the second split mode engagement device are meshed with each other.

According to this structure, hydraulic pressure for generating engagement pressure or release pressure is not necessary as it is when a friction engagement device is used as the second split mode engagement device, so loss of driving force from the hydraulic pump can be suppressed, thus making it easy to increase the transfer efficiency of the drive system. Also, when forming the hybrid drive system according to the present invention by adding a structure that makes it possible to realize a second split mode to a known hybrid drive system having a structure in which the rotation of the second rotating electrical machine is transmitted to the output member via a reduction gear, it is not necessary to newly design a hydraulic passage for supplying hydraulic pressure to the second split mode engagement device, so changes in the case and the like can be kept to a minimum. Incidentally, in order to completely obviate the need to supply hydraulic pressure, the second split mode engagement device may perform the switching operation to engage or release using an electromagnetic actuator. Also, with the structure of the hybrid drive system according to this application, when switching to the second split mode, it is easy to make the switch a synchronized switch that engages the second split mode engagement device when the rotation speeds of the engagement members on both sides of the second split mode engagement device are the same. Moreover, it is easy to bring the transfer torque of the second split mode engagement device at that time close to zero. Therefore, even if the second split mode engagement device is a mesh type engagement device, shock during engagement can be suppressed and a quick switch can easily be realized.

Also, the control portion may select a parallel mode that transmits the rotation of the first output rotating element of the reduction gear to the output member, and transmits the rotation of the second output rotating element to the input rotating element of the power split device.

According to this structure, providing the parallel mode enables the driving force of the engine to be used well. That is, in this parallel mode, the vehicle can be run by only the driving force of the engine without driving both the first rotating electrical machine or the second rotating electrical machine. Therefore, it is possible to suppress the loss that occurs from converting the work of the engine into electric power by the rotating electrical machine, depending on the running state of the vehicle. As a result, the efficiency of the hybrid drive system can be increased.

Also, the control portion may select a third split mode wherein third rotation of the input rotating element of the reduction gear is transmitted to the output member via the first output rotating element of the reduction gear and is slower than the first rotation.

According to this structure, just as with the first split mode, it is possible to realize a third split mode that is a split mode that transmits rotation in which the rotation speed of the input rotating element of the reduction gear has been decelerated to the output member, i.e., that transmits a third rotation that has been decelerated more than the first rotation of the first split mode, to the output member, via the first output rotating element. Therefore, in the third split mode that transmits the rotation of the second rotating electrical machine to the output member, the torque of the second rotating electrical machine can be multiplied more than it is in the first split mode and then transmitted to the output member. Accordingly, the vehicle can be driven with greater driving force, or the second rotating electrical machine can be made smaller while the same driving force is maintained.

In this application, six modes (a first mode to a sixth mode) that realize a first aspect of the present invention described above will be described. The first mode is a mode in which a stationary element of the reduction gear is always held. The second mode is a mode in which the stationary element of the reduction gear is selectively held.

The third to sixth modes are modes that make it possible to further realize a third split mode that transmits a third rotation that is slower than the first rotation to the output member, in addition to the first split mode and the second split mode described above.

1. First Mode

In the first mode of the present invention, the reduction gear is a differential gear unit that includes four rotating elements which are, in order of rotation speed, a first rotating element, a second rotating element, a third rotating element, and a fourth rotating element. The first rotating element is held to a non-rotating member, the second rotating element is a second output rotating element, the third rotating element is a first output rotating element, and the fourth rotating element is drivingly connected to the second rotating electrical machine. The hybrid drive system also includes a first engagement device that selectively drivingly connects or disconnects the first output rotating element to or from the output member, and a second engagement device that selectively drivingly connects or disconnects the second output rotating element to or from the input rotating element of the power split device.

In this application, the phrase "in order of rotation speed" means either in order from the high speed side to the low speed side or in order from the low speed side to the high speed side, both of which are possible depending on the rotation states of the differential gear units. In either case, the order of the rotating element does not change. Also, the term "disconnected" in this application refers to a state in which the driving connection is disconnected, i.e., a state in which driving force is not transmitted between two rotating elements.

In this first mode of the present invention, the first split mode can be realized by a state in which the first output rotating element of the reduction gear is drivingly connected to the output member by the first engagement element, and the second output rotating element of the reduction gear is disconnected from the input rotating element of the power split device by the second engagement device. On the other hand, the second split mode can be realized by a state in which the first output rotating element of the reduction gear is disconnected from the output member by the first engagement element, and the second output rotating element of the reduction gear is drivingly connected to the input rotating element of the power split device by the second engagement device. Therefore, in this first mode of the present invention, it is easy to switch between both of these modes by setting the states of both engagement devices appropriately. Also, when realizing the parallel mode, the rotation of one rotating element is transmitted to the output member and the rotation of the other rotating element is transmitted to the input rotating element of the power split device while both the first engagement device and the second engagement device are engaged. Moreover, the vehicle can also be run using only driving force obtained from the engine while both of the engagement devices are released.

Employing this structure enables a compact hybrid drive system with little energy loss to be realized by using a differential gear unit having the minimum number of rotating elements. Also, this structure also enables both the first engagement device and the second engagement device to be mesh type engagement devices instead of friction engagement devices. That is, in the first mode of the present invention, in order to switch modes using a mesh type engagement device for both the first engagement device and the second engagement device, the driving force of the second rotating electrical machine must be substantially "0". With this first mode of the present invention, the driving force of the second rotating electrical machine can be made substantially "0" at a synchronized point at which the mode is to be switched, so the switch can be performed by a mesh type engagement device without changing the engine operating point (i.e., without reducing engine efficiency).

With the structure of this first mode of the present invention, the reduction gear may be formed by a Ravigneaux type planetary gear set that includes four rotating elements which are, in order of rotation speed, a first sun gear, a common carrier, a common ring gear, and a second sun gear. The first sun gear may be held to a non-rotating member, the second sun gear may be drivingly connected to the second rotating electrical machine, the common carrier may be the second output rotating element, and the common ring gear may be the first output rotating element.

Employing a Ravigneaux type planetary gear set in this way makes it possible to realize a hybrid drive system that is compact and highly reliable. Incidentally, the Ravigneaux type planetary gear set in this application is formed of one single pinion type planetary gear set and one double pinion type planetary gear set that share a carrier and a ring gear.

2. Second Mode

In the second mode of the present invention, the reduction gear is formed by a first differential gear unit and a second differential gear unit, each of which has three rotating elements which are, in order of rotation speed, a first rotating element, a second rotating element, and a third rotating element. The third rotating element of the first differential gear unit is drivingly connected to the second rotating electrical machine, and the second rotating element of the first differential gear unit is drivingly connected to the output member. The third rotating element of the second differential gear unit is drivingly connected to the second rotating electrical machine, and the second rotating element of the second differential gear unit is drivingly connected to the input member. The hybrid drive system also includes a first engagement element that holds or releases the first rotating element of the first differential gear unit to or from a non-rotating member; and a second engagement device that holds or releases the first rotating element of the second differential gear unit to or from a non-rotating member.

In this second mode of the present invention, the first split mode can be realized by a state in which the first rotating element of the first differential gear unit is held by the first engagement device, and the first rotating element of the second differential gear unit is released by the second engagement device. On the other hand, the second split mode can be realized by a state in which the first rotating element of the first differential gear unit is released by the first engagement device and the first rotating element of the second differential gear unit is held by the second engagement device. Therefore, in this second mode of the present invention, it is easy to switch between both of these modes by setting the states of both engagement devices appropriately. Also, when realizing the parallel mode, the rotation of one rotating element is transmitted to the output member and the rotation of the other rotating element is transmitted to the input rotating element of the power split device while both the first engagement device and the second engagement device are engaged. Moreover, the vehicle can also be run using only driving force obtained from the engine while both of the engagement devices are released.

Further, this structure also enables both the first engagement device and the second engagement device to be mesh type engagement devices instead of friction engagement devices. That is, in the second mode of the present invention, in order to switch modes using a mesh type engagement device for both the first engagement device and the second engagement device, the driving force of the second rotating electrical machine must be substantially "0". With this second mode of the present invention, the driving force of the second rotating electrical machine can be made substantially "0" at a synchronized point at which the mode is to be switched, so the switch can be performed by a mesh type engagement device without changing the engine operating point (i.e., without reducing engine efficiency).

In the structure of this second mode, the first differential gear unit may be a double pinion type planetary gear set. The first rotating element of the first differential gear unit may be a carrier, the second rotating element of the first differential gear unit may be a ring gear, and the third rotating element of the first differential gear unit may be a sun gear. The second differential gear unit may be a single pinion type planetary gear set, and the first rotating element of the second differential gear unit may be a ring gear, the second rotating element of the second differential gear unit may be a carrier, and the third rotating element of the second differential gear unit may be a sun gear.

Employing this structure enables a compact hybrid drive system with little energy loss to be realized by using a differential gear unit having the minimum number of rotating elements.

3. Third Mode

In the third mode of the present invention, the reduction gear is formed by a first differential gear unit that includes four rotating elements which are, in order of rotation speed, a first rotating element, a second rotating element, a third rotating element, and a fourth rotating element, and a second differential gear unit that includes three rotating elements which are, in order of rotation speed, a first rotating element, a second rotating element, and a third rotating element. The third rotating element of the first differential gear unit is drivingly connected to the output member, and the fourth rotating element of the first differential gear unit is drivingly connected to the second rotating electrical machine. The second rotating element of the second differential gear unit is drivingly connected to the input member, and the third rotating element of the second differential gear unit is drivingly connected to the second rotating electrical machine. The hybrid drive system also includes a first engagement device that holds or releases the first rotating element of the first differential gear unit to or from a non-rotating member, a second engagement device that holds or releases the first rotating element of the second differential gear unit to or from a non-rotating member, and a third engagement device that holds or releases the second rotating element of the first differential gear unit to or from a non-rotating member.

In this third mode of the present invention, the first split mode can be realized by engaging the first engagement device to hold the first rotating element of the first differential gear unit, and releasing the second engagement device and the third engagement device. On the other hand, the second split mode can be realized by engaging the second engagement device to hold the first rotating element of the second differential gear unit, and releasing the first engagement device and the third engagement device. Also, when realizing the third split mode, the third engagement device is engaged to hold the second rotating element of the first differential gear unit, and the first engagement device and the second engagement device are released. Therefore, with this third mode of the present invention it is easy to switchably realize the three split modes by appropriately setting the states of the three engagement devices. Also, when realizing the parallel mode, the second engagement device is engaged and either the first engagement device or the third engagement device is engaged while the other is released. Moreover, the vehicle can also be run using only driving force obtained from the engine by releasing all three of the engagement devices.

In the structure of this third mode of the present invention, the first differential gear unit may be a Ravigneaux type planetary gear set that has four rotating elements which are, in order of rotation speed, a first sun gear, a common carrier, a common ring gear, and a second sun gear. The first rotating element of the first differential gear unit may be the second sun gear, the second rotating element of the first differential gear unit may be the common ring gear, the third rotating element of the first differential gear unit may be the common carrier, and the fourth rotating element of the first differential gear unit may be the first sun gear. The second differential gear unit may be a single pinion type planetary gear set. The first rotating element of the second differential gear unit may be a ring gear, the second rotating element of the second differential gear unit may be a carrier, and the third rotating element of the second differential gear unit may be a sun gear. Employing this structure enables the hybrid drive system according to this application to be suitably realized.

4. Fourth Mode

In the fourth mode of the present invention, the reduction gear is formed by a first differential gear unit and a second differential gear unit, each of which has three rotating elements which are, in order of rotation speed, a first rotating element, a second rotating element, and a third rotating element. The second rotating element of the first differential gear unit is drivingly connected to the second rotating element of the second differential gear unit, and the third rotating element of the first differential gear unit is drivingly connected to the output member. The first rotating element of the second differential gear unit is held to a non-rotating member, and the third rotating element of the second differential gear unit is drivingly connected to the second rotating electrical machine. The hybrid drive system also includes a first engagement device that holds or releases the first rotating element of the first differential gear unit to or from a non-rotating member, a second engagement device that selectively drivingly connects or disconnects the second rotating element of the first differential gear unit to or from the second rotating element of the second differential gear unit, and a third engagement device that selectively drivingly connects or disconnects the first rotating element of the first differential gear unit to or from the output member.

In this fourth mode of the present invention, the first split mode can be realized by engaging the first engagement device to hold the first rotating element of the first differential gear unit, and releasing the second engagement device and the third engagement device. On the other hand, the second split mode can be realized by engaging the second engagement device to drivingly connect the second rotating element of the first differential gear unit and the second rotating element of the second differential gear unit to the input member, and releasing the first engagement device and the third engagement device. Also, when realizing the third split mode, the third engagement device is engaged to drivingly connect the first rotating element of the first differential gear unit to the output member, and the first engagement device and the second engagement device are released. Therefore, with this fourth mode of the present invention it is easy to switchably realize the three split modes by appropriately setting the states of the three engagement devices. Also, when realizing the parallel mode, the second engagement device is engaged and either the first engagement device or the third engagement device is engaged while the other is released. Moreover, the vehicle can also be run using only driving force obtained from the engine by releasing all three of the engagement devices.

In the structure of this fourth mode of the present invention, the first differential gear unit may be a double pinion planetary gear set, and the first rotating element of the first differential gear unit may be a carrier or a sun gear, the second rotating element of the first differential gear unit may be a ring gear, and the third rotating element of the first differential gear unit may be a sun gear or a carrier. The second differential gear unit may be a single pinion type planetary gear set, and the first rotating element of the second differential gear unit may be a ring gear, the second rotating element of the second differential gear unit may be a carrier, and the third rotating element of the second differential gear unit may be a sun gear. Employing this structure enables the hybrid drive system according to this application to be suitably realized.

5. Fifth Mode

In the fifth mode of the present invention, the reduction gear is formed by a first differential gear unit and a second differential gear unit, each of which has three rotating elements which are, in order of rotation speed, a first rotating element, a second rotating element, and a third rotating element. The first rotating element of the first differential gear unit is drivingly connected to the second rotating element of the second differential gear unit, and the second rotating element of the first differential gear unit is drivingly connected to the output member. The first rotating element of the second differential gear unit is held to a non-rotating member, and the third rotating element of the second differential gear unit is drivingly connected to the second rotating electrical machine. The hybrid drive system also includes a first engagement device that selectively drivingly connects or disconnects the third rotating element of the first differential gear unit to or from the third rotating element of the second differential gear unit, a second engagement device that selectively connects or disconnects the first rotating element of the first differential gear unit and the second rotating element of the second differential gear unit to or from the input member, and a third engagement device that selectively drivingly connects or disconnects the first rotating element of the first differential gear unit to or from the third rotating element of the first differential gear unit.

In this fifth mode of the present invention, the first split mode can be realized by engaging the first engagement device to drivingly connect the third rotating element of the first differential gear unit to the third rotating element of the second differential gear unit, and releasing the second engagement device and the third engagement device. On the other hand, the second split mode can be realized by engaging the second engagement device to drivingly connect the first rotating element of the first differential gear unit and the second rotating element of the second differential gear unit to the output member, and releasing the first engagement device and the third engagement device. Also, when realizing the third split mode, the third engagement device is engaged to drivingly connect the first rotating element of the first differential gear unit to the third rotating element of the first differential gear unit, and the first engagement device and the second engagement device are released. Therefore, with this fifth mode of the present invention it is easy to switchably realize the three split modes by appropriately setting the states of the three engagement devices. Also, when realizing the parallel mode, the second engagement device is engaged and either the first engagement device or the third engagement device is engaged while the other is released. Moreover, the vehicle can also be run using only driving force obtained from the engine by releasing all three of the engagement devices.

6. Sixth Mode

In the sixth mode of the present invention, the reduction gear is formed by a first differential gear unit and a second differential gear unit, each of which has three rotating elements which are, in order of rotation speed, a first rotating element, a second rotating element, and a third rotating element. The first rotating element of the first differential gear unit is drivingly connected to the second rotating element of the second differential gear unit, and the second rotating element of the first differential gear unit is drivingly connected to the output member. The first rotating element of the second differential gear unit is held to a non-rotating member, and the third rotating element of the second differential gear unit is drivingly connected to the second rotating electrical machine. The hybrid drive system also includes a first engagement device that selectively drivingly connects or disconnects the third rotating element of the first differential gear unit to or from the third rotating element of the second differential gear unit, a second engagement device that selectively connects or disconnects the first rotating element of the first differential gear unit and the second rotating element of the second differential gear unit to or from the input member, and a third engagement device that holds or releases the third rotating element of the first differential gear unit to or from a non-rotating member.

In this sixth mode of the present invention, the first split mode can be realized by engaging the first engagement device to drivingly connect the third rotating element of the first differential gear unit to the third rotating element of the second differential gear unit, and releasing the second engagement device and the third engagement device. On the other hand, the second split mode can be realized by engaging the second engagement device to drivingly connect the first rotating element of the first differential gear unit and the second rotating element of the second differential gear unit to the input member, and releasing the first engagement device and the third engagement device. Also, when realizing the third split mode, the third engagement device is engaged to hold the third rotating element of the first differential gear unit, and the first engagement device and the second engagement device are released. Therefore, with this sixth mode it is easy to switchably realize the three split modes by appropriately setting the states of the three engagement devices. Also, when realizing the parallel mode, the second engagement device is engaged and either the first engagement device or the third engagement device is engaged while the other is released. Moreover, the vehicle can also be run using only driving force obtained from the engine by releasing all three of the engagement devices.

In the fifth and sixth modes of the present invention described above, the first differential gear unit may be a single pinion type planetary gear set, and the first rotating element of the first differential gear unit may be a ring gear, the second rotating element of the first differential gear unit may be a carrier, and the third rotating element of the first differential gear unit may be a sun gear. Also, the second differential gear unit may be a single pinion type planetary gear unit, and the first rotating element of the second differential gear unit may be a ring gear, the second rotating element of the second differential gear unit may be a carrier, and the third rotating element of the second differential gear unit may be a sun gear. Employing this structure enables the hybrid drive system according to this application to be suitably realized.

The structures of the third to sixth modes of the present invention described above also enable the second engagement device to be a mesh type engagement device instead of a friction engagement device. That is, in the third to sixth modes of the present invention, in order to switch modes using a mesh type engagement device for the second engagement device, the driving force of the second rotating electrical machine must be substantially "0" when the switch from the first split mode to the second split mode is performed. With the third to sixth modes of the present invention, the driving force of the second rotating electrical machine can be made substantially "0" at a synchronized point at which this kind of mode switch is to be performed, so the switch can be performed by a mesh type engagement device without changing the engine operating point (i.e., without reducing engine efficiency).

BRIEF DESCRIPTION OF THE DRAWINGS

The features, advantages, and technical and industrial significance of this invention will be described in the following detailed description of embodiments of the invention with reference to the accompanying drawings, in which like numerals denote like elements, and wherein.

DETAILED DESCRIPTION OF THE EMBODIMENTS

1. First Embodiment

Figure 1:
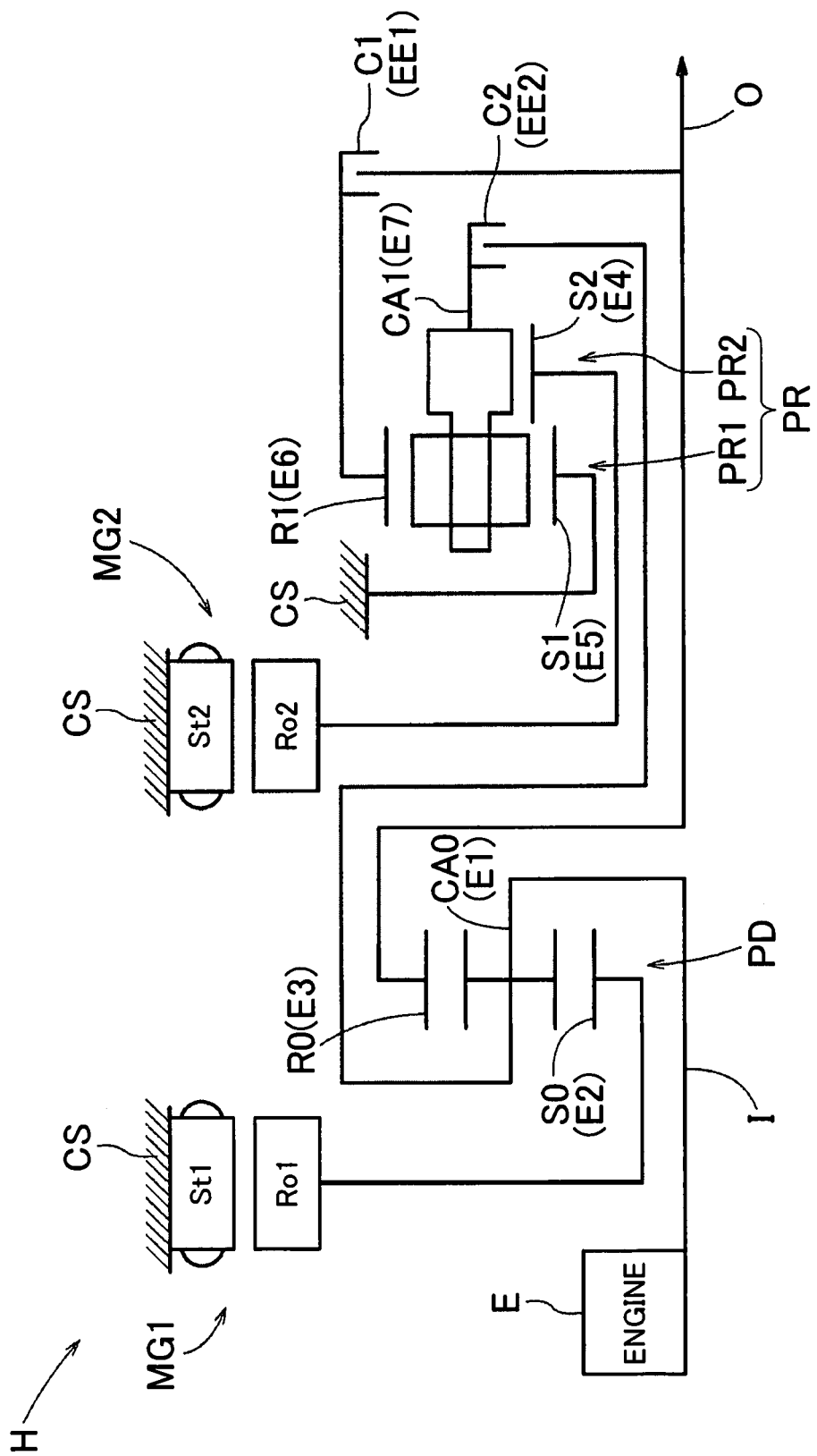
FIG. 1 is a skeleton view of the structure of a hybrid drive system according to a first embodiment of the present invention.
Figure 2:
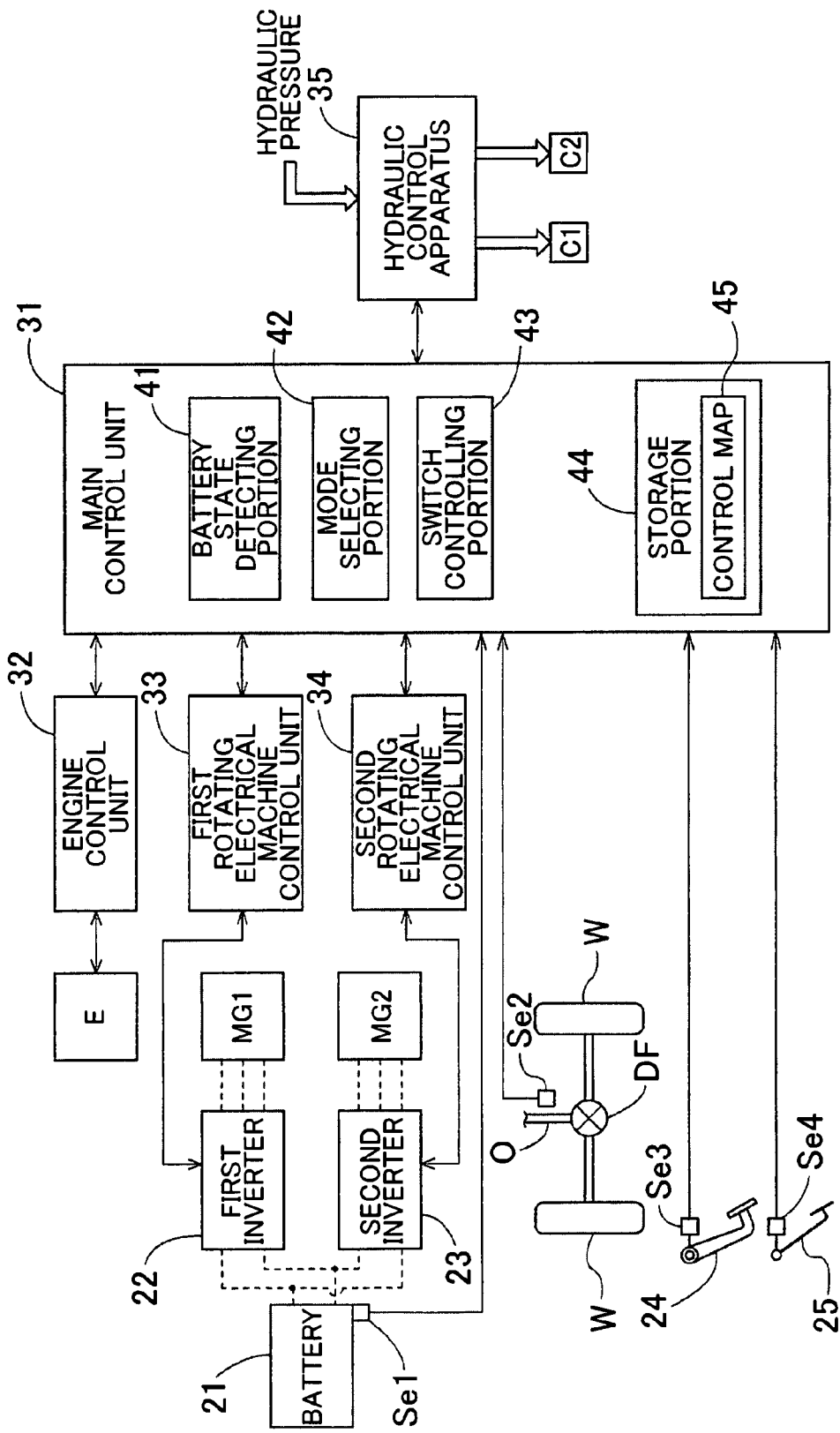
FIG. 2 is a view showing a frame format of the system structure of the hybrid drive system according to the first embodiment of the present invention.

A first embodiment of the present invention will be described with reference to the accompanying drawings. FIG. 1 is a skeleton view of the structure of a hybrid drive system H according to this embodiment. Incidentally, a portion of the axisymmetric structure is omitted in FIG. 1. FIG. 2 is a view showing a frame format of the system structure of the hybrid drive system H according to this embodiment. Incidentally, in FIG. 2, the solid arrows indicate the transmission path of various information, the broken lines indicate the power transmission path, and the white arrow outlines indicate the hydraulic pressure transmission path.

As shown in FIG. 1, the hybrid drive system H includes an input member I that is drivingly connected to an engine E, an output member O that is drivingly connected to wheels W (see FIG. 2), a first rotating electrical machine MG1, a second rotating electrical machine MG2, a power split device PD, and a reduction gear PR. The hybrid drive system H also includes a first clutch C1 that selectively drivingly connects or disconnects a common ring gear R1 (i.e., a first output rotating element E6) of the reduction gear PR to or from the output member O, and a second clutch C2 that selectively drivingly connects or disconnects a common carrier CA1 (i.e., a second output rotating element E7) of the reduction gear PR to or from the input member I. In this embodiment, the first clutch C1 that constitutes a first engagement device EE1 of the present invention, and the second clutch C2 that constitutes a second engagement device EE2 of the present invention. These elements of the hybrid drive system H are housed in a case CS that is a non-rotating member which is fixed to the vehicle.

The hybrid drive system H according to this embodiment switches between at least three hybrid operating modes, i.e., a first split mode, a parallel mode, and a second split mode, as will be described later. Hereinafter, the structure of the various portions of this hybrid drive system H will be described in detail.

1-1. Mechanical Structure of the Hybrid Drive System

The mechanical structure of the various portions of the hybrid drive system H will now be described. An input shaft that serves as the input member I is drivingly connected to the engine E, as shown in FIG. 1. Here, the engine E is an internal combustion engine that is driven by the combustion of fuel. Any of a variety of well-known engines such as a gasoline engine or a diesel engine may be used, for example. In this example, the input member I is drivingly connected to an output rotation shaft such as a crankshaft of the engine E so as to rotate together with the output rotation shaft. Incidentally, the input member may be drivingly connected to the output rotation shaft via members such as a damper, a clutch, and a torque converter. Incidentally, because the input member I rotates together with the output rotation shaft of the engine E, the rotation of the input member I is the same as the rotation of the engine E, so the driving force (i.e., including the torque, the same applies hereinafter) of the input member I is the same as the driving force of the engine E.

An output shaft that serves as the output member O is drivingly coupled to the wheels W (i.e., driving wheels) via an output differential gear unit DF, as shown in FIG. 2. The output member O is coaxially arranged with the input member 1. Further, in this hybrid drive system H, the engine E, the first rotating electrical machine MG1, the second rotating electrical machine MG2, the power split device PD, and the reduction gear PR are all coaxially arranged with the input member I, so the entire hybrid drive system H is a uniaxial structure.

The first rotating electrical machine MG1 has a stator St1 that is fixed to the case CS, and a rotor Ro1 that is rotatably supported on the radial inside of this stator St1, as shown in FIG. 1. This rotor Ro1 of the first rotating electrical machine MG1 is drivingly connected to a sun gear S0 that serves as a reaction force rotating element E2 of the power split device PD so as to rotate together with the sun gear S0. As a result, the first rotating electrical machine MG1 operates as a reaction force receiver for splitting (i.e., distributing) the driving force from the engine E that is transmitted via the input member I using the power split device PD. Also, the second rotating electrical machine MG2 has a stator St2 that is fixed to the case CS, and a rotor Ro2 that is rotatably supported on the radial inside of this stator St2. This rotor Ro2 of the second rotating electrical machine MG2 is drivingly connected to a second sun gear S2 that serves as an input rotating element E4 of the reduction gear PR so as to rotate together with the second sun gear S2. As a result, the second rotating electrical machine MG2 is drivingly connected to the output member O or a carrier CA0 that is an input rotating element E1 of the power split device PD, via the reduction gear PR.

The first rotating electrical machine MG1 is electrically connected to a battery 21 via a first inverter 22, and the second rotating electrical machine MG2 is electrically connected to the battery 21 via a second inverter 23, as shown in FIG. 2. The first rotating electrical machine MG1 and the second rotating electrical machine MG2 each function as both a motor (i.e., an electric motor) that generates power by receiving a supply of power, and a generator that generates power by receiving a supply of power. As will be described later, the first rotating electrical machine MG1 and the second rotating electrical machine MG2 each function as either a generator or a motor depending on the relationship between the direction of rotation and the direction of driving force. When functioning as a generator, the first rotating electrical machine MG1 or the second rotating electrical machine MG2 either supplies the generated power to the battery 21 in order to charge the battery 21 or supplies that power to the other electrical rotating machine MG1 or MG2 that functions as a motor in order to power that rotating electrical machine MG1 or MG2. Also, when functioning as a motor, the first rotating electrical machine MG1 or the second rotating electrical machine MG2 performs powering by receiving a supply of power charged in the battery 21 or power generated by the other rotating electrical machine MG1 or MG2 that functions as a generator. Also, the operation control of the first rotating electrical machine MG1 is performed by a first rotating electrical machine control unit 33 and the first inverter 22 according to a control command from a main control unit 31. Similarly, the operation control of the second rotating electrical machine MG2 is performed by a second rotating electrical machine control unit 34 and the second inverter 23 according to a control command from the main control unit 31.

Here, the battery 21, which is a power storage device for supplying power to the first rotating electrical machine MG1 and the second rotating electrical machine MG2, may be charged by an external power supply such as a household power supply. In this case, although not shown in the drawings, the battery 21 is electrically connected to a connector that is connected to the external power supply, or, if the external power supply is an alternating current (AC) power supply, to a structure such as an inverter that converts the current into direct current, and is charged by that external power supply. Incidentally, the battery 21 may also be charged using only power generated by the first rotating electrical machine MG1 or the second rotating electrical machine MG2 instead of being charged by an external power supply.

The power split device PD is a differential gear unit that has three rotating elements. The power split device PD here is a single pinion type planetary gear set that is arranged on the same axis as the input member I, as shown in FIG. 1. That is, the power split device PD has, as rotating elements, a carrier CA0 that supports a plurality of pinion gears, and a sun gear S0 and a ring gear R0 that are both in mesh with the pinion gears. The sun gear S0 is drivingly connected to a rotor of the first rotating electrical machine MG1 so as to rotate together with the rotor, and serves as the reaction force rotating element E2 of the power split device PD. The carrier CA0 is drivingly connected to the input member I so as to rotate together with the input member I, and serves as the input rotating element E1 of the power split device PD. The ring gear R0 is drivingly connected to the output member O so as to rotate together with the output member O, and serves as an output rotating element E3 of the power split device PD. In order of rotation speed, these rotating elements of the power split device PD are the sun gear S0, the carrier CA0, and the ring gear R0. Therefore, in this embodiment, the sun gear S0 is a first rotating element of the power split device PD, the carrier CA0 is a second rotating element of the power split device PD, and the ring gear R0 is a third rotating element of the power split device PD.

The reduction gear PR is a differential gear unit that has four rotating elements. The reduction gear PR here is formed from a Ravigneaux type planetary gear set that has four rotating elements which, in order of rotation speed, are a first sun gear S1, a common carrier CA1, a common ring gear R1, and a second sun gear S2. Here, the common carrier CA1 rotatably supports both a short pinion gear that is in mesh with both the first sun gear S1 and the common ring gear R1, and a stepped long pinion gear that has a large diameter portion that is in mesh with the second sun gear S2 and a small diameter portion that is in mesh with the short pinion gear. For convenience in the description below, with respect to this reduction gear PR, the single pinion type planetary gear set that is formed from the common ring gear R1, the common carrier CA1, and first sun gear S1 positioned on the input member I side (i.e., the power split device PD side) may be referred to as a first planetary gear set PR1, and the double pinion type planetary gear set that is formed from the common ring gear R1, the common carrier CA1, and the second sun gear S2 on the output side (i.e., the right side in FIG. 1) may be referred to as a second planetary gear set PR2. The reduction gear PR in this case is obtained as a Ravigneaux type planetary gear set in which the first planetary gear set PR1 and the second planetary gear set PR2 that are arranged coaxially with the input member I are combined and share the common carrier CA1 and the common ring gear R1.

The first planetary gear set PR1 has, as rotating elements, the common earlier CA1 that supports a plurality of pinion gears, and the first sun gear S1 and the common ring gear R1 that are both in mesh with those pinion gears. The first sun gear S1 is fixed to the case CS which is a non-rotating member. Therefore, this first sun gear S1 is a stationary element E5 of the reduction gear PR. The common carrier CA1 is selectively drivingly connected to the carrier CA0 (i.e., the input rotating element E1) of the power split device PD by the second clutch C2 which is the second engagement device EE2. Therefore, the common carrier CA1 is a second output rotating element E7 of the reduction gear PR. The common ring gear R1 is selectively drivingly connected to the output member O by the first clutch C1 which is the first engagement device EE1. Therefore, this common ring gear R1 is a first output rotating element E6 of the reduction gear PR.

The second planetary gear set PR2 has, as rotating elements, the common carrier CA1 that supports a plurality of pinion gears, and the second sun gear S2 and the common ring gear R1 that are both in mesh with those pinion gears. The second sun gear S2 is drivingly connected to the rotor Ro2 of the second rotating electrical machine MG2 so as to rotate together with the rotor Ro2. Therefore, this second sun gear S2 is an input rotating element E4 of the reduction gear PR. The common carrier CA1 and the common ring gear R1 are shared by the first planetary gear set PR1. The connective relationships of these are as described below.

As shown in the upper parts of the velocity diagrams in FIGS. 5A to 7B, the four rotating elements of the reduction gear PR are, in order of rotation speed, the first sun gear S1, the common carrier CA1, the common ring gear R1, and the second sun gear S2. Accordingly, in this embodiment, the first sun gear S1 is a first rotating element of the reduction gear PR, the common carrier CA1 is a second rotating element of the reduction gear PR, the common ring gear R1 is a third rotating element of the reduction gear PR, and the second sun gear S2 is a fourth rotating element of the reduction gear PR. In other words, order in terms of rotation speed of the four rotating elements of the reduction gear PR is i) the stationary element E5, ii) the second output rotating element E7, iii) the first output rotating element E6, and iv) the input rotating element E4.

Also, the hybrid drive system H includes an oil pump, not shown. This oil pump is drivingly connected to the input member 1, for example. As a result, when the engine E is being driven, the oil pump is driven by the driving force of the engine E. A gear pump or a vane pump or the like may be used for the oil pump, for example. The oil pump supplies hydraulic pressure to the hydraulic control apparatus 35 in order to engage or release the engagement devices C1 and C2, and also to lubricate various parts of the hybrid drive system H, as will be described later.

The first clutch C1 selectively drivingly connects or disconnects the output member O to or from the common ring gear R1 which is the first output rotating element E6 of the reduction gear PR. Therefore, the first clutch C1 constitutes a first engagement device EE1 of the present invention. When the first clutch C1 is engaged, the output member O and the common ring gear R1 of the reduction gear PR are drivingly connected, and when the first clutch C1 is released, the output member O and the common ring gear R1 of the reduction gear PR are drivingly disconnected. As will be described later, a first split mode is realized by engaging the first clutch C1, so the first clutch C1 which is the first engagement device EE1 functions as a first split mode engagement device.

The second clutch C2 selectively drivingly connects or disconnects the carrier CA0 which is the input rotating element E1 of the power split device PD to or from the common carrier CA1 which is the second output rotating element E7 of the reduction gear PR. Therefore, the second clutch C2 constitutes a second engagement device EE2 of the present invention. When the second clutch C2 is engaged, the common carrier CA1 and the carrier CA0 are drivingly connected, and when the second clutch C2 is released, the common carrier CA1 and the carrier CA0 are drivingly disconnected. As will be described later, a second split mode is realized by engaging the second clutch C2, so the second clutch C2 which is the second engagement device EE2 functions as a second split mode engagement device.

In this embodiment, the first clutch C1 and the second clutch C2 are both friction engagement devices. Multi-disc clutches that operate by hydraulic pressure may be used for the first clutch C1 and the second clutch C2. As shown in FIG. 2, hydraulic pressure is supplied to these engagement devices C1 and C2 from the hydraulic control apparatus 35 that operates in response to a control command from the main control unit 31. Engagement or release of these engagement devices C1 and C2 is controlled by that hydraulic pressure. Hydraulic pressure generated by an oil pump, not shown, is supplied to this hydraulic control apparatus 35.

Incidentally, a mesh type engagement device may be used for at least one of the first clutch C1 and the second clutch C2. Here, this mesh type engagement device is a device that engages by mesh portions of engaging members on both sides of the engagement device C1 or the engagement device C2. This mesh type engagement device does not require separate hydraulic pressure or engaging force such as electromagnetic force to maintain an engaged state. A synchronizing mechanism or a dog clutch mechanism or the like that are typically used in a manual transmission may be used as this kind of mesh type engagement device. As will be described later, in this embodiment, the first clutch C1 and the second clutch C2 engage when the second rotating electrical machine MG2 is not generating driving force. Therefore, even if both the first clutch C1 and the second clutch C2 are formed by mesh type engagement devices, they are able to switch to an engaged state nicely. Also, if both of the two engagement devices C1 and C2 are mesh type engagement devices, hydraulic pressure for generating engagement pressure or release pressure is not necessary so a loss of driving force due to the hydraulic pump can be suppressed and the transfer efficiency of the drive system can be easily increased compared with when these two engagement devices C1 and C2 are friction engagement devices. Incidentally, in order to obviate the need for a supply of hydraulic pressure, the operation to switch these mesh type engagement devices between an engaged state and a released state may be performed by an electromagnetic actuator.

As described above, the hybrid drive system H is provided with the reduction gear PR, so rotation of the second rotating electrical machine MG2 can be decelerated and driving force can be multiplied and transmitted to the output member O or the input rotating element of the power split device PD.

When the first clutch C1 is engaged and the second clutch C2 is released, driving force generated from the engine E is split and transmitted to the first rotating electrical machine MG1 and the output member O by the operation of the power split device PD. Also, the rotation and driving force of the second rotating electrical machine MG2 is transmitted to the output member O after being decelerated by the operation of the reduction gear PR. On the other hand, when the first clutch C1 is released and the second clutch C2 is engaged, driving force generated from the engine E is split and transmitted to the second rotating electrical machine MG2 and the output member O by the operation of the power split device PD and the reduction gear PR. At this time, the reduction gear PR operates as a speed-increasing gear when viewed from the power split device PD side, and operates as a speed-decreasing gear when viewed from the second rotating electrical machine MG2 side.

1-2. Structure of the Control System of the Hybrid Drive System

As shown in FIG. 2, the hybrid drive system H is provided with the main control unit 31 for controlling the various parts of the system. The main control unit 31 is connected with an engine control unit 32, a first rotating electrical machine control unit 33, the second rotating electrical machine control unit 34, and the hydraulic control apparatus 35, such that information can be transmitted among these units. The engine control unit 32 controls the engine E to output a desired rotation speed and driving force (i.e., torque) by controlling various parts of the engine E. The first rotating electrical machine control unit 33 controls the first rotating electrical machine MG1 to output a desired rotation speed and driving force (i.e., torque) by controlling the first inverter 22. The second rotating electrical machine control unit 34 controls the second rotating electrical machine MG2 to output a desired rotation speed and driving force (i.e., torque) by controlling the second inverter 23. The hydraulic control apparatus 35 controls the engagement or release of the engagement devices C1 and C2 by adjusting the hydraulic pressure supplied from the oil pump, not shown, and distributing and supplying that hydraulic pressure to the engagement devices C1 and C2. This engagement or release of the engagement devices C1 and C2 is performed based on control commands from the main control unit 31.

Also, the main control unit 31 obtains information from sensors and the like provided in the various parts of the vehicle provided with the hybrid drive system H in order to obtain information about those various parts of the vehicle. In the illustrated example, the main control unit 31 obtains information from a battery state detecting sensor Se1, a vehicle speed sensor Se2, an accelerator operation detecting sensor Se3, and a brake operation detecting sensor Se4. The battery state detecting sensor Se1 detects the amount of charge and the like of the battery 21, and is formed by a voltage sensor or a current sensor or the like, for example. The vehicle speed sensor Se2 detects the rotation speed of the output member O in order to detect the vehicle speed. The accelerator operation detecting sensor Se3 detects the operation amount of an accelerator pedal 24. The brake operation detecting sensor Se4 detects the operation amount of a brake pedal 25 that is operatively linked to a wheel brake, not shown.

The main control unit 31 selects an operating mode from among a plurality of operating modes of the hybrid drive system H, which will be described later, using the information obtained from the sensors Se1 to Se4. The main control unit 31 switches operating modes by controlling the engagement states of the first clutch C1 and the second clutch C2 using the hydraulic control apparatus 35. Also, the main control unit 31 cooperatively controls the operating states of the engine E, the first rotating electrical machine MG1, and the second rotating electrical machine MG2 using the engine control unit 32, the first rotating electrical machine control unit 33, and the second rotating electrical machine control unit 34, such that the vehicle runs appropriately for the selected operating mode.

Therefore, in this embodiment, the main control unit 31 includes, as functional portions for executing the various controls, a battery state detecting portion 41, a mode selecting portion 42, and a switching control portion 43. These functional portions of the main control unit 31 for processing the input data in various ways are formed by either hardware or software (i.e., programs) or both, with a computing and processing device such as a CPU as the core member. Also, the main control unit 31 also has a storage portion 44, inside of which is stored a control map 45 used for determining the operating mode according to the vehicle speed and the required driving force.

The battery state detecting portion 41 estimates and detects the battery state such as the amount of charge and the like of the battery 21 based on information such as the voltage value or current value output from the battery state detecting sensor Se1. Here, the amount of charge of the battery typically refers to the state-of-charge (SOC), and may be obtained as the ratio of the amount of charge remaining to the charging capacity of the battery 21, for example.

The mode selecting portion 42 selects an appropriate operating mode in accordance with a predetermined control map, according to the states of the parts of the vehicle. In this embodiment, the mode selecting portion 42 selects a mode from among a plurality of modes, specifically, a first split mode, a parallel mode, and a second split mode, as hybrid operating modes, according to the vehicle speed and the required driving force using the control map 45. The mode selecting portion 42 may also select a second rotating electrical machine disconnected mode (i.e., MG2 disconnected mode) that runs the vehicle using only driving force obtained from the engine. When selecting a hybrid operating mode, the first split mode, the parallel mode, and the second split mode are selected fundamentally in that order as the vehicle speed increases.

The switching control portion 43 engages or releases the first clutch C1 and the second clutch C2, by controlling the operation of the hydraulic control apparatus 35 according to the operating mode selected by the mode selecting portion 42. Accordingly, the switching control portion 43 performs control to switch the operating mode of the hybrid drive system H.

1-3. Operating Modes of the Hybrid Drive System

Figures 3, 4:
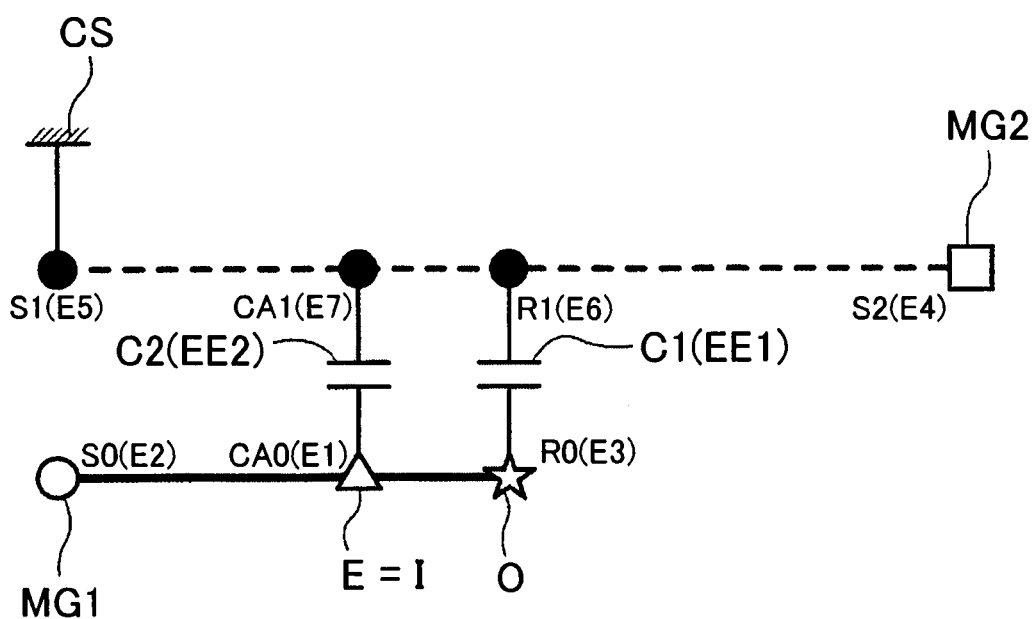
FIG. 3 is an operation table showing the operating states of a plurality of engagement devices in each mode according to the first embodiment of the present invention.
FIG. 4 is a view of the connective states of various rotating elements of the hybrid drive system according to the first embodiment of the present invention.

Next, the operating modes that are realized by the hybrid drive system H according to this embodiment will be described. FIG. 3 is an operation table showing the operating states of the first clutch C1 (i.e., the first engagement device EE1) and the second clutch C2 (i.e., the second engagement device EE2) in each operating mode. In the table, a circle indicates that the corresponding engagement device is engaged (i.e., connected), and the absence of a circle indicates that the corresponding device is released (i.e., disconnected).

FIG. 4 is a view showing the connective states of the various rotating elements of the differential gear units in the hybrid drive system H according to the embodiment shown back in FIG. 1, as levers. The upper lever in the drawing corresponds to the reduction gear PR, and the lower lever corresponds to the power split device PD.

FIGS. 5A and 5B, FIG. 6, and FIGS. 7A and 7B are velocity diagrams that show the operating states of the power split device PD and the reduction gear PR in each operating mode. In each of these velocity diagrams, the vertical axes correspond to the rotation speeds of the rotating elements. That is, the "0" corresponding to the vertical axes indicates a rotation speed of zero. Above the "0" is forward rotation (i.e., the rotation speed is positive) and below the "0" is negative rotation (i.e., the rotation speed is negative). The plurality of vertical axes arranged parallel with one another correspond to the rotating elements of the power split device PD and the reduction gear PR. That is, "S0", "CA0", and "R0" above the vertical axes correspond to the sun gear S0, the carrier CA0, and the ring gear R0 of the power split device PD, respectively, and "S1", "S2", "CA1", and "R1" above the vertical axes correspond to the first sun gear S1, the second sun gear S2, the common carrier CA1, and the common ring gear R1 of the reduction gear PR, respectively.

Meanwhile, "E=I", "MG1", "MG2", and "O" near the points of intersection of the levers and the vertical axes correspond to the engine E (i.e., the input member I), the first rotating electrical machine MG1, the second rotating electrical machine MG2, and the output member O, respectively, that are drivingly connected to the rotating elements. In these velocity diagrams, a triangle indicates the rotation speed of the input member I (i.e., the engine E), a circle indicates the rotation speed of the first rotating electrical machine MG1, a square indicates the rotation speed of the second rotating electrical machine MG2, and a star indicates the rotation speed of the output member O. The "x" in each drawing indicates that the corresponding rotating element is held to the case CS which is a non-rotating member. Also, the "=" that connects the reference characters of rotating elements above the vertical axes indicates that a plurality of rotating elements are drivingly connected so as to rotate together. The reference character "C1" or "C2" accompanying that "=" indicates that those rotating elements are drivingly connected by the first clutch C1 or the second clutch C2. Moreover, the arrow next to the point indicating the rotation speed of each rotating element indicates the direction of torque acting on that rotating element during normal running in each operating mode. An upward arrow indicates torque in the positive direction, and a downward arrow indicates torque in the negative direction. Hereinafter, the operating state of the hybrid drive system H in each of the plurality of operating modes will be described in detail.

1-4. First Split Mode

The first split mode is an operating mode selected when the running speed of the vehicle is low. In this operating mode, the rotation of the second rotating electrical machine MG2 is decelerated by the reduction gear PR and that driving force is transmitted to the output member O, while driving force from the engine E is split by the power split device PD and transmitted to the output member O. Also, the first rotating electrical machine MG1 provides reaction force for operating the power split device PD. That is, the driving force from the engine E (i.e., the input member I) is able be transmitted to the output member O via the power split device PD by having the first rotating electrical machine MG1 generate reaction force. Meanwhile, the second rotating electrical machine MG2 works to compensate for the shortage of driving force from the engine E.

Figure 5A:
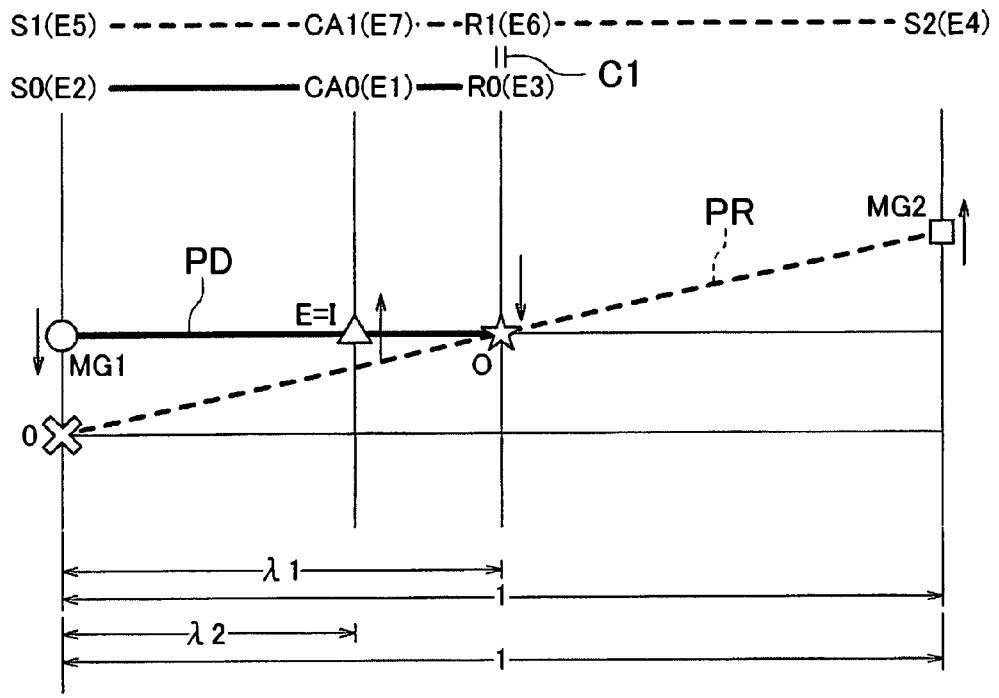
FIGS. 5A and 5B are velocity diagrams of a first split mode according to the first embodiment of the present invention.
Figure 5B:
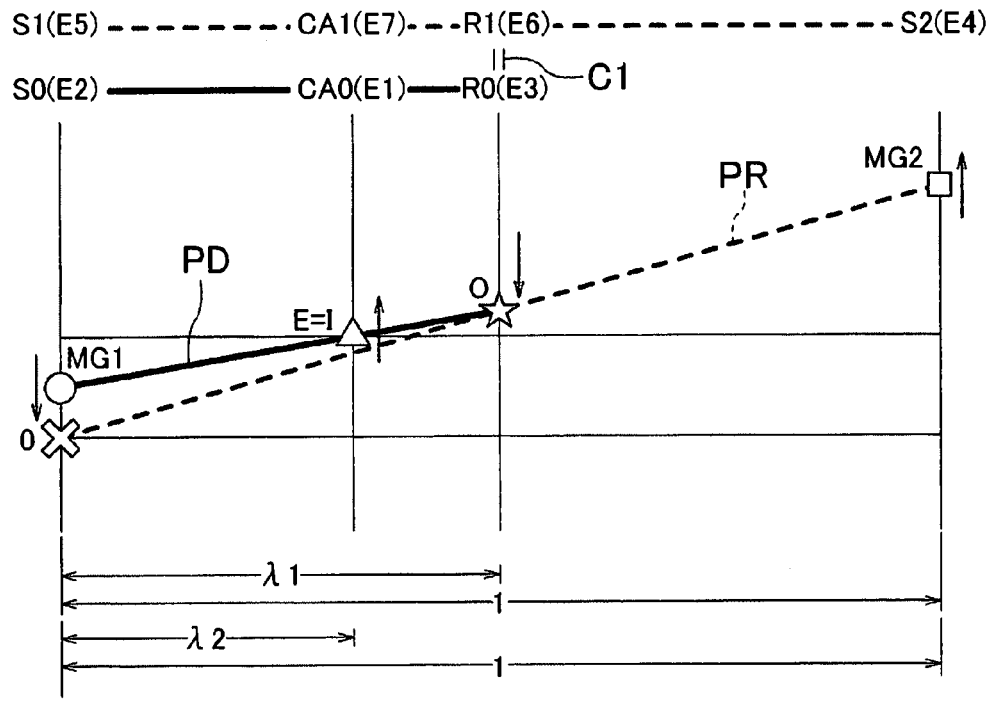

As shown in FIG. 3, the first split mode is realized by engaging the first clutch C1 and releasing the second clutch C2. FIGS. 5A and 5B are velocity diagrams of this first split mode, with FIG. 5B showing a state in which the running speed has been increased from that shown in FIG. 5A. The driving force transmitted from the engine E to the carrier CA0 of the power split device PD via the input member I is split by the power split device PD and transmitted to the output member O. At this time, the first rotating electrical machine MG1 operates as a reaction force receiver.

In the first split mode, the first clutch C1 is engaged so the common ring gear R1 and the output member O are drivingly connected and thus rotate together. Also, the second clutch C2 is released so the common carrier CA1 is able to rotate freely.

The first sun gear S1 is fixed to the case CS, so the rotation and driving force of the second sun gear S2 that rotates together with the rotor Rot of the second rotating electrical machine MG2 is decelerated by the reduction gear PR and transmitted to the common ring gear R1. In this state, the common ring gear R1 is drivingly connected to the output member O, so the decelerated rotation and driving force of the second rotating electrical machine MG2 are transmitted to the output member O via the common ring gear R1. More specifically, as shown by the lower parts of the velocity diagrams in FIGS. 5A and 5B, in the first split mode, the rotation speed of the second rotating electrical machine MG2 is decelerated "$\gamma 1$" times ($\gamma 1 < 1$) and transmitted to the output member O. The reduction gear ratio at this time is "$1/\gamma 1$". Accordingly, the torque of the second rotating electrical machine MG2 is multiplied "$1/\gamma 1$" times and transmitted to the output member O. In this first split mode, the rotation of the input rotating element E4 (i.e., the second sun gear S2) that is decelerated by the reduction gear PR and transmitted to the output member O via the first output rotating element E6 (i.e., the common ring gear R1) corresponds to first decelerated rotation of the present invention.

In this first split mode, the first rotating electrical machine MG1 is controlled, according to the vehicle speed and the required driving force and the like, to output an appropriate rotation speed and MG1 torque so that the engine E can be operated with good fuel efficiency. That is, the power split device PD distributes the driving force from the engine E to the output member O and the first rotating electrical machine MG1 while the engine operates in a good fuel efficient state. In this state, the first rotating electrical machine MG1 generates power by outputting MG1 torque T1 in the negative direction while rotating in the positive direction.

1-5. Parallel Mode

Figure 6:
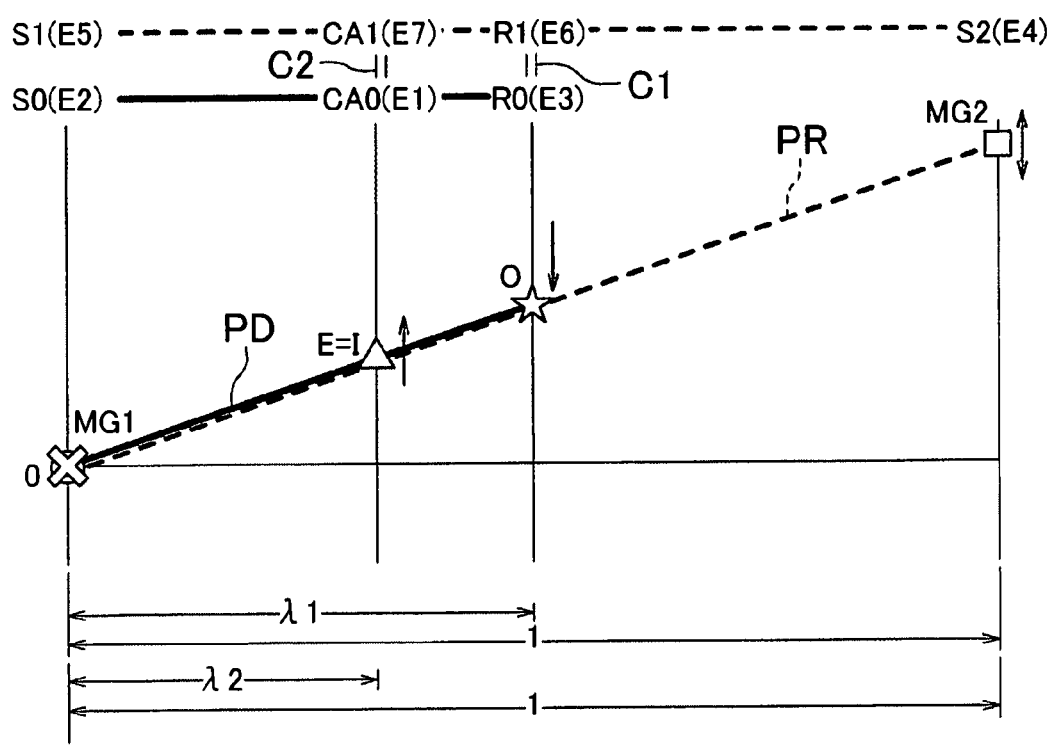
FIG. 6 is a velocity diagram of a parallel mode according to the first embodiment of the present invention.

The parallel mode is an operating mode that is selected when the running speed of the vehicle has increased from the first split mode. FIG. 6 is a velocity diagram of this parallel mode. As is evident from the drawing, in the parallel mode, the relationship of the rotation speeds of the rotating elements of the power split device PD and the reduction gear PR is constant, so if the rotation speed of any one rotating element is determined, the rotation speeds of the other rotating elements also become determined. Here, the speed line of the power split device PD and the speed lines of the reduction gear PR overlap on a straight line. Also, the rotation of the first rotating electrical machine MG1 is stopped, while the second rotating electrical machine MG2 is placed in a state in which it fundamentally does not generate driving force. This parallel mode is better suited for running in a high vehicle speed range when the required driving force is low than the first split mode is.

As shown in FIG. 3, the parallel mode is realized by engaging both the first clutch C1 and the second clutch C2. Engaging the first clutch C1 drivingly connects the common ring gear R1 to the output member O so that they rotate together. Also, engaging the second clutch C2 results in the common carrier CA1 rotating together with the carrier CA0, and thus rotating together with the input member I. That is, the power split device PD and the reduction gear PR together form a differential gear unit having four elements in all. As a result, the ratios of the rotation speeds of all of the rotating elements of the reduction gear PR and the power split device PD are restricted to being constant. In this operating mode, running is performed using the driving force from the engine E. In this parallel mode, the first rotating electrical machine MG1 is controlled to stop rotating. In this state, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

1-6. Second Split Mode

Figure 7A:
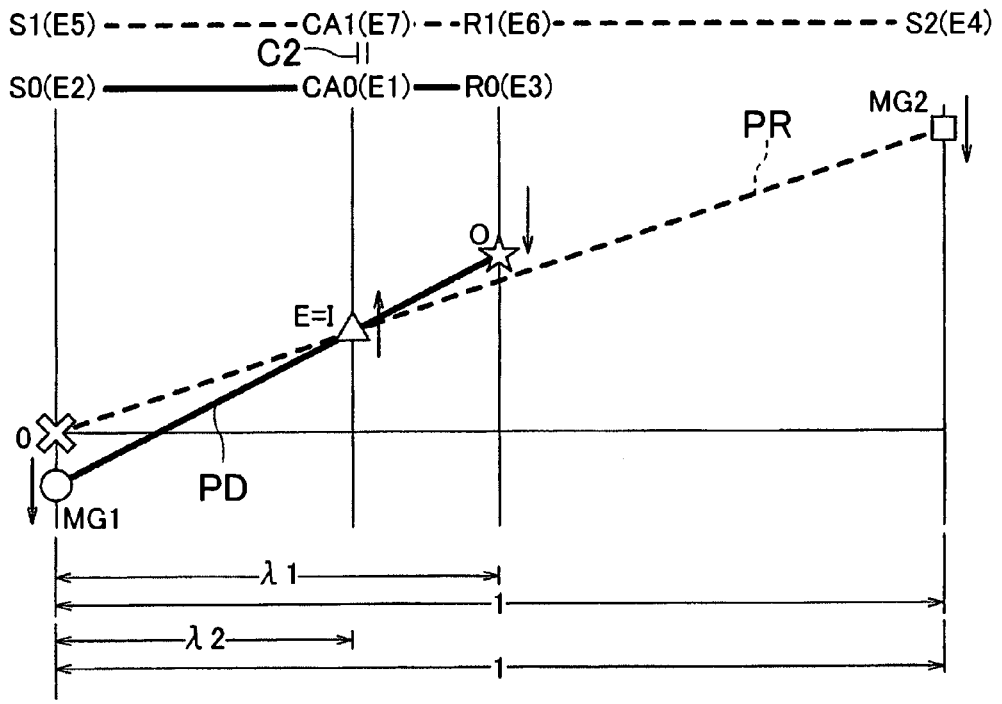
FIGS. 7A and 7B are velocity diagrams of a second split mode according to the first embodiment of the present invention.
Figure 7B:
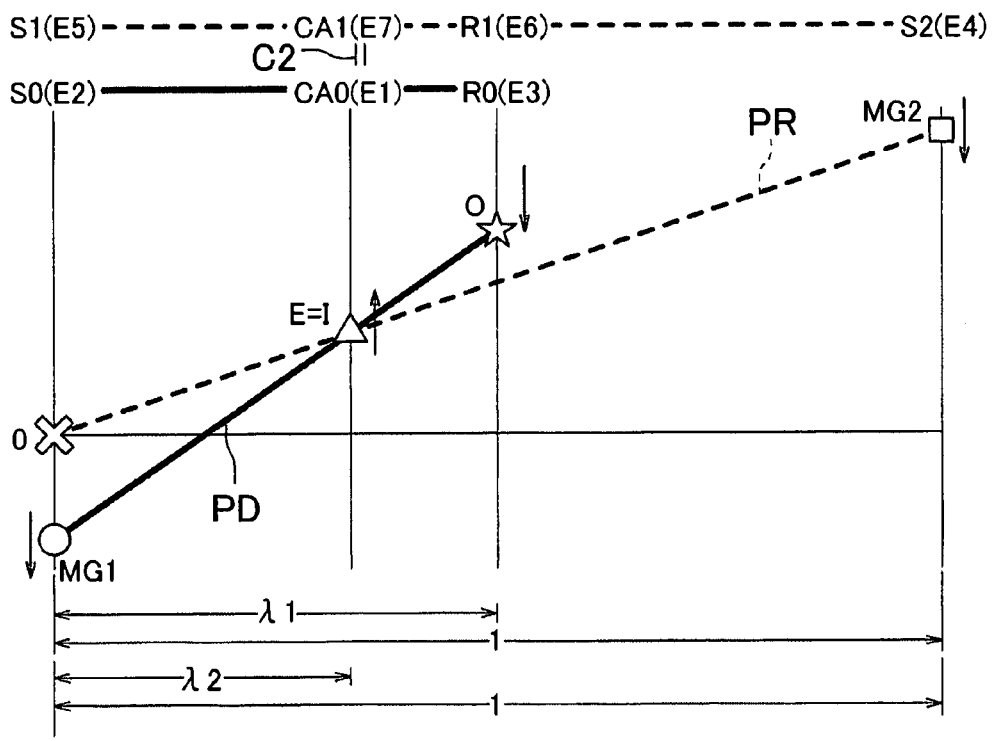

The second split mode is an operating mode that is selected when the running speed of the vehicle is increased from the parallel mode. In this operating mode, the rotation of the second rotating electrical machine MG2 is decelerated by the reduction gear PR and the driving force of the second rotating electrical machine MG2 is transmitted to the carrier CA0, while the driving force from the engine E is split by the power split device PD and transmitted to the output member O. Also, the first rotating electrical machine MG1 provides reaction force for operating the power split device PD. That is, the driving force from the engine E (i.e., the input member I) is transmitted to the output member O via the power split device PD by having the first rotating electrical machine MG1 generate reaction force. However, as is shown in FIGS. 7A and 7B, this second split mode is selected in a range where the rotation speed of the output member O is high and the rotation speed of the first rotating electrical machine MG1 is negative. At this time, the first rotating electrical machine MG1 performs powering by outputting torque in the negative direction while rotating in the negative direction, and the second rotating electrical machine MG2 generates power to enable the first rotating electrical machine MG1 to perform powering. Accordingly, the second split mode is better suited for running in a high vehicle speed range than the first split mode or the parallel is.

As shown in FIG. 3, the second split mode is realized by releasing the first clutch C1 and engaging the second clutch C2. FIGS. 7A and 7B are velocity diagrams of this second split mode, with FIG. 7B showing a state in which the running speed has been increased from that shown in FIG. 7A. In this operating mode, the vehicle speed is a high speed and the running torque is relatively low. Similar to the first split mode, the driving force transmitted from the engine E to the carrier CA0 of the power split device PD via the input member I is split by the power split device PD and transmitted to the output member O. At this time, the first rotating electrical machine MG1 operates as a reaction force receiver.

In the second split mode, the first clutch C1 is released so the driving force of the second rotating electrical machine MG2 is not directly transmitted to the output member O via the common ring gear R1. Also, the second clutch C2 is engaged so the common carrier CA1 and the carrier CA0 are drivingly connected so that they rotate together. The first sun gear S1 is fixed to the case CS, so the rotation and driving force of the second sun gear S2 that rotates together with the rotor Ro2 of the second rotating electrical machine MG2 is decelerated by the reduction gear PR and transmitted to the common carrier CA1. In this state, the common carrier CA1 is drivingly connected to the carrier CA0 of the power split device PD, so the decelerated rotation and driving force of the second rotating electrical machine MG2 are transmitted to the carrier CA0 of the power split device PD and the input member I. More specifically, as shown in the lower part of the velocity diagrams in FIGS. 7A and 713, in the second split mode, the rotation speed of the second rotating electrical machine MG2 is decelerated "$\gamma 2$" times ($\gamma 2 < \gamma 1 < 1$) and then transmitted to the carrier CA0 of the power split device PD. The reduction gear ratio at this time is "$1/\gamma 2$". Accordingly, the torque of the second rotating electrical machine MG2 is multiplied "$1/\gamma 2$" times and then transmitted to the carrier CA0 of the power split device PD. In this second split mode, the rotation of the input rotating element E4 (i.e., the second sun gear S2) that is decelerated by the reduction gear PR and transmitted to the input rotating element E1 (i.e., the carrier CA0) of the power split device PD via the second output rotating element E7 (i.e., the common carrier CA1) corresponds to second decelerated rotation of the present invention. This second decelerated rotation is decelerated more than the first decelerated rotation (i.e., the reduction gear ratio is larger), so the second decelerated rotation is slower than the first decelerated rotation with respect to the same rotation of the input rotating element E4.

In this second split mode, the first rotating electrical machine MG1 is controlled, according to the vehicle speed and the required driving force and the like, to output an appropriate rotation speed and torque so that the engine E can be operated with good fuel efficiency. That is, the first rotating electrical machine MG1 performs powering so that the engine E can operate in a good fuel efficient state. In this state, the first rotating electrical machine MG1 operates as a reaction force receiver. Meanwhile, the driving force from the engine E is increased by the reduction gear PR and transmitted to the second rotating electrical machine MG2. In this state, the second rotating electrical machine MG2 generates power. That is, in the second split mode, the second rotating electrical machine MG2 is rotated by the driving force transmitted from the engine E (i.e., the input member I), and generates power by outputting torque in the negative direction while rotating in the positive direction.

Providing this kind of second split mode makes it possible to suppress power circulation when the vehicle is running at high speed. That is, in the range where the rotation speed of the output member O is high and the rotation speed of the first rotating electrical machine MG1 is negative, the first rotating electrical machine MG1 performs powering and the second rotating electrical machine MG2 generates power. Selecting the second split mode at this time results in the driving force from the engine E being directly transmitted to the second rotating electrical machine MG2, so it is possible to suppress power circulation that results from the driving force generated by the first rotating electrical machine MG1 performing powering being used to generate power with the second rotating electrical machine MG2. Also at this time, the decelerated rotation from the second rotating electrical machine MG2 is transmitted to the carrier CA0 not via the output member O. Therefore, the driving force of the engine E is canceled out by the driving force of the second rotating electrical machine MG2. Thus, in the second split mode, the amount of reaction force that needs to be generated by powering the first rotating electrical machine MG1 can be reduced compared to when the rotation and driving force of the second rotating electrical machine MG2 are directly transmitted to the output member O as is they are in the first split mode. Accordingly, the ratio of converting the driving force of the engine E into power can be reduced, so the energy efficiency of the hybrid drive system H can be increased.

1-7. Switching Operating Modes from the Split Modes to the Parallel Mode

In the hybrid drive system according to this application, in the parallel mode, the speed line of the power split device PD and the speed line of the reduction gear PR overlap, as shown in FIG. 6 as well. Therefore, when switching from a split mode to the parallel mode, the switch can be a synchronized switch that engages the first clutch C1 or the second clutch C2 when the rotation speeds of the engagement members on both sides of the first clutch C1 or the second clutch C2 are the same. On one hand, when switching from the first split mode to the parallel mode, as the vehicle speed increases, in the power split device PD, the rotation speed of the reaction force rotating element E2 that is drivingly connected to the first rotating electrical machine MG1 decreases and the rotation speed of the output rotating element E3 that is drivingly connected to the output member O increases and approaches that of the parallel mode. On the other hand, when switching from the second split mode to the parallel mode, as the vehicle speed decreases, in the power split device PD, the rotation speed of the reaction force rotating element E2 that is drivingly connected to the first rotating electrical machine MG1 increases and the rotation speed of the output rotating element E3 that is drivingly connected to the output member O decreases and approaches that of the parallel mode. Therefore, according to the structure in this application, with a switch from either split mode to the parallel mode, it is not necessary to place the speed change mechanism in a neutral state as is common with the related art.

Furthermore, with the structure of the hybrid drive system H according to this embodiment, the rotation of the first rotating electrical machine MG1 becomes "0" at the point when a switch is made between one of the split modes and the parallel mode, so this first rotating electrical machine MG1 neither performs powering nor generates power. In combination with this, the torque of the second rotating electrical machine MG2 also becomes "0". Therefore, the switch is also possible even if both the first clutch C1 that serves as the first engagement device EE1 and the second clutch C2 that serves as the second engagement device EE2 are formed by mesh type engagement devices. Further, switching is of course also possible even if only one of the clutches, i.e., either the first clutch C1 or the second clutch C2, is formed by a mesh type engagement device.

1-8. MG2 Disconnected Mode

In the hybrid drive system H according to this embodiment, the MG2 disconnected mode that transmits driving force output from the engine E to the output member O can also be realized by releasing both the first clutch C1 and the second clutch C2 and controlling the rotation and driving force of the first rotating electrical machine MG1. At this time, the first rotating electrical machine MG1 may be controlled to generate power to operate accessories, while outputting the reaction force of the engine torque.

2. Second Embodiment

Figure 8:
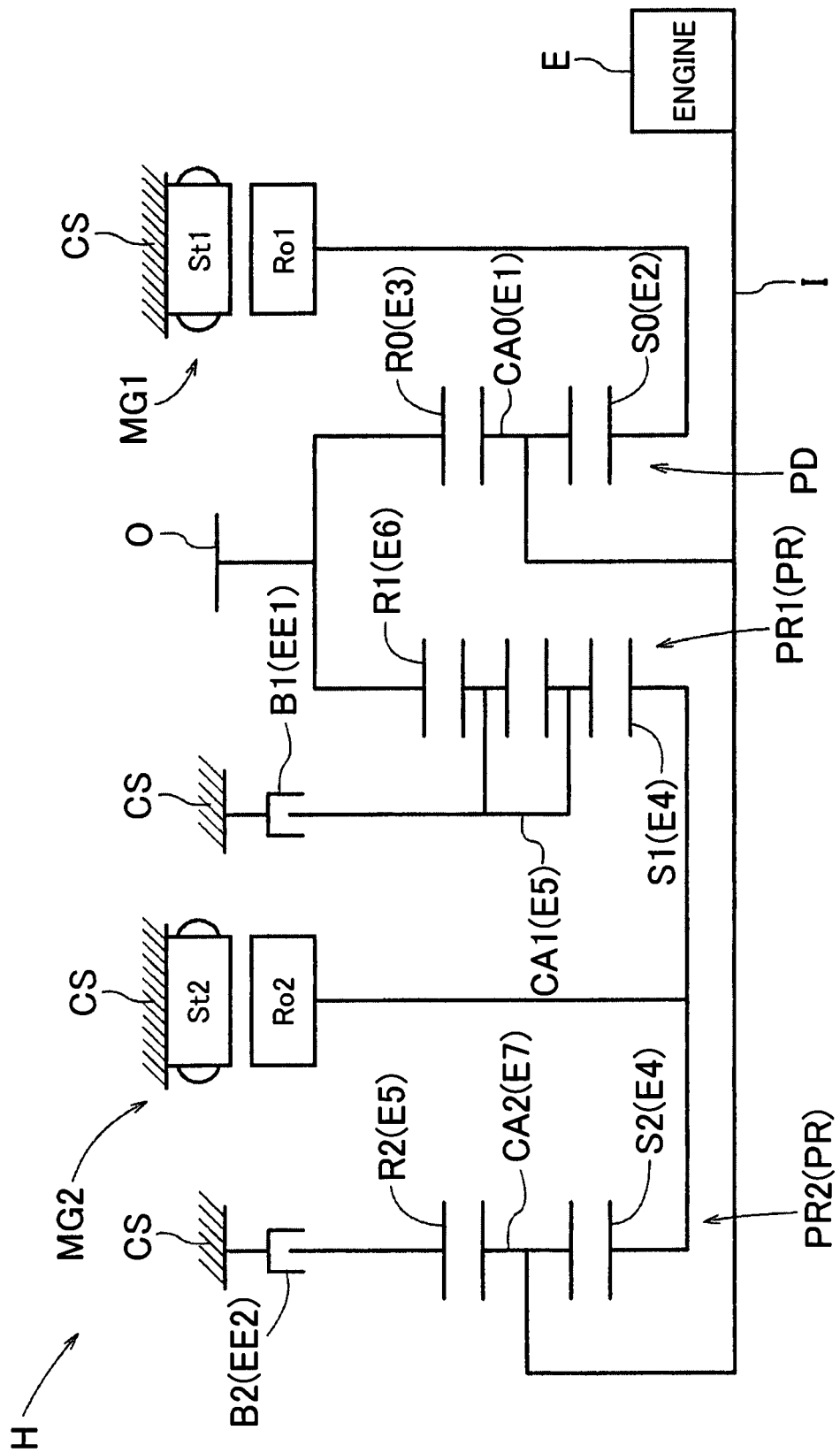
FIG. 8 is a skeleton view of the structure of a hybrid drive system according to a second embodiment of the present invention.

Next, a second embodiment of the present invention will be described. FIG. 8 is a skeleton view of the structure of the hybrid drive system H according to this embodiment. Incidentally, a portion of the axisymmetric structure is omitted in FIG. 8, just as it is FIG. 1. As shown in the drawing, the hybrid drive system H according to this embodiment is provided with a first brake B1 and a second brake B2, but is not provided with the first clutch C1 and the second clutch C2 that are in the first embodiment described above. In this embodiment, the first brake B1 constitutes the first engagement device EE1 of the present invention, and the second brake B2 constitutes the second engagement device EE2 of the present invention. Further, the reduction gear PR is not a Ravigneaux type planetary gear set, but instead includes a first differential gear unit PR1 that is a double pinion type planetary gear set and a second differential gear unit PR2 that is a single pinion type planetary gear set. Hereinafter, mainly the differences between the hybrid drive system H according to this embodiment and the hybrid drive system H according to the first embodiment described above will be described. Incidentally, those points that are not specifically described are similar to those the first embodiment described above.

2-1. Mechanical Structure of the Hybrid Drive System

In this embodiment as well, the structure of the power split device PD is similar to that in the first embodiment described above. However, the structure of the reduction gear PR differs from that of the first embodiment. That is, in this embodiment, the reduction gear PR is formed of a combination of a first differential gear unit PR1 and a second differential gear unit PR2, each of which has three rotating elements.

The first differential gear unit PR1 has, as rotating elements, a first carrier CA1 that supports a plurality of pairs of pinion gears, a first sun gear S1 that meshes with one of those pairs of pinion gears, and a first ring gear R1 that meshes with the other pair of pinion gears. The first sun gear S1 is drivingly connected to the second sun gear S2 of the second differential gear unit PR2 so as to rotate together with the second sun gear S2, and is also drivingly connected to the rotor Ro2 of the second rotating electrical machine MG2 so as to rotate together with the rotor Ro2. Accordingly, the first sun gear S1 of the first differential gear unit PR1 and the second sun gear S2 of the second differential gear unit PR2 are input rotating elements E4 of the reduction gear PR. The first carrier CA1 is selectively held to the case CS, which is a non-rotating member, by the first brake B1. Therefore, when held by the first brake 131, the first carrier CA1 is a stationary element E5 of the reduction gear PR. The first ring gear R1 is drivingly connected to the ring gear R0 (i.e., the output rotating element E3) of the power split device PD so as to rotate together with the ring gear R0, and is also drivingly connected to the output member O. Accordingly, this first ring gear R1 is a first output rotating element E6 of the reduction gear PR. This first differential gear unit PR1 is formed from a double pinion type planetary gear set that includes three rotating elements which are, in order of rotation speed, the first carrier CA1, the first ring gear R1, and the first sun gear S1. Accordingly, in this embodiment, the first carrier CA1 is a first rotating element of the first differential gear unit PR1, the first ring gear R1 is a second rotating element of the first differential gear unit PR1, and the first sun gear S1 is a third rotating element of the first differential gear unit PR1.

The second differential gear unit PR2 has, as rotating elements, a second carrier CA2 that supports a plurality of pinion gears, and a second sun gear S2 and a second ring gear R2 that are both in mesh with those pinion gears. As described above, the second sun gear S2 is drivingly connected to the first sun gear S1 of the first differential gear unit PR1 so as to rotate together with the first sun gear S1, and is also drivingly connected to the rotor Ro2 of the second rotating electrical machine MG2 so as to rotate together with the rotor Ro2, and is thus an input rotating element E4 of the reduction gear PR. The second carrier CA2 is drivingly connected to the carrier CA0 (i.e., the input rotating element E1) of the power split device PD so as to rotate together with the carrier CA0, and is also drivingly connected to the input member I. Accordingly, this second carrier CA2 is a second output rotating element E7 of the reduction gear PR. The second ring gear R2 is selectively held to the case CS, which is a non-rotating member, by the second brake B2. Therefore, when held by the second brake B2, the second ring gear R2 is a stationary element E5 of the reduction gear PR. The second differential gear unit PR2 is fowled from a single pinion type planetary gear set that has three rotating elements which are, in order of rotation speed, the second ring gear R2, the second carrier CA2, and the second sun gear S2. Accordingly, in this embodiment, the second ring gear R2 is a first rotating element of the second differential gear unit PR2, the second carrier CA2 is a second rotating element of the second differential gear unit PR2, and the second sun gear S2 is a third rotating element of the second differential gear unit PR2.

As described above, the reduction gear PR is formed by drivingly connecting one rotating element (the first sun gear S1 in this case) of the first differential gear unit PR1 that has three rotating elements to one rotating element (the second sun gear S2 in this case) of the second differential gear unit PR2 that has three rotating elements so that those two rotating elements rotate together. Accordingly, the reduction gear PR is a differential gear unit that has five rotating elements in all. As shown in the upper parts of the velocity diagrams in FIGS. 11A to 13B, these five rotating elements of the reduction gear PR are, in order of rotation speed, the first carrier CA1 and the second ring gear R2 that rotate independently of each other, the second carrier CA2, the first ring gear R1, and the first sun gear S1 and the second sun gear S2 that rotate together. In other words, the order of rotation speed of the five rotating elements of the reduction gear PR is i) the two stationary elements E5, ii) the second output rotating element E7, iii) the first output rotating element E6, and iv) the input rotating element E4.

The first brake B1 selectively holds the first carrier CA1 of the first differential gear unit PR1 as one of the two stationary elements E5 of the reduction gear PR. When this first brake B1 is engaged, the rotation of the second rotating electrical machine MG2 that is drivingly connected to the first sun gear S1 that is the input rotating element E4 of the reduction gear PR is decelerated by the first differential gear unit PR1 and transmitted to the output member O. In this embodiment, this first brake B1 constitutes a first engagement device EE1 of the present invention. Also, as will be described later, a first split mode is realized by engaging this first brake B1, so this first brake B1 functions as a first split mode engagement device of the present invention.

The second brake B2 selectively holds the second ring gear R2 of the second differential gear unit PR2 as the other of the two stationary elements E5 of the reduction gear PR. When this second brake B2 is engaged, the rotation of the second rotating electrical machine MG2 that is drivingly connected to the first sun gear S1 that is the input rotating element E4 of the reduction gear PR is decelerated by the second differential gear unit PR2 and transmitted to the carrier CA0 that is the input rotating element E1 of the power split device PD. In this embodiment, this second brake B2 constitutes a second engagement device EE2 of the present invention. Also, as will be described later, a second split mode is realized by engaging this second brake B2, so this second brake B2 functions as a second split mode engagement device of the present invention.

In this embodiment, the first brake B1 and the second brake B2 are both friction engagement devices. Multi-disc brakes that operate by hydraulic pressure may be used for these brakes, i.e., the first brake B1 and the second brake B2. Similar to the first embodiment described with reference to FIG. 2, hydraulic pressure is supplied to these engagement devices B1 and B2 from the hydraulic control apparatus 35 that operates in response to a control command from the main control unit 31. Engagement or release of these engagement devices B1 and B2 is controlled by that hydraulic pressure. Hydraulic pressure generated by an oil pump, not shown, is supplied to this hydraulic control apparatus 35.

Incidentally, a mesh type engagement device may be used for the first brake B1 and/or the second brake B2, similar to the first embodiment. As will be described later, in this embodiment, the first brake B1 and the second brake B2 can be engaged when the second rotating electrical machine MG2 is not generating driving force. Therefore, even if both the first brake B1 and the second brake B2 are formed by mesh type engagement devices, they are able to switch to an engaged state nicely. Also, if both of the two engagement devices B1 and B2 are mesh type engagement devices, hydraulic pressure for generating engagement pressure or release pressure is not necessary so a loss of driving force due to the hydraulic pump can be suppressed and the transfer efficiency of the drive system can be easily increased compared with when these two engagement devices B1 and B2 are friction engagement devices. Incidentally, in order to obviate the need for a supply of hydraulic pressure, the operation to switch these mesh type engagement devices between an engaged state and a released state may be performed by an electromagnetic actuator.

When the first brake B1 is engaged and the second brake B2 is released, the rotation and driving force of the second rotating electrical machine MG2 is transmitted to the output member O after being decelerated by the operation of the first differential gear unit PR1 of the reduction gear PR. Also, the driving force generated by the engine E is split and transmitted to the first rotating electrical machine MG1 and the output member O by the operation of the power split device PD. On the other hand, when the first brake B1 is released and the second brake B2 is engaged, driving force generated from the engine E is split and transmitted to the second rotating electrical machine MG2 and the output member O by the operation of the power split device PD and the second differential gear unit PR2 of the reduction gear PR. At this time, the second differential gear unit PR2 of the reduction gear PR operates as a speed-increasing gear when viewed from the power split device PD side, and operates as a speed-decreasing gear when viewed from the second rotating electrical machine MG2 side.

2-2. Structure of the Control System of the Hybrid Drive System

The control system in this embodiment has generally the same structure as that shown in FIG. 2 according to the first embodiment described above, except that the engagement devices are changed from the clutches C1 and C2 to the brakes B1 and B2.

2-3. Operating Modes of the Hybrid Drive System

Figures 9, 10:
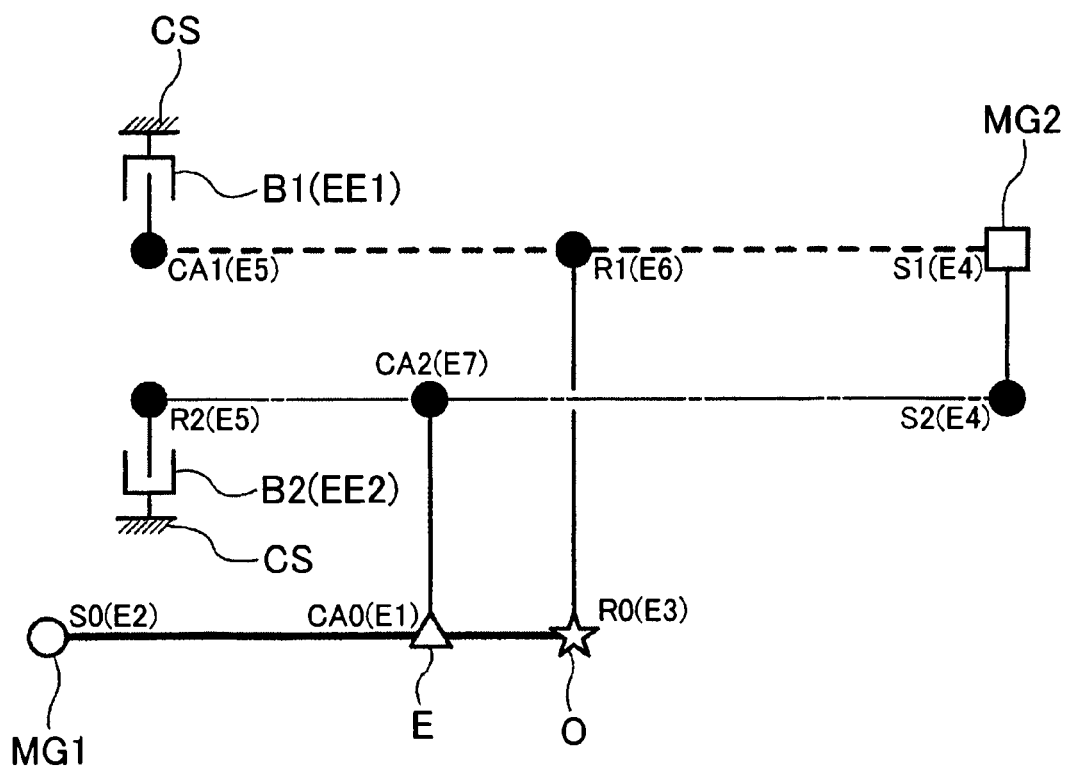
FIG. 9 is an operation table showing the operating states of a plurality of engagement devices in each mode according to the second embodiment of the present invention.
FIG. 10 is a view of the connective states of various rotating elements of the hybrid drive system according to the second embodiment of the present invention.

Next, the operating modes that can be realized by the hybrid drive system H according to this embodiment will be described. FIG. 9 is an operation table showing the operating states of the first brake B1 (i.e., the first engagement device EE1) and the second brake B2 (i.e., the second engagement device EE2) in each operating mode. In the table, a circle indicates that the corresponding engagement device is engaged (i.e., connected), and the absence of a circle indicates that the corresponding device is released (i.e., disconnected).

FIG. 10 is a view showing the connective states of the various rotating elements of the planetary gear sets in the hybrid drive system H according to this embodiment, as levers. In the drawing, these levers correspond to the first differential gear unit PR1, the second differential gear unit PR2, and the power split device PD, in order from top to bottom.

FIGS. 11A and 11B, FIG. 12, and FIGS. 13A and 13B are velocity diagrams that show the operating states of the power split device PD, the first differential gear unit PR1, and the second differential gear unit PR2 in each operating mode. The description method of these velocity diagrams is the same as it is with FIGS. 5A and 5B, FIG. 6, and FIGS. 7A and 7B according to the first embodiment described above. However, the plurality of vertical axes that are arranged parallel with one another correspond to the rotating elements of the power split device PD, the first differential gear unit PR1, and the second differential gear unit PR2. The "S0", "CA0", and "R0" above the vertical axes correspond to the sun gear S0, the carrier CA0, and the ring gear R0 of the power split device PD, respectively, the "S1", "CA1", and "R1" above the vertical axes correspond to the first sun gear S1, the first carrier CA1, and the first ring gear R1 of the first differential gear unit PR1, respectively, and the "S2", "CA2", and "R2" above the vertical axes correspond to the second sun gear S2, the second carrier CA2, and the second ring gear R2 of the second differential gear unit PR2, respectively. The "=" that connects the reference characters of rotating elements above the vertical axes indicates that a plurality of rotating elements are drivingly connected so as to rotate together. Also, an "x" in the drawings indicates that the corresponding rotating element is held to a case CS which is a non-rotating member. The reference character "B1" or "B2" accompanying that "x" indicates that the rotating element is held by engagement of the first brake B1 or the second brake B2. Hereinafter, the operating state of the hybrid drive system H in each of the plurality of operating modes will be described in detail.

2-4. First Split Mode

The first split mode is an operating mode selected when the running speed of the vehicle is low. In this operating mode, the rotation of the second rotating electrical machine MG2 is decelerated by the reduction gear PR and that driving force is transmitted to the output member O, while driving force from the engine E is split by the power split device PD and transmitted to the output member O. Also, in this operating mode, the first rotating electrical machine MG1 provides reaction force for operating the power split device PD. That is, the driving force from the engine E (i.e., the input member I) is transmitted to the output member O via the power split device PD by having the first rotating electrical machine MG1 generate reaction force. Meanwhile, the second rotating electrical machine MG2 works to compensate for the shortage of driving force from the engine E.

Figure 11A:
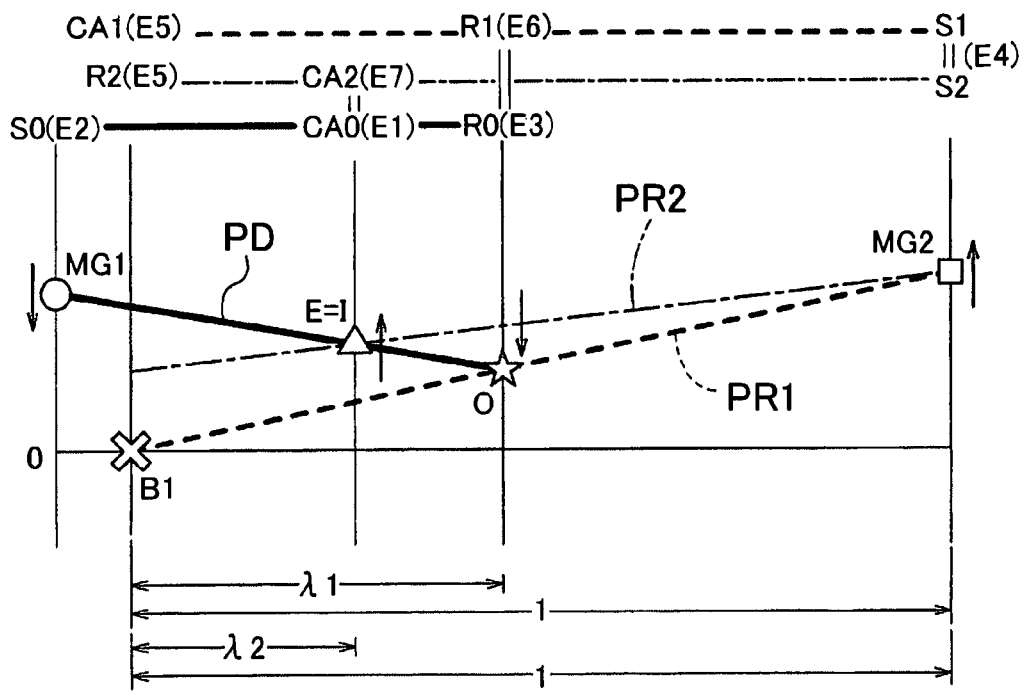
FIGS. 11A and 11B are velocity diagrams of a first split mode according to the second embodiment of the present invention.
Figure 11B:
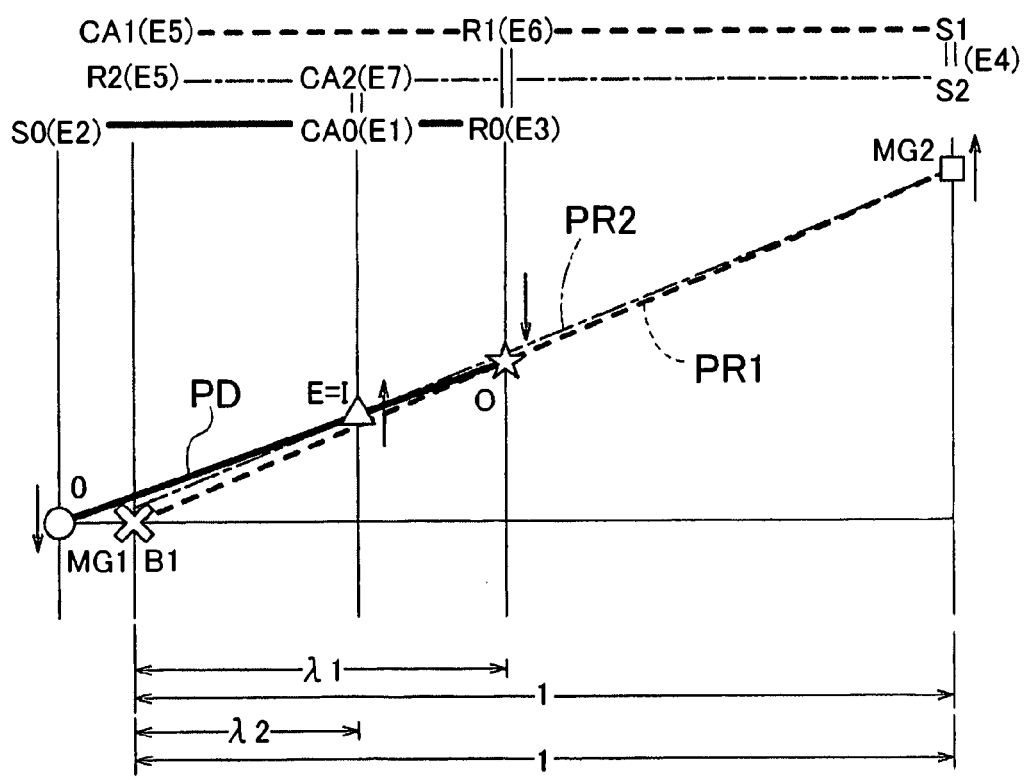

The first split mode is realized by engaging the first brake B1 and releasing the second brake B2, as shown in FIG. 9. FIGS. 11A and 11B are velocity diagrams of this first split mode, with FIG. 11B showing a state in which the running speed has been increased from that shown in FIG. 11A. The driving force transmitted from the engine E to the carrier CA0 of the power split device PD via the input member I is split by the power split device PD and transmitted to the output member O. At this time, the first rotating electrical machine MG1 operates as a reaction force receiver.

In the first split mode, the second brake B2 is released so the second ring gear R2 is able to rotate freely. Also, the first brake B1 is engaged so the rotation and driving force of the first sun gear S1 that rotates together with the rotor Ro2 of the second rotating electrical machine MG2 is decelerated by the first differential gear unit PR1 and transmitted to the first ring gear R1. Here, the first ring gear R1 is drivingly connected to the output member O so as to rotate together with the output member O, so the decelerated rotation and driving force of the second rotating electrical machine MG2 are transmitted to the output member O via the first ring gear R1. More specifically, as shown in the lower part of the velocity diagram in FIGS. 11A and 11B, in the first split mode, the rotation speed of the second rotating electrical machine MG2 is decelerated "$\gamma1$" times ($\gamma1<1$) and transmitted to the output member O. The reduction gear ratio at this time is "$1/\gamma1$". Accordingly, the torque of the second rotating electrical machine MG2 is multiplied "$1/\gamma1$" times and transmitted to the output member O. In this first split mode, the rotation of the input rotating element E4 (i.e., the first sun gear S1) that is decelerated by the reduction gear PR and transmitted to the output member O via the first output rotating element E6 (i.e., the first ring gear R1) corresponds to first decelerated rotation of the present invention.

In this first split mode, the first rotating electrical machine MG1 is controlled, according to the vehicle speed and the required driving force and the like, to output an appropriate rotation speed and torque so that the engine E can be operated with good fuel efficiency. That is, the power split device PD distributes the driving force from the engine E to the output member O and the first rotating electrical machine MG1 while the engine operates in a good fuel efficient state. In this state, the first rotating electrical machine MG1 generates power by outputting MG1 torque T1 in the negative direction when rotating in the positive direction. Also, the rotation speed of the first rotating electrical machine MG1 decreases as the rotation of the output member O increases, with the rotation of the first rotating electrical machine MG1 becoming negative rotation past 0.

2-5. Parallel Mode

Figure 12:
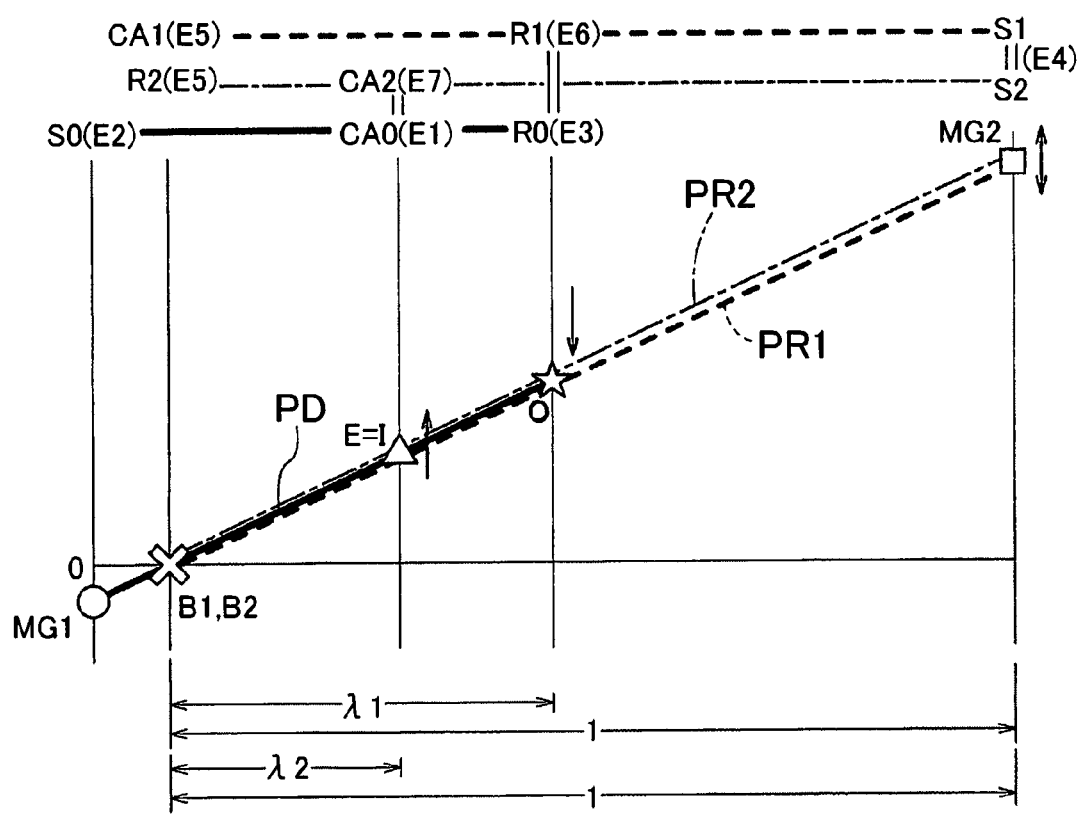
FIG. 12 is a velocity diagram of a parallel mode according to the second embodiment of the present invention.

The parallel mode is an operating mode that is selected when the running speed of the vehicle has increased from the first split mode. FIG. 12 is a velocity diagram of this parallel mode. As is evident from the drawing, in the parallel mode, the relationship of the rotation speeds of the rotating elements of the power split device PD and the reduction gear PR is constant, so if the rotation speed of any one rotating element is determined, the rotation speeds of the other rotating elements also become determined. Here, the speed line of the power split device PD and the speed lines of first differential gear unit PR1 and the second differential gear unit PR2 that form the reduction gear PR overlap on a straight line. In this operating mode, the rotation of the first rotating electrical machine MG1 is made slightly negative, while the second rotating electrical machine MG2 is placed in a state in which it fundamentally does not generate driving force. This parallel mode is better suited for running in a high vehicle speed range when the required driving force is low than the first split mode is.

As shown in FIG. 9, the parallel mode is realized by engaging both the first brake B1 and the second brake 132. Engaging both the first brake B1 and the second brake B2 results in both the first carrier CA1 and the second ring gear R2, which are the two stationary elements E5 of the reduction gear PR, being held to the case CS which is a non-rotating member. As a result, the power split device PD, the first differential gear unit PR1, and the second differential gear unit PR2 together form a differential gear unit having five elements in all. As a result, the ratios of the rotation speeds of all of the rotating elements of the reduction gear PR and the power split device PD are restricted to being constant. In this operating mode, running can be performed using the driving force from the engine E. In this parallel mode, the first rotating electrical machine MG1 is controlled to a state in which it neither generates power nor performs powering while it rotates at low speed, or a state in which it generates power to operate accessories. In this state, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

2-6. Second Split Mode

Figure 13A:
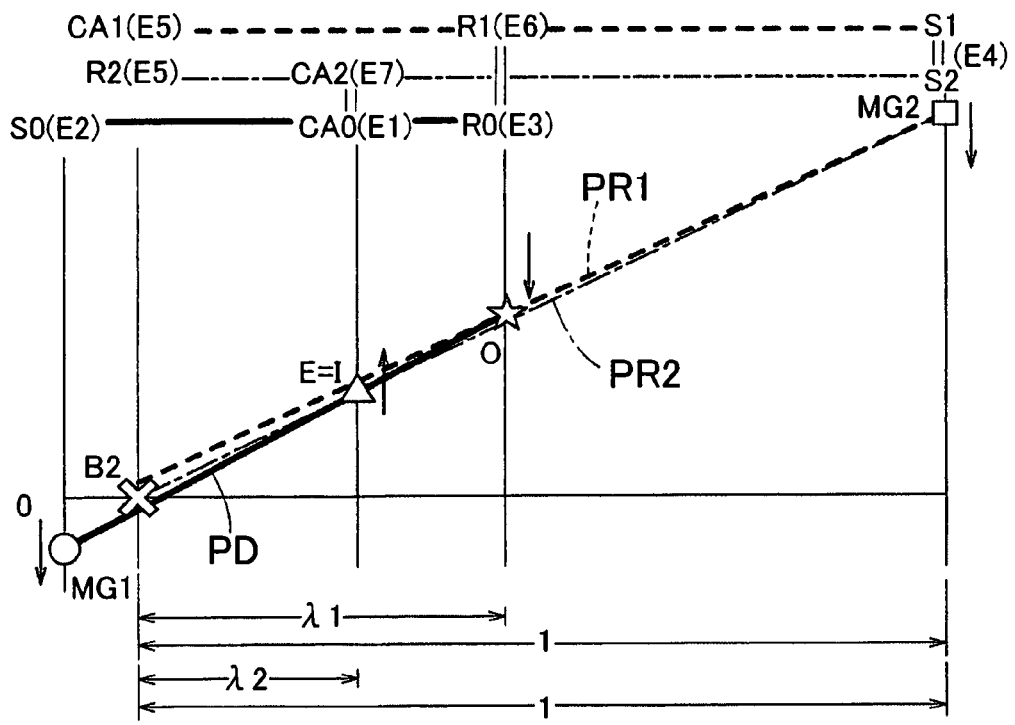
FIGS. 13A and 13B are velocity diagrams of a second split mode according to the second embodiment of the present invention.
Figure 13B:
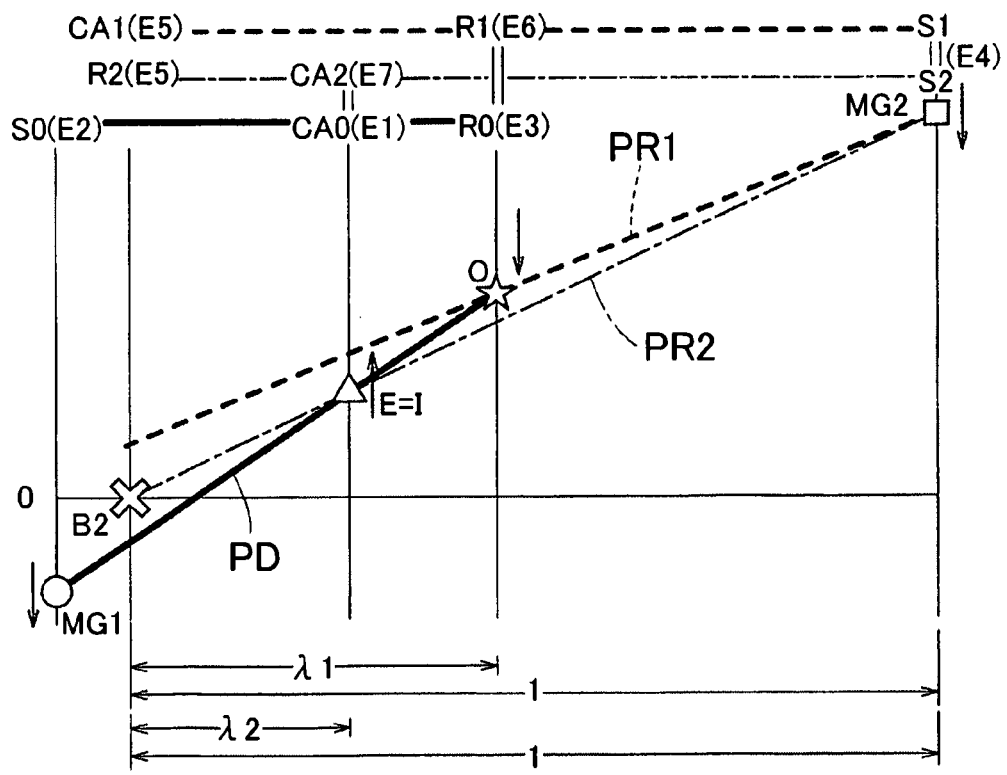

The second split mode is an operating mode that is selected when the running speed of the vehicle is increased from the parallel mode. In this operating mode, the rotation of the second rotating electrical machine MG2 is decelerated by the reduction gear PR and that driving force is transmitted to the carrier CA0, while the driving force from the engine E is split by the power split device PD and transmitted to the output member O. Also, in this operating mode, the first rotating electrical machine MG1 provides reaction force for operating the power split device PD. That is, the driving force from the engine E (i.e., the input member I) is transmitted to the output member O via the power split device PD by having the first rotating electrical machine MG1 generate reaction force. However, as is shown in FIGS. 13A and 13B, this second split mode is selected in a range where the rotation speed of the output member O is high and the rotation speed of the first rotating electrical machine MG1 is negative. At this time, the first rotating electrical machine MG1 performs powering by outputting torque in the negative direction while rotating in the negative direction, and the second rotating electrical machine MG2 generates power to enable the first rotating electrical machine MG1 to perform powering. Accordingly, the second split mode is better suited for running in a high vehicle speed range than the first split mode or the parallel mode is.

The second split mode is realized by releasing the first brake B1 and engaging the second brake B2, as shown in FIG. 9. FIGS. 13A and 13B are velocity diagrams of this second split mode, with FIG. 13B showing a state in which the running speed has been increased from that shown in FIG. 13A. In this operating mode, the vehicle speed is a high speed and the running torque is relatively low. Similar to the first split mode, the driving force transmitted from the engine E to the carrier CA0 of the power split device PD via the input member I is split by the power split device PD and transmitted to the output member O. At this time, the first rotating electrical machine MG1 operates as a reaction force receiver.

In the second split mode, the first brake B1 is released so the driving force of the second rotating electrical machine MG2 is not directly transmitted to the output member O via the first ring gear R1. Also, the second brake B2 is engaged so the rotation and driving force of the second sun gear S2 that rotates together with the rotor Ro2 of the second rotating electrical machine MG2 is decelerated by the second differential gear unit PR2 and transmitted to the second carrier CA2. Here, the second carrier CA2 is drivingly connected to the carrier CA0 and the input member I so as to rotate together with the carrier CA0 and the input member I, so the decelerated rotation and driving force of the second rotating electrical machine MG2 are transmitted to the carrier CA0 of the power split device PD and the input member I via the second carrier CA2. More specifically, as shown in the lower part of the velocity diagrams in FIGS. 13A and 13B, in the second split mode, the rotation speed of the second rotating electrical machine MG2 is decelerated "γ2" times (γ2<γ1<1) and then transmitted to the carrier CA0 of the power split device PD. The reduction gear ratio at this time is "1/γ2". Accordingly, the torque of the second rotating electrical machine MG2 is multiplied "1/γ2" times and then transmitted to the carrier CA0 of the power split device PD. In this second split mode, the rotation of the input rotating element E4 (i.e., the second sun gear S2) that is decelerated by the reduction gear PR and transmitted to the input rotating element E1 (i.e., the carrier CA0) of the power split device PD via the second output rotating element E7 (i.e., the second carrier CA2) corresponds to second decelerated rotation of the present invention. This second decelerated rotation is decelerated more than the first decelerated rotation (i.e., the reduction gear ratio is larger), so the second decelerated rotation is slower than the first decelerated rotation with respect to the same rotation of the input rotating element E4.

In this second split mode, the first rotating electrical machine MG1 is controlled, according to the vehicle speed and the required driving force and the like, to output an appropriate rotation speed and torque so that the engine E can be operated with good fuel efficiency. That is, the first rotating electrical machine MG1 performs powering so that the engine E can operate in a good fuel efficient state. In this state, the first rotating electrical machine MG1 operates as a reaction force receiver. Meanwhile, the driving force from the engine E is increased by the second differential gear unit PR2 of the reduction gear PR and transmitted to the second rotating electrical machine MG2. In this state, the second rotating electrical machine MG2 generates power. That is, in the second split mode, the second rotating electrical machine MG2 is rotated by the driving force transmitted from the engine E (i.e., the input member I), and generates power by outputting torque in the negative direction while rotating in the positive direction. Providing this kind of second split mode makes it possible to suppress power circulation when the vehicle is running at a high speed, similar to the first embodiment described above, as well as to reduce the reaction force of the first rotating electrical machine MG1, thus enabling energy efficiency to be increased.

2-7. Switching Operating Modes from the Split Modes to the Parallel Mode

In the hybrid drive system according to this application, in the parallel mode, the speed line of the power split device PD and the speed lines of the first differential gear unit PR1 and the second differential gear unit PR2 that make up the reduction gear PR overlap, as shown in FIG. 12 as well. Therefore, when switching from the first split mode or the second split mode to the parallel mode, the switch can be a synchronized switch that engages the first brake B1 or the second brake B2 when the rotation speed of the first carrier CA1 of the first differential gear unit PR1 that is held by the first brake B1 or the second ring gear R2 of the second differential gear unit PR2 that is held by the second brake B2 is "0". Therefore, according to the structure in this application, with a switch from one of the split modes to the parallel mode, it is not necessary to place the speed change mechanism in a neutral state as is common with the related art.

Unlike the first embodiment described above, with the structure of the hybrid drive system H according to this embodiment, the rotation of the first rotating electrical machine MG1 becomes rotation in the negative direction at a low rotation speed near "0" at the point when a switch is made between one of the split modes and the parallel mode, so this first rotating electrical machine MG1 performs powering. In combination with this, second rotating electrical machine MG2 slightly generates power, but control can be performed that makes the torque "0" during the mode switch. At this time, fluctuation in the torque transmitted to the output member O can be suppressed by adjusting the torque of the engine E. Performing this type of control makes it possible to switch modes even if both the first brake B1 that serves as the first engagement device EE1 and the second brake B2 that serves as the second engagement device EE2 are formed by mesh type engagement devices. Further, switching is of course also possible even if only one of the brakes, i.e., either the first brake B1 or the second brake B2, is formed by a mesh type engagement device.

2-8. MG2 Disconnected Mode

In the hybrid drive system H according to this embodiment, the MG2 disconnected mode that transmits driving force output from the engine E to the output member O can also be realized by releasing both the first brake B1 and the second brake B2 and controlling the rotation and driving force of the first rotating electrical machine MG1. At this time, the first rotating electrical machine MG1 may be controlled to generate power to operate accessories, while outputting the reaction force of the engine torque.

3. Third Embodiment

Figure 14:
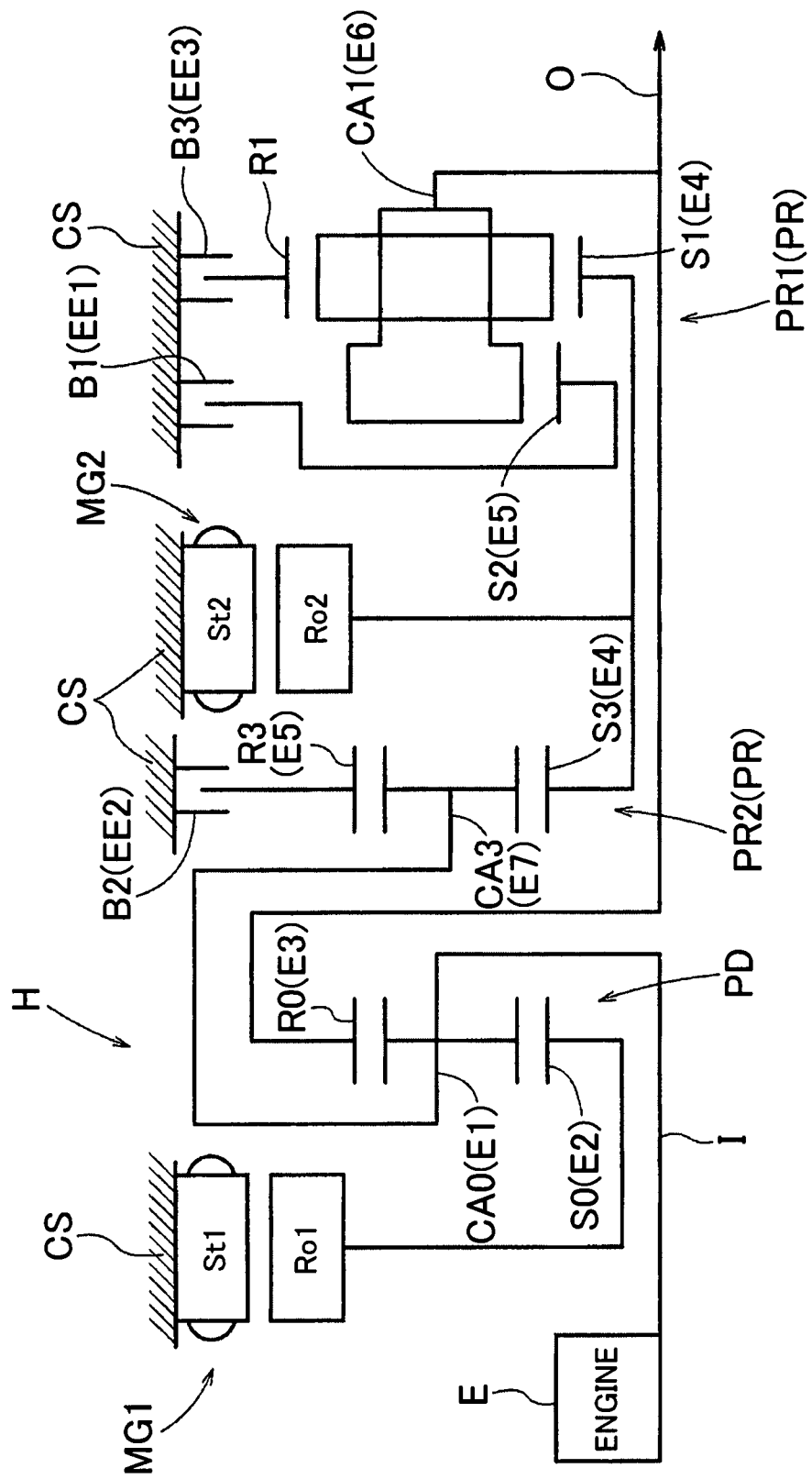
FIG. 14 is a skeleton view of the structure of a hybrid drive system according to a third embodiment of the present invention.

Next, a third embodiment of the present invention will be described. FIG. 14 is a skeleton view of the structure of the hybrid drive system H according to this embodiment. Incidentally, a portion of the axisymmetric structure is omitted in FIG. 14, just as it is FIG. 1. Operating modes of the hybrid drive system H according to this embodiment have been added compared with the first and second embodiments described above. That is, this hybrid drive system H includes a third split mode and a first parallel mode, in addition to a first split mode, a second split mode, and a second parallel mode that corresponds to the parallel mode described above. In order to realize these kinds of additional modes, the number of engagement devices is increased to three and the structure of the reduction gear PR has been changed. Hereinafter, mainly the differences between the hybrid drive system H according to this embodiment and the hybrid drive system H according to the first embodiment described above will be described. Incidentally, those points that are not specifically described are similar to those the first embodiment described above.

3-1. Mechanical Structure of the Hybrid Drive System

In this embodiment as well, the structure of the power split device PD is similar to that in the first embodiment described above. However, the structure of the reduction gear PR differs from that of the first embodiment. That is, in this embodiment, the reduction gear PR is formed of a combination of a first differential gear unit PR1 that has four rotating elements, and a second differential gear unit PR2 that has three rotating elements, as shown in FIG. 14.

The first differential gear unit PR1 is a differential gear unit that has four rotating elements. Here, the first differential gear unit PR1 is formed from a Ravigneaux type planetary gear set that has four rotating elements which are, in order of rotation speed, a first sun gear S1, a common carrier CA1, a common ring gear R1, and a second sun gear S2. Here, the common carrier CA1 rotatably supports both a short pinion gear that is in mesh with both the first sun gear S1 and the common ring gear R1, and a stepped long pinion gear that has a large diameter portion that is in mesh with the second sun gear S2 and a small diameter portion that is in mesh with the short pinion gear. The first sun gear S1 is drivingly connected to a third sun gear S3 of the second differential gear unit PR2 so as to rotate together with the third sun gear S3, and is also drivingly connected to the rotor Ro2 of the second rotating electrical machine MG2 so as to rotate together with the rotor Ro2. Accordingly, the first sun gear S1 of the first differential gear unit PR1 and the third sun gear S3 of the second differential gear unit PR2 are input rotating elements E4 of the reduction gear PR. The common carrier CA1 is drivingly connected to the ring gear R0 (i.e., the output rotating element E3) of the power split device PD so as to rotate together with the ring gear R0, and is also drivingly connected to the output member O. Therefore, this common carrier CA1 is a first output rotating element E6 of the reduction gear PR. The common ring gear R1 is selectively held to the case CS, which is a non-rotating member, by the third brake B3. As will be described later, this common ring gear R1 is a rotating element that is held by the third brake B3 in order to realize a third split mode, and is not a stationary element E5 of the reduction gear PR of the present invention. The second sun gear S2 is selectively held to the case CS, which is a non-rotating member, by the first brake B1. When held by the first brake B1, this second sun gear S2 is a stationary element E5 of the reduction gear PR. In this embodiment, the second sun gear S2 of the first differential gear unit PR1 is a first rotating element of the first differential gear unit PR1, the common ring gear R1 of the first differential gear unit PR1 is a second rotating element of the first differential gear unit PR1, the common carrier CA1 of the first differential gear unit PR1 is a third rotating element of the first differential gear unit PR1, and the first sun gear S1 is a fourth rotating element of the first differential gear unit PR1.

The second differential gear unit PR2 is a differential gear unit that has three rotating elements. In this case, the second differential gear unit PR2 is formed by a single pinion type planetary gear set. That is, the second differential gear unit PR2 has, as rotating elements, a third carrier CA3 that supports a plurality of pinion gears, and the third sun gear S3 and a third ring gear R3 that are both in mesh with those pinion gears. As described above, the third sun gear S3 is drivingly connected to the first sun gear S1 of the first differential gear unit PR1 so as to rotate together with the first sun gear S1, and is also drivingly connected to the rotor Ro2 of the second rotating electrical machine MG2 so as to rotate together with the rotor Ro2, and is thus an input rotating element E4 of the reduction gear PR. The third carrier CA3 is drivingly connected to the carrier CA0 (i.e., the input rotating element E1) of the power split device PD so as to rotate together with the carrier CA0, and is also drivingly connected to the input member I. Accordingly, this third carrier CA3 is a second output rotating element E7 of the reduction gear PR. The third ring gear R3 is selectively held to the case CS, which is a non-rotating member, by the second brake B2. Therefore, when held by the second brake B2, the third ring gear R3 is a stationary element E5 of the reduction gear PR. The three rotating elements of the second differential gear unit PR2 are, in order of rotation speed, the third ring gear R3, the third carrier CA3, and the third sun gear S3. Accordingly, in this embodiment, the third ring gear R3 is a first rotating element of the second differential gear unit PR2, the third carrier CA3 is a second rotating element of the second differential gear unit PR2, and the third sun gear S3 is a third rotating element of the second differential gear unit PR2.

As described above, the reduction gear PR is formed by drivingly connecting one rotating element (the first sun gear S1 in this case) of the first differential gear unit PR1 that has four rotating elements to one rotating element (the third sun gear S3 in this case) of the second differential gear unit PR2 that has three rotating elements so that those two rotating elements rotate together. Accordingly, the reduction gear PR is a differential gear unit that has six rotating elements in all. As shown in the upper parts of the velocity diagrams in FIGS. 16 to 20, of these six rotating elements of the reduction gear PR, excluding the common ring gear R1, the five of the rotating elements are, in order of rotation speed, the second sun gear S2 and the third ring gear R3 that rotate independently of each other, the third carrier CA3, the common carrier CA1, and the first sun gear S1 and the third sun gear S3 that rotate together. In other words, the order of rotation speed of these five rotating elements of the reduction gear PR is i) the two stationary elements E5, ii) the second output rotating element E7, iii) the first output rotating element E6, and iv) the input rotating element E4.

The first brake B1 selectively holds the second sun gear S2 of the first differential gear unit PR1 as one of the two stationary elements E5 of the reduction gear PR. When this first brake B1 is engaged, the rotation of the second rotating electrical machine MG2 that is drivingly connected to the first sun gear S1 that is the input rotating element E4 of the reduction gear PR is decelerated by the first differential gear unit PR1 and transmitted to the output member O. In this embodiment, this first brake B1 constitutes a first engagement device EE1 of the present invention. Also, as will be described later, a first split mode is realized by engaging this first brake B1, so this first brake B1 functions as a first split mode engagement device of the present invention.

The second brake B2 selectively holds the third ring gear R3 of the second differential gear unit PR2 as the other of the two stationary elements E5 of the reduction gear PR. When this second brake B2 is engaged, the rotation of the second rotating electrical machine MG2 that is drivingly connected to the third sun gear S3 that is the input rotating element E4 of the reduction gear PR is decelerated by the second differential gear unit PR2 and transmitted to the carrier CA0 that is the input rotating element E1 of the power split device PD. In this embodiment, this second brake B2 constitutes a second engagement device EE2 of the present invention. Also, as will be described later, a second split mode is realized by engaging this second brake B2, so this second brake B2 functions as a second split mode engagement device of the present invention.

Figure 17:
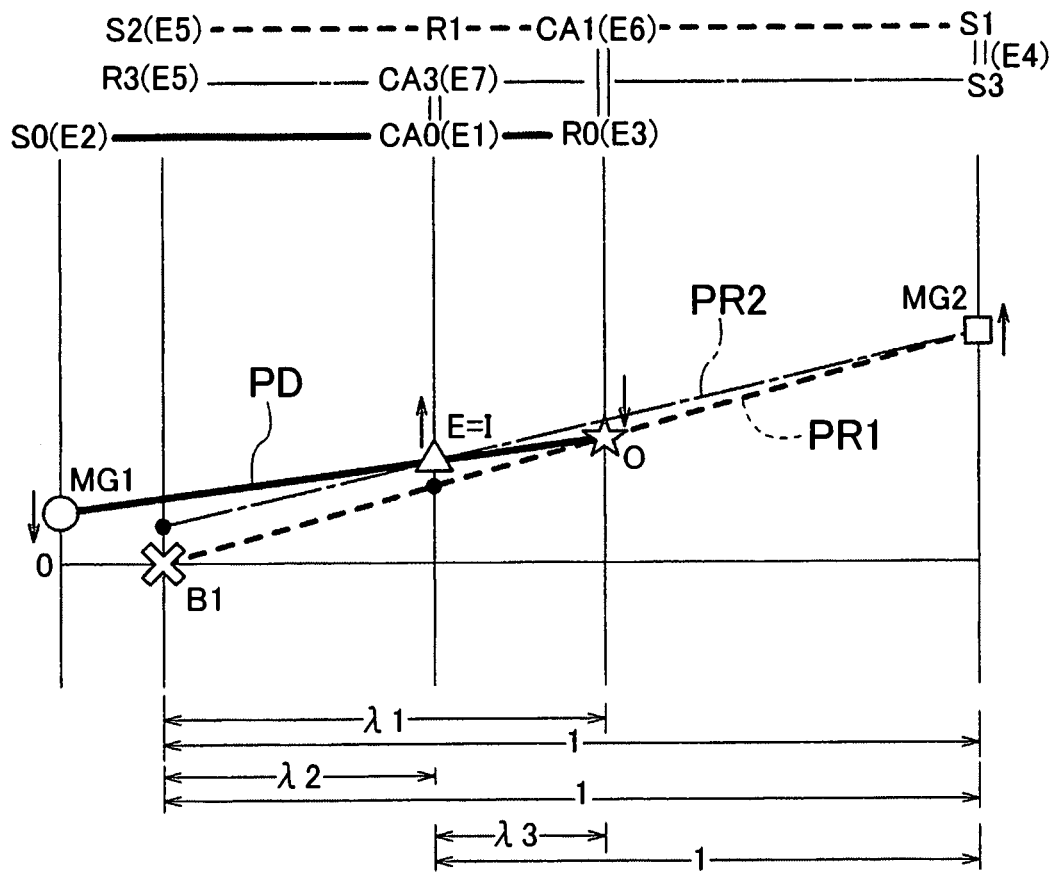
FIG. 17 is a velocity diagram of a first split mode according to the third embodiment of the present invention.

The third brake B3 selectively holds the common ring gear R1 of the first differential gear unit PR1. When this third brake B3 is engaged, the rotation of the second rotating electrical machine MG2 that is drivingly connected to the first sun gear S1 that is the input rotating element E4 of the reduction gear PR is decelerated by the first differential gear unit PR1 and transmitted to the output member O. Here, in order of rotation speed, the common ring gear R1 is placed between the second sun gear S2 (i.e., the stationary element E5) that is held by the first brake B1 and the common carrier CA1 (i.e., the first output rotating element E6) that is drivingly connected to the output member O. Therefore, the rotation that is transmitted from the second rotating electrical machine MG2 to the output member O when the third brake B3 is engaged is decelerated more than when the first brake B1 is engaged (i.e., the reduction gear ratio is larger). Incidentally, in this embodiment, the common ring gear R1 is set in the same position as the carrier CA0 of the power split device PD and the third carrier CA3 of the second differential gear unit PR2 in the velocity diagram as shown in FIG. 17. However, the common ring gear R1 may also be in a different position. In this embodiment, the third brake B3 constitutes a third engagement device EE3 of the present invention. Also, as will be described later, a third split mode is realized by engaging this third brake B3, so this third brake B3 functions as a third split mode engagement device.

In this embodiment, the first brake B1, the second brake B2, and the third brake B3 are all friction engagement devices. Multi-disc brakes that operate by hydraulic pressure may be used for these brakes. Similar to the first embodiment described with reference to FIG. 2, hydraulic pressure is supplied to these engagement devices B1, B2, and B3 from the hydraulic control apparatus 35 that operates in response to a control command from the main control unit 31. Engagement or release of these engagement devices B1, B2, and B3 is controlled by that hydraulic pressure. Hydraulic pressure generated by an oil pump, not shown, is supplied to this hydraulic control apparatus 35.

Incidentally, in the hybrid drive system H according to this embodiment, a mesh type engagement device may be used for the second brake B2 that is the second engagement device EE2. As will be described later, in this embodiment, the second brake B2 can be engaged when the second rotating electrical machine MG2 is not generating driving force. Therefore, even if the second brake B2 is formed by a mesh type engagement device, it is able to switch to an engaged state nicely. Also, if the second brake B2 is a mesh type engagement device, hydraulic pressure for generating engagement pressure or release pressure is not necessary so a loss of driving force due to the hydraulic pump can be suppressed and the transfer efficiency of the drive system can be easily increased compared with when this second brake B2 is a friction engagement device. Incidentally, in order to obviate the need for a supply of hydraulic pressure, the operation to switch this mesh type engagement device between an engaged state and a released state may be performed by an electromagnetic actuator. The hybrid drive system H according to this embodiment is based on a known hybrid drive system that is provided with only a first differential gear unit PR1 as the reduction gear PR and has a structure in which the rotation of the second rotating electrical machine MG2 is transmitted to the output member O via this kind of reduction gear PR, and realizes the second split mode by adding the second differential gear unit PR2 and the second brake B2 to this known hybrid drive system. This kind of structure obviates the need to newly design an oil path to supply hydraulic pressure to the second brake 132 that serves as the reaction force rotating element E2, which makes it possible to minimize changes to the case CS and the like.

3-2. Structure of the Control System of the Hybrid Drive System

The control system in this embodiment has generally the same structure as that shown in FIG. 2 according to the first embodiment described above, except that the engagement devices are changed from the clutches C1 and C2 to the brakes B1, B2, and B3. Also, in this embodiment, the mode selecting portion 42 selects a mode from among a first split mode, a second split mode, a third split mode, a first parallel mode, and a second parallel mode, as hybrid operating modes, according to the vehicle speed and the required driving force using the control map 45. Also, just as in the first embodiment, the mode selecting portion 42 may also select a second rotating electrical machine disconnected mode (i.e., MG2 disconnected mode). When selecting a hybrid operating mode, the third split mode, the first split mode, the second parallel mode, and the second split mode are selected fundamentally in that order as the vehicle speed increases. The first parallel mode is able to be switched into appropriately according to the required driving force and the state-of-charge (SOC) of the batter 21 and the like while the vehicle is running in the third split mode.

3-3. Operating Modes of the Hybrid Drive System

Figures 15, 16:
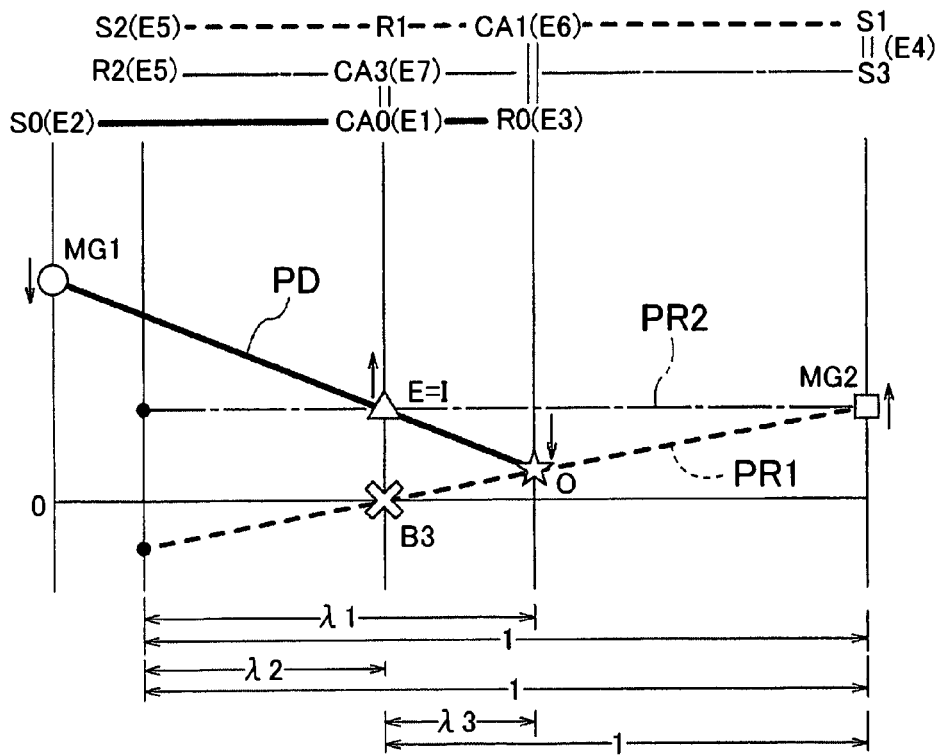
FIG. 15 is an operation table showing the operating states of a plurality of engagement devices in each mode according to the third embodiment of the present invention.
FIG. 16 is a velocity diagram of a third split mode according to the third embodiment of the present invention.

Next, the operating modes that can be realized by the hybrid drive system H according to this embodiment will be described. FIG. 15 is an operation table showing the operating states of the first brake B1 (i.e., the first engagement device EE1), the second brake B2 (i.e., the second engagement device EE2), and the third brake B3 (i.e., the third engagement device EE3) in each operating mode. In the table, a circle indicates that the corresponding engagement device is engaged (i.e., connected), and the absence of a circle indicates that the corresponding device is released (i.e., disconnected).

FIGS. 16 to 20 are velocity diagrams that show the operating states of the power split device PD, the first differential gear unit PR1, and the second differential gear unit PR2 in each operating mode. The description method of these velocity diagrams is the same as it is with FIGS. 5A and 5B according to the first embodiment described above. However, the plurality of vertical axes that are arranged parallel with one another correspond to the rotating elements of the power split device PD, the first differential gear unit PR1, and the second differential gear unit PR2. The "S0", "CA0", and "R0" above the vertical axes correspond to the sun gear S0, the carrier CA0, and the ring gear R0 of the power split device PD, respectively, the "S1", "CA1", "R1", and "S2" above the vertical axes correspond to the first sun gear S1, the common carrier CA1, the common ring gear R1, and the second sun gear S2 of the first differential gear unit PR1, respectively, and the "S3", "CA3", and "R3" above the vertical axes correspond to the third sun gear S3, the third carrier CA3, and the third ring gear R3 of the second differential gear unit PR2, respectively. The "=" that connects the reference characters of rotating elements above the vertical axes indicates that a plurality of rotating elements are drivingly connected so as to rotate together. Also, an "x" in the drawings indicates that the corresponding rotating element is held to a case CS which is a non-rotating member. The reference character "B1", "B2", or "B3" accompanying that "x" indicates that the rotating element is held by engagement of the first brake B1, the second brake 132, or the third brake B3. Hereinafter, the operating state of the hybrid drive system H in each of the plurality of operating modes will be described in detail.

3-4. Third Split Mode

The third split mode is an operating mode selected for the lowest vehicle speed range, from among the three split modes. In this operating mode, the rotation of the second rotating electrical machine MG2 is decelerated by the reduction gear PR and that driving force is transmitted to the output member O, while driving force from the engine E is split by the power split device PD and transmitted to the output member O. Also, the first rotating electrical machine MG1 is made to generate reaction force which enables the driving force from the engine E (i.e., the input member I) to be transmitted to the output member O via the power split device PD. Meanwhile, the second rotating electrical machine MG2 works to compensate for the shortage of driving force from the engine E. Accordingly, the operation of the parts in the third split mode resemble that in a first split mode which will be described later, but differ in that when the rotation of the second rotating electrical machine MG2 is transmitted to the output member O, that rotation is decelerated more than it is in the first split mode (i.e., the reduction gear ratio is larger).

As shown in FIG. 15, the third split mode is realized by engaging the third brake 133 and releasing both the first brake 131 and the second brake B2. FIG. 16 is a velocity diagram of this third split mode. The driving force transmitted from the engine E to the carrier CA0 of the power split device PD via the input member I is split by the power split device PD and transmitted to the output member O. At this time, the first rotating electrical machine MG1 operates as a reaction force receiver.

In the third split mode, the second brake B2 is released so the third ring gear R3 is able to rotate freely. As a result, the second differential gear unit PR2 of the reduction gear PR is placed in a state in which it essentially does not function. Also, the first brake B1 is released so the second sun gear S2 of the first differential gear unit PR1 is also able to rotate freely. Also, engaging the third brake 133 results in the rotation and driving force of the first sun gear S1 that rotates together with the rotor Rot of the second rotating electrical machine MG2 being decelerated by the first differential gear unit PR1 and transmitted to the common carrier CA1. Here, the common carrier CA1 is drivingly connected to the output member O so as to rotate together with the output member O, so the decelerated rotation and driving force of the second rotating electrical machine MG2 are transmitted to the output member O via the common carrier CA1. More specifically, as shown in the lower part of the velocity diagram in FIG. 16, in the third split mode, the rotation speed of the second rotating electrical machine MG2 is decelerated "$\gamma 3$" times ($\gamma 3 < \gamma 1 < 1$) and transmitted to the output member O. The reduction gear ratio at this time is "$1/\gamma 3$". Accordingly, the torque of the second rotating electrical machine MG2 is multiplied "$1/\gamma 3$" times and transmitted to the output member O. In this third split mode, the rotation of the input rotating element E4 (i.e., the first sun gear S1) that is decelerated by the reduction gear PR and transmitted to the output member O via the first output rotating element E6 (i.e., the common carrier CA1) corresponds to third decelerated rotation of the present invention. This third decelerated rotation is decelerated more than first decelerated rotation in the first second split mode that will be described later (i.e., the reduction gear ratio is larger), so the third decelerated rotation is slower than the first decelerated rotation with respect to the same rotation of the input rotating element E4.

Providing this kind of third split mode makes it possible to, in a split mode that transmits the rotation of the second rotating electrical machine MG2 to the output member O, multiply the torque of the second rotating electrical machine MG2 more than the first split mode and transmit that multiplied torque to the output member O. Accordingly, compared with the system according to the first embodiment or the second embodiment, the vehicle can be driven with greater driving force, or the size of the second rotating electrical machine MG2 can be reduced while maintaining the same driving force.

In this third split mode, the first rotating electrical machine MG1 is controlled, according to the vehicle speed and the required driving force and the like, to output an appropriate rotation speed and torque so that the engine E can be operated with good fuel efficiency. That is, the power split device PD distributes the driving force from the engine E to the output member O and the first rotating electrical machine MG1 while the engine operates in a good fuel efficient state. In this state, the first rotating electrical machine MG1 generates power by outputting MG1 torque T1 in the negative direction when rotating in the positive direction.

3-5. First Split Mode

The first split mode is an operating mode that is selected in the middle vehicle speed range, from among the three split modes. In this operating mode, the rotation of the second rotating electrical machine MG2 is decelerated by the reduction gear PR and that driving force is transmitted to the output member O, while driving force from the engine E is split by the power split device PD and transmitted to the output member O. Also, the first rotating electrical machine MG1 is made to generate reaction force which enables the driving force from the engine E (i.e., the input member I) to be transmitted to the output member O via the power split device PD. Meanwhile, the second rotating electrical machine MG2 works to compensate for the shortage of driving force from the engine E. Accordingly, the operation of the parts in the first split mode resemble that in a third split mode described above, but differ in that the reduction gear ratio when the rotation of the second rotating electrical machine MG2 is transmitted to the output member O is smaller than it is in the third split mode.

The first split mode is realized by engaging the first brake B1 and releasing both the second brake B2 and the third brake B3, as shown in FIG. 15. FIG. 17 is a velocity diagram of this first split mode. The driving force transmitted from the engine E to the carrier CA0 of the power split device PD via the input member I is split by the power split device PD and transmitted to the output member O. At this time, the first rotating electrical machine MG1 operates as a reaction force receiver.

In the first split mode, the second brake B2 is released so the third ring gear R3 is able to rotate freely. As a result, the second differential gear unit PR2 of the reduction gear PR is placed in a state in which it essentially does not function. Also, the third brake B3 is released so the common ring gear R1 of the first differential gear unit PR1 is also able to rotate freely. Also, engaging the first brake B1 results in the rotation and driving force of the first sun gear S1 that rotates together with the rotor Ro2 of the second rotating electrical machine MG2 being decelerated by the first differential gear unit PR1 and transmitted to the common carrier CA1. Here, the common carrier CA1 is drivingly connected to the output member O so as to rotate together with the output member O, so the decelerated rotation and driving force of the second rotating electrical machine MG2 are transmitted to the output member O via the common carrier CA1. More specifically, as shown in the lower part of the velocity diagram in FIG. 17, in the first split mode, the rotation speed of the second rotating electrical machine MG2 is decelerated "$\gamma 1$" times ($\gamma 3 < \gamma 1 < 1$) and transmitted to the output member O. The reduction gear ratio at this time is "$1/\gamma 1$". Accordingly, the torque of the second rotating electrical machine MG2 is multiplied "$1/\gamma 1$" times and transmitted to the output member O. In this first split mode, the rotation of the input rotating element E4 (i.e., the first sun gear S1) that is decelerated by the reduction gear PR and transmitted to the output member O via the first output rotating element E6 (i.e., the common carrier CA1) corresponds to first decelerated rotation of the present invention. This first decelerated rotation is not decelerated as much as the third decelerated rotation or second decelerated rotation that will be described later (i.e., the reduction gear ratio is smaller), so the first decelerated rotation is faster than the third decelerated rotation and the second decelerated rotation with respect to the same rotation of the input rotating element E4.

In this first split mode, the first rotating electrical machine MG1 is controlled, according to the vehicle speed and the required driving force and the like, to output an appropriate rotation speed and torque so that the engine E can be operated with good fuel efficiency. That is, the power split device PD distributes the driving force from the engine E to the output member O and the first rotating electrical machine MG1 while the engine operates in a good fuel efficient state. In this state, the first rotating electrical machine MG1 generates power by outputting MG1 torque T1 in the negative direction when rotating in the positive direction. Also, the rotation speed of the first rotating electrical machine MG1 decreases as the rotation of the output member O increases, with the rotation of the first rotating electrical machine MG1 becoming negative rotation past 0. During this kind of negative rotation, the first rotating electrical machine MG1 performs powering by outputting torque in the negative direction.

3-6. Second Split Mode

Figure 18:
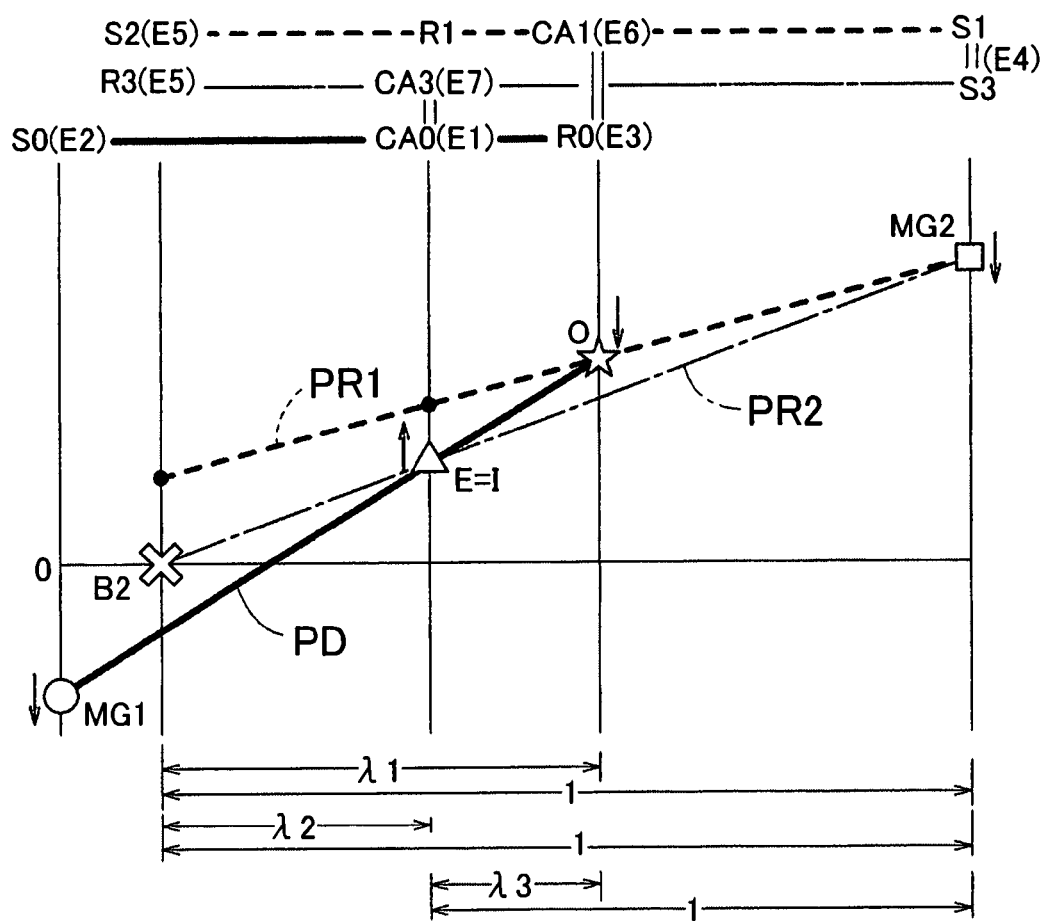
FIG. 18 is a velocity diagram of a second split mode according to the third embodiment of the present invention.

The second split mode is an operating mode that is selected in the highest vehicle speed range, from among the three split modes. In this operating mode, the rotation of the second rotating electrical machine MG2 is decelerated by the reduction gear PR and that driving force is transmitted to the carrier CA0, while the driving force from the engine E is split by the power split device PD and transmitted to the output member O. Also, the driving force from the engine E (i.e., the input member I) is able to be transmitted to the output member O via the power split device PD by having the first rotating electrical machine MG1 generate reaction force. However, as is shown in FIG. 18, this second split mode is selected in a range where the rotation speed of the output member O is high and the rotation speed of the first rotating electrical machine MG1 is negative. At this time, the first rotating electrical machine MG1 performs powering by outputting torque in the negative direction while rotating in the negative direction, and the second rotating electrical machine MG2 generates power to enable the first rotating electrical machine MG1 to perform powering. Accordingly, the second split mode is better suited for running in a high vehicle speed range than the first split mode or the third split mode is.

The second split mode is realized by engaging the second brake B2 and releasing both the first brake 81 and the third brake B3, as shown in FIG. 15. FIG. 18 is a velocity diagram of this second split mode. In this operating mode, the vehicle speed is a high speed and the running torque is relatively low. Similar to the first split mode and the third split mode, the driving force transmitted from the engine E to the carrier CA0 of the power split device PD via the input member I is split by the power split device PD and transmitted to the output member O. At this time, the first rotating electrical machine MG1 operates as a reaction force receiver.

In the second split mode, the first brake B1 and the third brake B3 released so the second sun gear S2 and the common ring gear R1 of the first differential gear unit PR1 are able to rotate freely. As a result, the first differential gear unit PR1 of the reduction gear PR is placed in a state in which it essentially does not function. Also, engaging the second brake B2 results in the rotation and driving force of the third sun gear S3 that rotates together with the rotor Rot of the second rotating electrical machine MG2 being decelerated by the second differential gear unit PR2 and transmitted to the third carrier CA3. Here, the third carrier CA3 is drivingly connected to the carrier CA0 and the input member I so as to rotate together with the carrier CA0 and the input member I, so the decelerated rotation and driving force of the second rotating electrical machine MG2 are transmitted to the carrier CA0 of the power split device PD and the input member I via the third carrier CA3. More specifically, as shown in the lower part of the velocity diagram in FIG. 18, in the second split mode, the rotation speed of the second rotating electrical machine MG2 is decelerated "$\gamma 2$" times ($\gamma 2 < \gamma 1 < 1$) and transmitted to the carrier CA0 of the power split device PD. The reduction gear ratio at this time is "$1/\gamma 2$". Accordingly, the torque of the second rotating electrical machine MG2 is multiplied "$1/\gamma 2$" times and transmitted to the carrier CA0 of the power split device PD. In this second split mode, the rotation of the input rotating element E4 (i.e., the third sun gear S3) that is decelerated by the reduction gear PR and transmitted to the input rotating element E1 (i.e., the carrier CA0) of the power split device PD via the second output rotating element E7 (i.e., the third carrier CA3) corresponds to second decelerated rotation of the present invention. This second decelerated rotation is decelerated more than the first decelerated rotation (i.e., the reduction gear ratio is larger), so the second decelerated rotation is slower than the first decelerated rotation with respect to the same rotation of the input rotating element E4.

In this second split mode, the first rotating electrical machine MG1 is controlled, according to the vehicle speed and the required driving force and the like, to output an appropriate rotation speed and torque so that the engine E can be operated with good fuel efficiency. That is, the first rotating electrical machine MG1 performs powering so that the engine E can operate in a good fuel efficient state. In this state, the first rotating electrical machine MG1 operates as a reaction force receiver. Meanwhile, the driving force from the engine E is increased by the second differential gear unit PR2 of the reduction gear PR and transmitted to the second rotating electrical machine MG2. In this state, the second rotating electrical machine MG2 generates power. That is, in the second split mode, the second rotating electrical machine MG2 is rotated by the driving force transmitted from the engine E (i.e., the input member I), and generates power by outputting torque in the negative direction while rotating in the positive direction. In this state, the driving force generated by the engine E is split and transmitted to the second rotating electrical machine MG2 and the output member O by the operation of the power split device PD and the second differential gear unit PR2 of the reduction gear PR. At this time, the second differential gear unit PR2 of the reduction gear PR operates as a speed-increasing gear when viewed from the power split device PD side, and operates as a speed-decreasing gear when viewed from the second rotating electrical machine MG2 side. Providing this kind of second split mode makes it possible to suppress power circulation when the vehicle is running at a high speed, just like the first embodiment described above, as well as to reduce the reaction force of the first rotating electrical machine MG1, thus enabling energy efficiency to be increased.

3-7. First Parallel Mode

Figure 19:
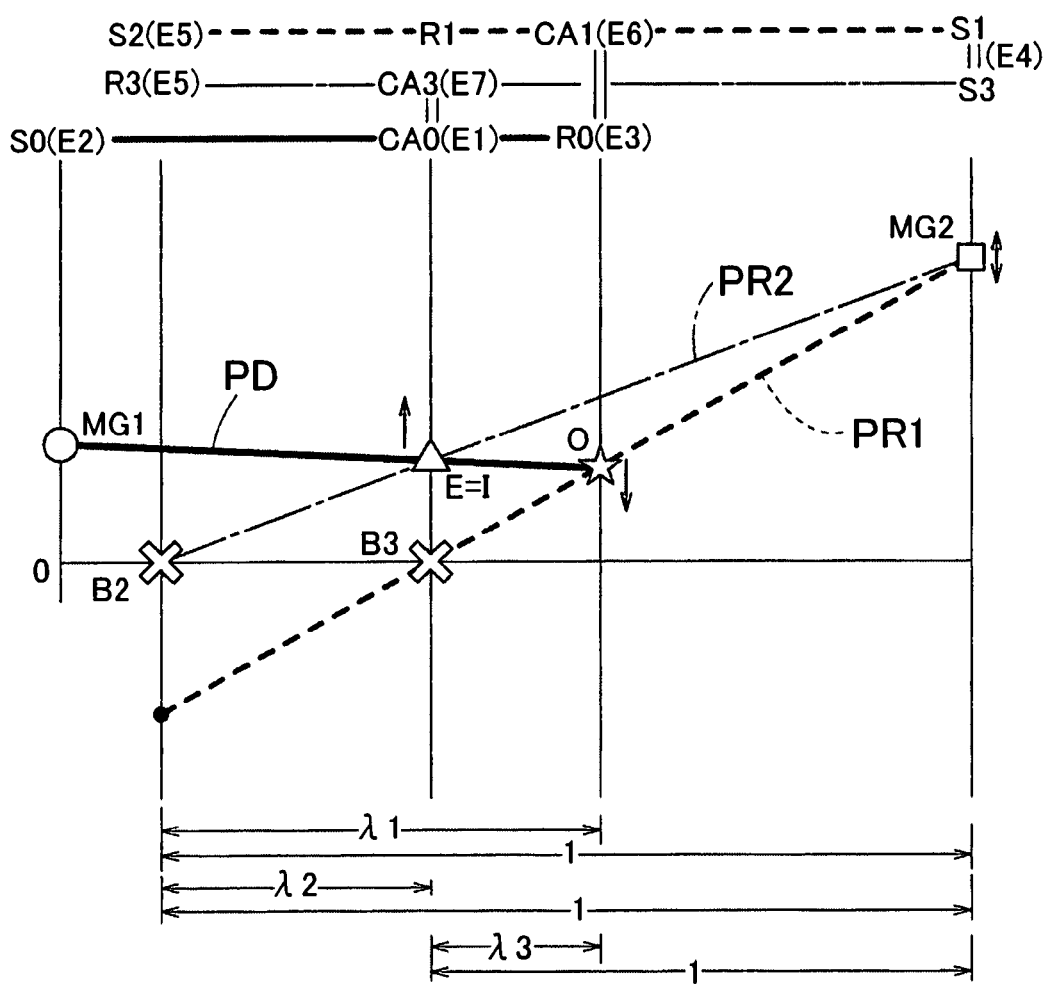
FIG. 19 is a velocity diagram of a first parallel mode according to the third embodiment of the present invention.

The first parallel mode is an operating mode that is selected in the lower vehicle speed range than the second parallel mode, from among the two parallel modes. FIG. 19 is a velocity diagram of this first parallel mode. As is evident from the drawing, in this first parallel mode, the relationship of the rotation speeds of the rotating elements of the power split device PD and the reduction gear PR is constant, so if the rotation speed of any one rotating element is determined, the rotation speeds of the other rotating elements also become determined. In this operating mode, the first rotating electrical machine MG1 and the second rotating electrical machine MG2 both rotate in the positive direction but basically do not generate driving force. This first parallel mode is better suited for running in a relatively high vehicle speed range when the required driving force is low than the third split mode is. Incidentally, the first parallel mode is a mode that can be switched into appropriately according to the required driving force or the state-of-charge of the battery 21 or the like, while running in the third split mode.

As shown in FIG. 15, the first parallel mode is realized by engaging both the second brake B2 and the third brake B3, and releasing the first brake B1. Engaging the third brake B3 restricts the ratio of the rotation speed of the first sun gear S1 to the rotation speed of the common carrier CA1 so that it is constant. Also, engaging the second brake B2 restricts the ratio of the rotation speed of the third sun gear S3 to the rotation speed of the third carrier CA3 so that it is constant. Accordingly, the ratio of the rotation speed of the ring gear R0 of the power split device PD that rotates together with the common carrier CA1 and the rotation speed of the carrier CA0 of the power split device PD that rotates together with the third carrier CA3 is restricted to being constant. As a result, the ratios of the rotation speeds of all of the rotating elements of the reduction gear PR and the power split device PD are restricted to being constant. Accordingly, in this operating mode, running can be performed using the driving force from the engine E. The first rotating electrical machine MG1 is controlled to a state in which it neither generates power nor performs powering, or a state in which it generates power to operate accessories. Also, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

3-8. Second Parallel Mode

Figure 20:
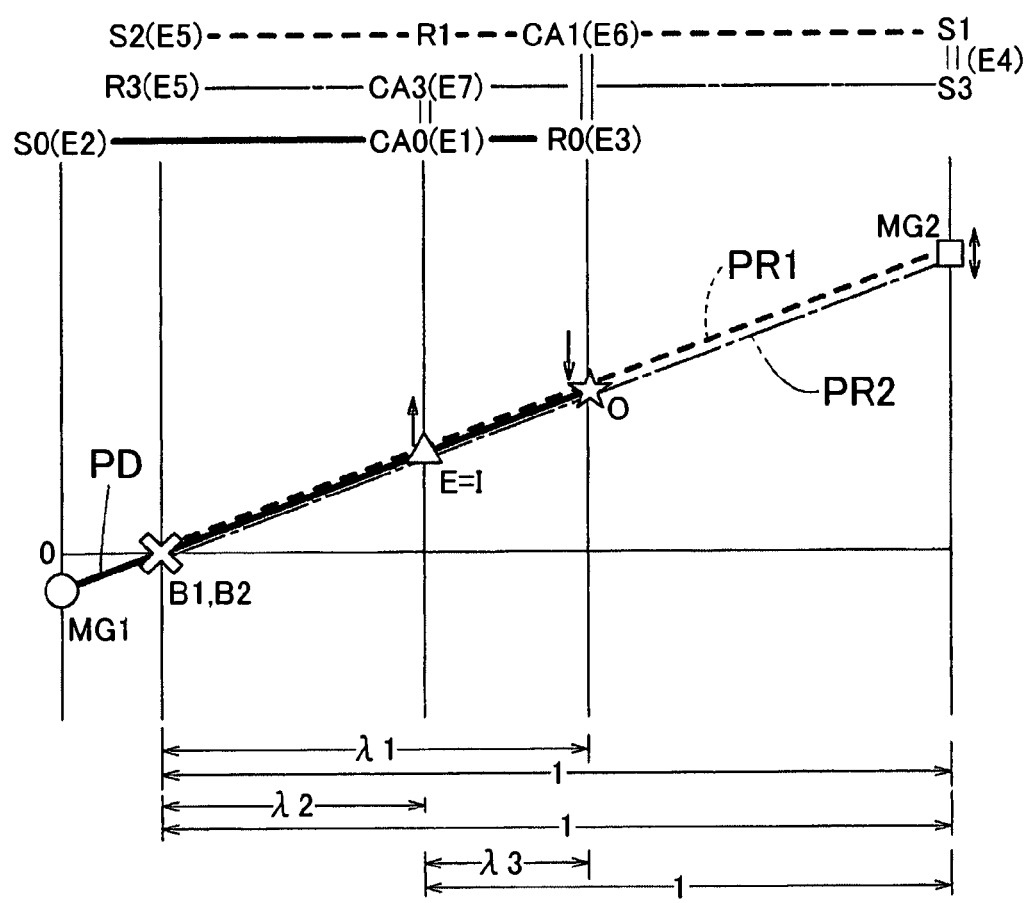
FIG. 20 is a velocity diagram of a second parallel mode according to the third embodiment of the present invention.

The second parallel mode is an operating mode that is selected in the higher vehicle speed range than the first parallel mode, from among the two parallel modes. FIG. 20 is a velocity diagram of this second parallel mode. As is evident from the drawing, in this second parallel mode, the relationship of the rotation speeds of the rotating elements of the power split device PD and the reduction gear PR is constant, so if the rotation speed of any one rotating element is determined, the rotation speeds of the other rotating elements also become determined. Moreover, in the second parallel mode, the speed line of the power split device PD and the speed lines of first differential gear unit PR1 and the second differential gear unit PR2 that form the reduction gear PR overlap on a straight line. In this operating mode, the rotation of the first rotating electrical machine MG1 is made slightly negative, while the second rotating electrical machine MG2 is placed in a state in which it fundamentally does not generate driving force. This second parallel mode is better suited for running in a high vehicle speed range when the required driving force is low than the first split mode is.

As shown in FIG. 15, the second parallel mode is realized by engaging both the first brake B1 and the second brake B2, and releasing the third brake B3. Engaging both the first brake B1 and the second brake B2 results in both the second sun gear S2 and the third ring gear R3, which are the two stationary elements E5 of the reduction gear PR, being held to the case CS which is a non-rotating member. As a result, the power split device PD, the first differential gear unit PR1, and the second differential gear unit PR2 together form a differential gear unit having five elements in all. As a result, the ratios of the rotation speeds of all of the rotating elements of the reduction gear PR and the power split device PD are restricted to being constant. In this operating mode, running can be performed using the driving force from the engine E. The first rotating electrical machine MG1 is controlled to a state in which it neither generates power nor performs powering while it rotates at low speed, or a state in which it generates power to operate accessories. In this state, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

3-9. Switching Operating Modes

A switch between the third split mode and the first split mode is performed by changing over the first brake B1 and the third brake B3. Adjusting the rotation speed of the second rotating electrical machine MG2 makes it possible to adjust the rotation speed of the second sun gear S2 that is held by the first brake B1 so that it is close to zero when switching from the third split mode to the first split mode, and adjust the rotation speed of the common ring gear R1 that is held by the third brake B3 so that it is close to zero when switching from the first split mode to the third split mode. However, in order switch modes rapidly, the first brake B1 and the third brake B3 basically need to be engaged while there is a difference in the rotation speeds of the engagement members on both sides. Therefore, the first brake B1 and the third brake B3 may be formed by friction engagement devices.

A switch between the third split mode and the first parallel mode is performed by engaging or releasing the second brake B2 while the third brake B3 remains engaged. As the rotation speed of the output member O increases while the vehicle is running in the third split mode, the rotation speed of the third ring gear R3 gradually decreases. The switch to the first parallel mode can be made by engaging the second brake B2 when the rotation speed of the third ring gear R3 is "0". Also, a switch from the first parallel mode into the third split mode can be performed simply by releasing the second brake B2. Accordingly, the switch between the third split mode and the first parallel mode can be a synchronized switch that engages the second brake B2 when the rotation speed of the third ring gear R3 that is held by the second brake B2 is "0". Therefore, according to the structure in this application, with a switch between the third split mode and the first parallel mode, it is not necessary to place the speed change mechanism in a neutral state as is common with the related art.

Also, a switch between the second parallel mode and the first split mode or the second split mode is performed by switching the engagement or release of the first brake B1 and the second brake B2. In the second parallel mode, the speed line of the power split device PD and the speed lines of the first differential gear unit PR1 and the second differential gear unit PR2 that form the reduction gear PR overlap, as is also shown in FIG. 20. Therefore, when switching from the second split mode or the first split mode into the second parallel mode, the switch can be a synchronized switch that engages the first brake B1 or the second brake B2 while the rotation speed of the second sun gear S2 of the first differential gear unit PR1 that is held by the first brake B1, or the third ring gear R3 of the second differential gear unit PR2 that is held by the second brake B2, is "0". Also, a switch from the second parallel mode into the first split mode or the second split mode can be performed by simply releasing the first brake B1 or the second brake B2. Therefore, according to the structure in this application, with a switch between the first split mode or the second split mode and the second parallel mode, it is not necessary to place the speed change mechanism in a neutral state as is common with the related art.

As described above, of the three engagement devices B1, B2, and B3, the second brake B2 is always engaged when the rotation speeds of the engagement members on both sides are the same (in this case, when the rotation speeds are "0"). Also, when engaging the second brake B2 in this way, the torque of the second rotating electrical machine MG2 can be controlled to "0". Also at this time, fluctuation in the torque transmitted to the output member O can be suppressed by adjusting the torque of the engine E. Performing this type of control enables the first brake B1 that serves as the second engagement device EE2 (i.e., the second split mode engagement device) to be formed by a mesh type engagement device.

3-10. MG2 Disconnected Mode

In the hybrid drive system H according to this embodiment, the MG2 disconnected mode that transmits driving force output from the engine E to the output member O can also be realized by releasing all of the engagement devices, i.e., the first brake B1, the second brake B2, and the third brake B3, and controlling the rotation and driving force of the first rotating electrical machine MG1. At this time, the first rotating electrical machine MG1 may be controlled to generate power to operate accessories, while outputting the reaction force of the engine torque.

4. Fourth Embodiment

Figure 21:
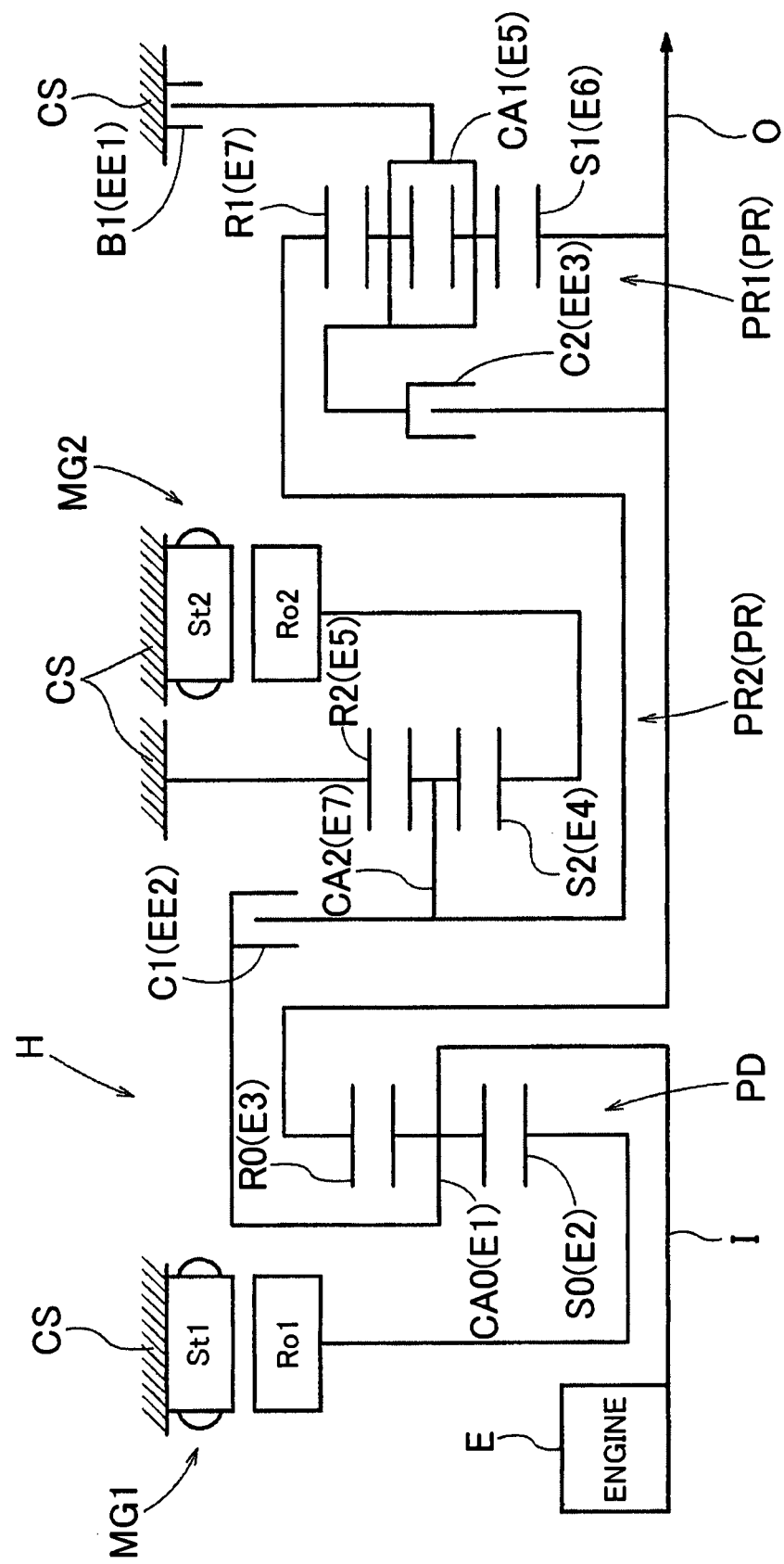
FIG. 21 is a skeleton view of the structure of a hybrid drive system according to a fourth embodiment of the present invention.

Next, a fourth embodiment of the present invention will be described. FIG. 21 is a skeleton view of the structure of the hybrid drive system H according to this embodiment. Incidentally, a portion of the axisymmetric structure is omitted in FIG. 21, just as it is FIG. 1. The hybrid drive system H according to this embodiment is able to realize a first split mode, a second split mode, a third split mode, a first parallel mode, and a second parallel mode, similar to the third embodiment described above. However, the structures of the reduction gear PR and the three engagement devices differ from those in the third embodiment described above. Hereinafter, mainly the differences between the hybrid drive system H according to this embodiment and the hybrid drive system H according to the third embodiment described above will be described. Incidentally, those points that are not specifically described are similar to those the third embodiment described above.

4-1. Mechanical Structure of the Hybrid Drive System

In this embodiment as well, the structure of the power split device PD is similar to that in the third embodiment (and the first embodiment) described above. However, the structure of the reduction gear PR differs from that in the third embodiment. That is, in this embodiment, the reduction gear PR is formed of a combination of a first differential gear unit PR1 and a second differential gear unit PR2, each of which has three rotating elements, as shown in FIG. 21.

The first differential gear unit PR1 is a differential gear unit that has three rotating elements. Here, the first differential gear unit PR1 is formed from a double pinion type planetary gear set. That is, the first differential gear unit PR1 has, as rotating elements, a first carrier CA1 that supports a plurality of pairs of pinion gears, a first sun gear S1 that meshes with one of those pairs of pinion gears, and a first ring gear R1 that meshes with the other pair of pinion gears. The first sun gear S1 is drivingly connected to the ring gear R0 (i.e., the output rotating element E3) of the power split device PD so as to rotate together with the ring gear R0, and is also drivingly connected to the output member O. Accordingly, the first sun gear S1 is a first output rotating element E6 of the reduction gear PR. The first carrier CA1 is selectively held to the case CS, which is a non-rotating member, by the first brake B1. Therefore, when held by the first brake B1, the first carrier CA1 is a stationary element E5 of the reduction gear PR. Also, the first carrier CA1 is selectively drivingly connected to the first sun gear S and the output member O via the second clutch C2. The first ring gear R1 is drivingly connected to the second carrier CA2 of the second differential gear unit PR2 so as to rotate together with the second carrier CA2, and is also drivingly connected to the carrier CA0 of the power split device PD and the input member I via the first clutch C1. Accordingly, this first ring gear R1 of the first differential gear unit PR1 and the second carrier CA2 of the second differential gear unit PR2 together constitute a second output rotating element E7 of the reduction gear PR. The three rotating elements of the first differential gear unit PR1 are, in order of rotation speed, the first carrier CA1, the first ring gear R1, and the first sun gear S1. Accordingly, in this embodiment, the first carrier CA1 is a first rotating element of the first differential gear unit PR1, the first ring gear R1 is a second rotating element of the first differential gear unit PR1, and the first sun gear S1 is a third rotating element of the first differential gear unit PR1.

The second differential gear unit PR2 is a differential gear unit that has three rotating elements. In this case, the second differential gear unit PR2 is formed by a single pinion type planetary gear set. That is, the second differential gear unit PR2 has, as rotating elements, a second carrier CA2 that supports a plurality of pinion gears, and a second sun gear S2 and a second ring gear R2 that are both in mesh with those pinion gears. As described above, the second sun gear S2 is drivingly connected to the rotor Ro2 of the second rotating electrical machine MG2 so as to rotate together with the rotor Ro2. Therefore, the second sun gear S2 of the second differential gear unit PR2 is an input rotating element E4 of the reduction gear PR. The second carrier CA2 is drivingly connected to the first ring gear R1 of the first differential gear unit PR1 so as to rotate together with the first ring gear R1, and is also selectively connected to the carrier CA0 of the power split device PD and the input member I via a first clutch C1, and thus is a second output rotating element E7 of the reduction gear PR. The second ring gear R2 is selectively held to the case CS, which is a non-rotating member. Accordingly, this second ring gear R2 is a stationary element E5 of the reduction gear PR. The three rotating elements of the second differential gear unit PR2 are, in order of rotation speed, the second ring gear R2, the second carrier CA2, and the second sun gear S2. Accordingly, in this embodiment, the second ring gear R2 is a first rotating element of the second differential gear unit PR2, the second carrier CA2 is a second rotating element of the second differential gear unit PR2, and the second sun gear S2 is a third rotating element of the second differential gear unit PR2.

As described above, the reduction gear PR is formed by drivingly connecting one rotating element (the first ring gear R1 in this case) of the first differential gear unit PR1 that has three rotating elements to one rotating element (the second carrier CA2 in this case) of the second differential gear unit PR2 that has three rotating elements so that those two rotating elements rotate together. Accordingly, the reduction gear PR is a differential gear unit that has five rotating elements in all. As shown in the upper parts of the velocity diagrams in FIGS. 23 to 27, these five rotating elements of the reduction gear PR are, in order of rotation speed, the first carrier CA1 and the second ring gear R2 that rotate independently of each other, the first ring gear R1 and the second carrier CA2 that rotate together, the first sun gear S1, and the second sun gear S2. In other words, the order of rotation speed of these five rotating elements of the reduction gear PR is i) the two stationary elements E5, ii) the second output rotating element E7, iii) the first output rotating element E6, and iv) the input rotating element E4.

Figure 24:
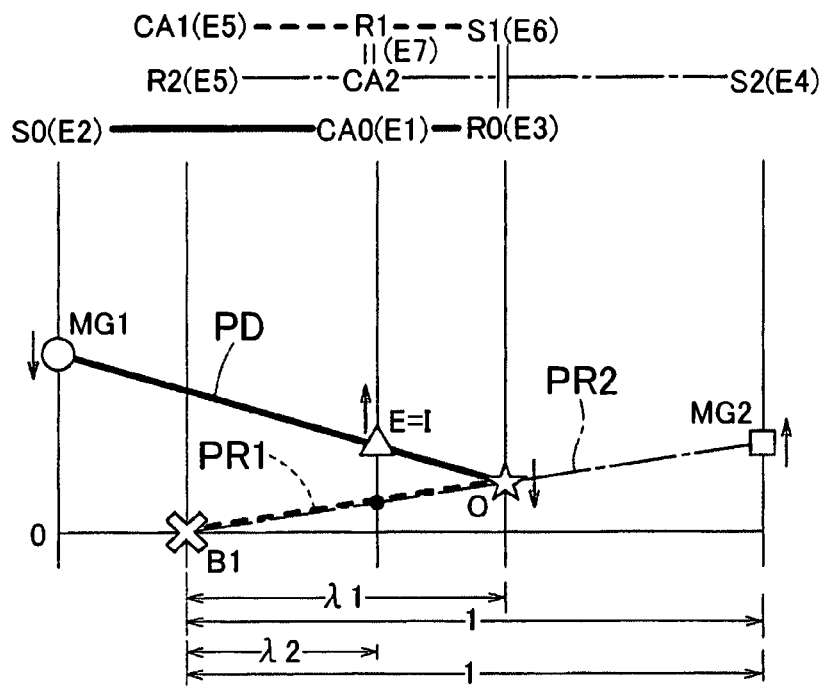
FIG. 24 is a velocity diagram of a first split mode according to the fourth embodiment of the present invention.

The first brake B1 selectively holds the first carrier CA1 of the first differential gear unit PR1 as one of the two stationary elements E5 of the reduction gear PR. When this first brake B1 is engaged, the first carrier CA1 and the second ring gear R2, which are the two stationary elements E5 of the reduction gear PR, are both held to the case CS. Accordingly, the first differential gear unit PR1 and the second differential gear unit PR2 that form the reduction gear PR together form a differential gear unit having four elements in all, as shown in FIG. 24, for example. Therefore, the rotation of the second rotating electrical machine MG2 that is drivingly connected to the second sun gear S2 that is the input rotating element E4 of the reduction gear PR is decelerated by the first differential gear unit PR1 and the second differential gear unit PR2 and transmitted to the output member O. In this embodiment, this first brake B1 constitutes a first engagement device EE1 of the present invention. Also, as will be described later, a first split mode is realized by engaging this first brake B1, so this first brake B1 functions as a first split mode engagement device of the present invention.

The first clutch C1 selectively drivingly connects or disconnects the carrier CA0 which is the input rotating element E1 of the power split device PD to or from the second carrier CA2 and the first ring gear R1 which together constitute the second output rotating element E7 of the reduction gear PR. Accordingly, the first clutch C1 constitutes a second engagement device EE2 of the present invention. When this first clutch C1 is engaged, the first ring gear R1 and the second carrier CA2 of the reduction gear PR are drivingly connected to the carrier CA0 of the power split device PD. When the first clutch C1 is released, the first ring gear R1 and the second carrier CA2 of the reduction gear PR are drivingly disconnected from the carrier CA0 of the power split device PD. As will be described later, a second split mode is realized by engaging this first clutch C1, so the first clutch C1 that is the second engagement device EE2 functions as a second split mode engagement device.

The second clutch C2 is an engagement device that selectively drivingly connects two of the three rotating elements of the first differential gear unit PR1 that forms the reduction gear PR so that they rotate together, or disconnects two of the three rotating elements of the first differential gear unit PR1 that forms the reduction gear PR. In this embodiment, the second clutch C2 is structured to selectively drivingly connect or disconnect the first carrier CA1 of the first differential gear unit PR1 to or from the first sun gear S1 and the output member O. When this second clutch C2 is engaged, the first differential gear unit PR1 is in a directly connected state in which the three rotating elements all rotate together at the same speed. Accordingly, the first differential gear unit PR1 transmits the rotation and driving force of the second rotating electrical machine MG2 that have been decelerated by the second differential gear unit PR2 and transmitted to the second carrier CA2 to the output member O at the same speed via the first ring gear R1 that is drivingly connected to the second carrier CA2. In this embodiment, the second clutch C2 constitutes a third engagement device EE3 of the present invention. Also, as will be described later, a third split mode is realized by engaging this second clutch C2, so this second clutch C2 functions as a third split mode engagement device.

In this embodiment, the first brake B1, the first clutch C1, and the second clutch C2 are all friction engagement devices. Multi-disc brakes or multi-disc clutches that operate by hydraulic pressure may be used for these engagement devices. Similar to the first embodiment described with reference to FIG. 2, hydraulic pressure is supplied to these engagement devices B1, C1, and C2 from the hydraulic control apparatus 35 that operates in response to a control command from the main control unit 31. Engagement or release of these engagement devices B1, C1, and C2 is controlled by that hydraulic pressure. Hydraulic pressure generated by an oil pump, not shown, is supplied to this hydraulic control apparatus 35.

Incidentally, in the hybrid drive system H according to this embodiment, a mesh type engagement device may be used for the first clutch C1 that is the second engagement device EE2. As will be described later, in this embodiment, the first clutch C1 can be engaged when the second rotating electrical machine MG2 is not generating driving force. Therefore, even if the first clutch C1 is formed by a mesh type engagement device, it is able to switch to an engaged state nicely. Also, if the first clutch C1 is a mesh type engagement device, hydraulic pressure for generating engagement pressure or release pressure is not necessary so a loss of driving force due to the hydraulic pump can be suppressed and the transfer efficiency of the drive system can be easily increased compared with when this first clutch C1 is a friction engagement device. Incidentally, in order to obviate the need for a supply of hydraulic pressure, the operation to switch this mesh type engagement device between an engaged state and a released state may be performed by an electromagnetic actuator.

4-2. Structure of the Control System of the Hybrid Drive System

The control system in this embodiment has generally the same structure as that according to the third embodiment described above with reference to FIG. 2 according to the first embodiment described above, except that the engagement devices are changed from the brakes B1, B2, and B3 to the first brake B1, the first clutch C1, and the second clutch C2.

4-3. Operating Modes of the Hybrid Drive System

Figures 22, 23:
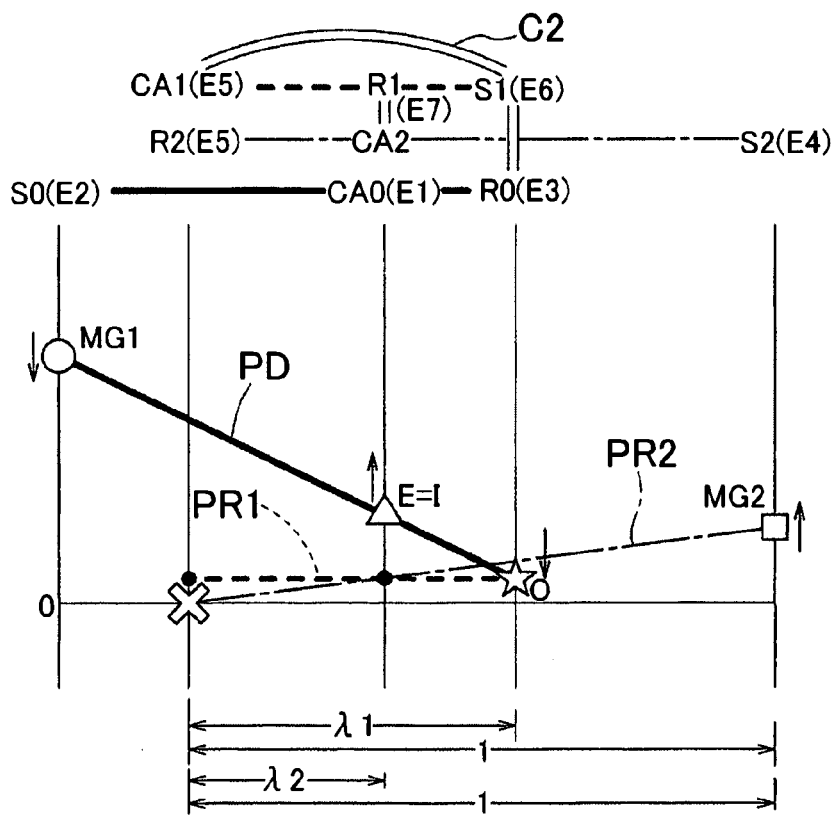
FIG. 22 is an operation table showing the operating states of a plurality of engagement devices in each mode according to the fourth embodiment of the present invention.
FIG. 23 is a velocity diagram of a third split mode according to the fourth embodiment of the present invention.

Next, the operating modes that can be realized by the hybrid drive system H according to this embodiment will be described. FIG. 22 is an operation table showing the operating states of the first brake B1 (i.e., the first engagement device EE1), the first clutch C1 (i.e., the second engagement device EE2), and the second clutch C2 (i.e., the third engagement device EE3) in each operating mode. In the table, a circle indicates that the corresponding engagement device is engaged (i.e., connected), and the absence of a circle indicates that the corresponding device is released (i.e., disconnected).

FIGS. 23 to 27 are velocity diagrams that show the operating states of the power split device PD, the first differential gear unit PR1, and the second differential gear unit PR2 in each operating mode. The description method of these velocity diagrams is the same as it is with FIGS. 5A and 5B according to the first embodiment described above. However, the plurality of vertical axes that are arranged parallel with one another correspond to the rotating elements of the power split device PD, the first differential gear unit PR1, and the second differential gear unit PR2. The "S0", "CA0", and "R0" above the vertical axes correspond to the sun gear S0, the carrier CA0, and the ring gear R0 of the power split device PD, respectively, the "S1", "CA1", and "R1" above the vertical axes correspond to the first sun gear S1, the first carrier CA1, and the first ring gear R1 of the first differential gear unit PR1, respectively, and the "S2", "CA2", and "R2" above the vertical axes correspond to the second sun gear S2, the second carrier CA2, and the second ring gear R2 of the second differential gear unit PR2, respectively. The "=" that connects the reference characters of rotating elements above the vertical axes indicates that a plurality of rotating elements are drivingly connected so as to rotate together. The reference character "C1" or "C2" accompanying that "=" indicates that those rotating elements are drivingly connected by the engagement of the first clutch C1 or the second clutch C2. Also, an "x" in the drawings indicates that the corresponding rotating element is held to a case CS which is a non-rotating member. The reference character "B1" accompanying that "x" indicates that that rotating element is held by engagement of the first brake B1. Hereinafter, the operating state of the hybrid drive system H in each of the plurality of operating modes will be described in detail.

4-4. Third Split Mode

The third split mode is realized by engaging the second clutch C2, and releasing the first brake B1 and the first clutch C1, as shown in FIG. 22. FIG. 23 is a velocity diagram of this third split mode. The driving force that is transmitted from the engine E to the carrier CA0 of the power split device PD via the input member I is split by the power split device PD and transmitted to the output member O. At this time, the first rotating electrical machine MG1 operates as a reaction force receiver.

In the third split mode, releasing the first clutch C1 places the second carrier CA2 and the first ring gear R1 in states in which they are able to rotate irrespective of the carrier CA0 of the power split device PD. Also, releasing the first brake B1 places the first carrier CA1 in a state in which it can rotate freely. Also, engaging the second clutch C2 places the first differential gear unit PR1 in a directly connected state in which the three rotating elements all rotate together at the same speed. As a result, the rotation and driving force of the second sun gear S2 that rotates together with the rotor Ro2 of the second rotating electrical machine MG2 is decelerated by the second differential gear unit PR2 and transmitted to the first ring gear R1 of the first differential gear unit PR1, after which it is then transmitted to the output member O at the same speed by the first differential gear unit PR1. More specifically, as shown in the lower part of the velocity diagram in FIG. 23, in the third split mode, the rotation speed of the second rotating electrical machine MG2 is decelerated "γ2" times (γ2<γ1<1) and then transmitted to the output member O. The reduction gear ratio at this time is "1/γ2". Accordingly, the torque of the second rotating electrical machine MG2 is multiplied "1/γ2" times and then transmitted to the output member O. In this third split mode, the rotation of the input rotating element E4 (i.e., the second sun gear S2) that is decelerated by the reduction gear PR and transmitted to the output member O via the first output rotating element E6 (i.e., the first sun gear S1) corresponds to third decelerated rotation of the present invention. This third decelerated rotation is decelerated more than first decelerated rotation (i.e., the reduction gear ratio is larger) of a first split mode that will be described later, so the third decelerated rotation is slower than the first decelerated rotation with respect to the same rotation of the input rotating element E4.

The effects from providing this kind of third split mode, as well as the operation of the first rotating electrical machine MG1 and the second rotating electrical machine MG2 in this third split mode, are the same as they are in the third embodiment described above.

4-5. First Split Mode

The first split mode is realized by engaging the first brake B1, and releasing the first clutch C1 and the second clutch C2, as shown in FIG. 22. FIG. 24 is a velocity diagram of this first split mode. The driving force that is transmitted from the engine E to the carrier CA0 of the power split device PD via the input member I is split by the power split device PD and transmitted to the output member O. At this time, the first rotating electrical machine MG1 operates as a reaction force receiver.

In the first split mode, releasing the first clutch C1 places the second carrier CA2 and the first ring gear R1 in states in which they are able to rotate irrespective of the carrier CA0 of the power split device PD. Also, releasing the second clutch C2 takes the first differential gear unit PR1 out of a directly connected state and enables the rotating elements of the first differential gear unit PR1 to rotate freely. Also, engaging the first brake B1 results in the first carrier CA1, that is one of two stationary elements E5 of the reduction gear PR, being held to a case CS which is a non-rotating member. In this state, both the first carrier CA1 and the second ring gear R2, which are the two stationary elements E5 of the reduction gear PR, are held to the case CS. Accordingly, the first differential gear unit PR1 and the second differential gear unit PR2 that form the reduction gear PR together form a differential gear unit having four elements in all, and of those rotating elements, the rotating element that is at one end is held to the case CS. As a result, the rotation and driving force of the second rotating electrical machine MG2 that is drivingly connected to the second sun gear S2 is decelerated by the first differential gear unit PR1 and the second differential gear unit PR2 and transmitted to the output member O. More specifically, as shown in the lower part of the velocity diagram in FIG. 24, in the first split mode, the rotation speed of the second rotating electrical machine MG2 is decelerated "γ1" times (γ2<γ1<1) and then transmitted to the output member O. The reduction gear ratio at this time is "1/γ1". Accordingly, the torque of the second rotating electrical machine MG2 is multiplied "1/γ1" times and then transmitted to the output member O. In this first split mode, the rotation of the input rotating element E4 (i.e., the second sun gear S2) that is decelerated by the reduction gear PR and transmitted to the output member O via the first output rotating element E6 (i.e., the first sun gear S1) corresponds to first decelerated rotation of the present invention. This first decelerated rotation is not decelerated as much as the third decelerated rotation or second decelerated rotation that will be described later (i.e., the reduction gear ratio is smaller), so the first decelerated rotation is faster than the third decelerated rotation and the second decelerated rotation with respect to the same rotation of the input rotating element E4. The operation of the first rotating electrical machine MG1 and the second rotating electrical machine MG2 in this kind of first split mode is the same as it is in the third embodiment described above.

4-6. Second Split Mode

Figure 25:
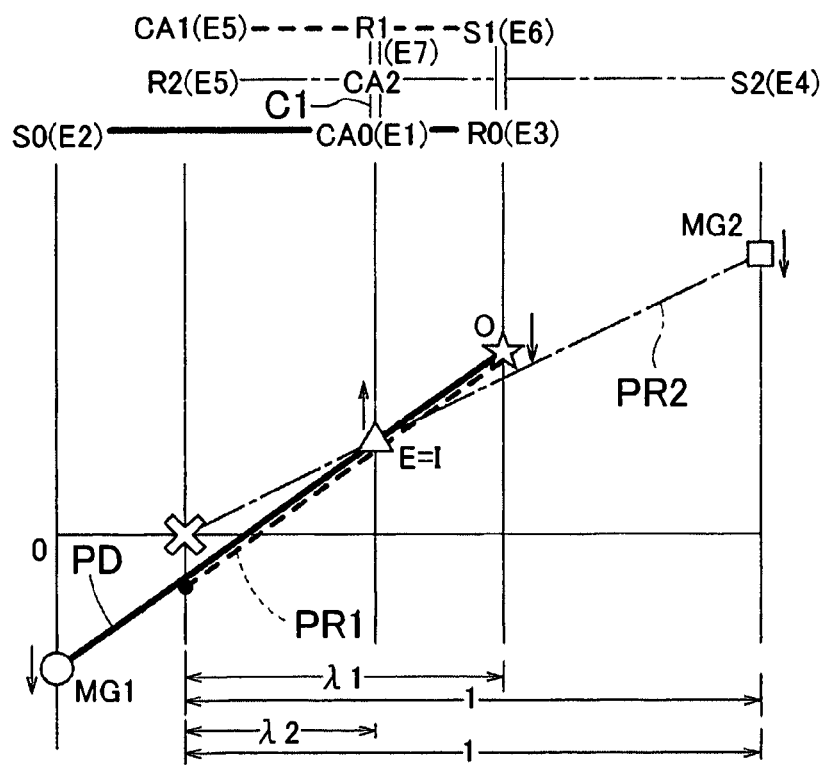
FIG. 25 is a velocity diagram of a second split mode according to the fourth embodiment of the present invention.

The second split mode is realized by engaging the first clutch C1, and releasing the first brake B1 and the second clutch C2, as shown in FIG. 22. FIG. 25 is a velocity diagram of this second split mode. In this operating mode, the vehicle speed is a high speed and the running torque is relatively low. Similar to the first split mode and the third split mode, the driving force transmitted from the engine E to the carrier CA0 of the power split device PD via the input member I is split by the power split device PD and transmitted to the output member O. At this time, the first rotating electrical machine MG1 operates as a reaction force receiver.

In the second split mode, the first brake B1 is released so the first carrier CA1 rotates freely. Also, releasing the second clutch C2 takes the first differential gear unit PR1 out of a directly connected state and enables the rotating elements of the first differential gear unit PR1 to rotate freely. Also, the first clutch C1 is engaged, so the carrier CA0 is drivingly connected to the first ring gear R1 and the second carrier CA2 so as to rotate together with the first ring gear R1 and the second carrier CA2. In this state, the power split device PD and the first differential gear unit PR1 of the reduction gear PR together form a differential gear unit having four elements in all. Also, the rotation and driving force of the second sun gear S2 that rotates together with the rotor Rot of the second rotating electrical machine MG2 is decelerated by the second differential gear unit PR2 and transmitted to the second carrier CA2. Here, the second carrier CA2 is drivingly connected to the carrier CA0 and the input member I so as to rotate together with the carrier CA0 and the input member I, so the decelerated rotation and driving force of the second rotating electrical machine MG2 are transmitted to the carrier CA0 and the input member I via the second carrier CA2. More specifically, as shown in the lower part of the velocity diagram in FIG. 25, in the second split mode, the rotation speed of the second rotating electrical machine MG2 is decelerated "γ2" times (γ2<γ1<1) and then transmitted to the carrier CA0. The reduction gear ratio at this time is "1/γ2". Accordingly, the torque of the second rotating electrical machine MG2 is multiplied "1/γ2" times and then transmitted to the carrier CA0 of the power split device PD. In this second split mode, the rotation of the input rotating element E4 (i.e., the second sun gear S2) that is decelerated by the reduction gear PR and transmitted to the input rotating element E1 (i.e., the carrier CA0) of the power split device PD via the second output rotating element E7 (i.e., the second carrier CA2) corresponds to second decelerated rotation of the present invention. This second decelerated rotation is decelerated more than the first decelerated rotation (i.e., the reduction gear ratio is larger), so the second decelerated rotation is slower than the first decelerated rotation with respect to the same rotation of the input rotating element E4.

The effects from providing this kind of second split mode, as well as the operation of the first rotating electrical machine MG1 and the second rotating electrical machine MG2 in this second split mode, are the same as they are in the third embodiment described above.

4-7. First Parallel Mode

Figure 26:
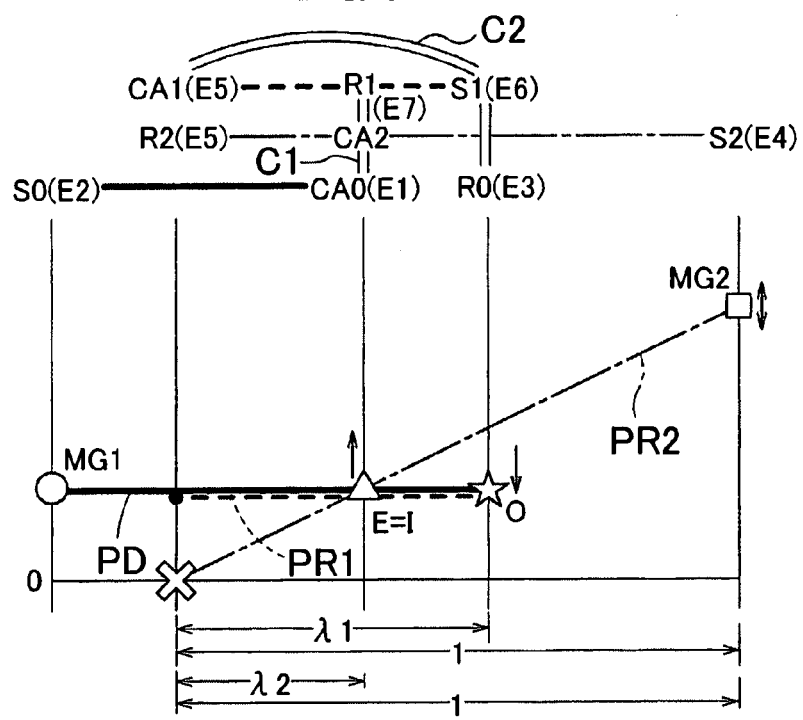
FIG. 26 is a velocity diagram of a first parallel mode according to the fourth embodiment of the present invention.

The first parallel mode is realized by engaging the first clutch C1 and the second clutch C2, and releasing the first brake B1, as shown in FIG. 22. FIG. 26 is a velocity diagram of this first parallel mode. As shown in the drawing, the first clutch C1 is engaged, so the carrier CA0 is drivingly connected to the first ring gear R1 and the second carrier CA2 so as to rotate together with the first ring gear R1 and the second carrier CA2. In this state, the power split device PD and the first differential gear unit PR1 of the reduction gear PR together form a differential gear unit having four elements in all. Also, the second clutch C2 is engaged, which places the first differential gear unit PR1 in a directly connected state in which the three rotating elements all rotate together at the same speed. As a result, all of the rotating elements of the first differential gear unit PR1 and the power split device PD are in a directly connected state in which they rotate together at the same speed. At this time, the ratios of the rotation speed of the second sun gear S2 that is drivingly connected to the rotor Ro2 of the second rotating electrical machine MG2 with respect to the rotation speeds of the rotating elements of the first differential gear unit PR1 and the power split device PD via the second differential gear unit PR2 are restricted to being constant. As a result, the ratios of the rotation speeds of all of the rotating elements of the reduction gear PR and the power split device PD are restricted to being constant. Therefore, in this operating mode, running can be performed using the driving force from the engine E. The first rotating electrical machine MG1 is controlled to a state in which it neither generates power nor performs powering, or a state in which it generates power to operate accessories. Also, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

4-8. Second Parallel Mode

Figure 27:
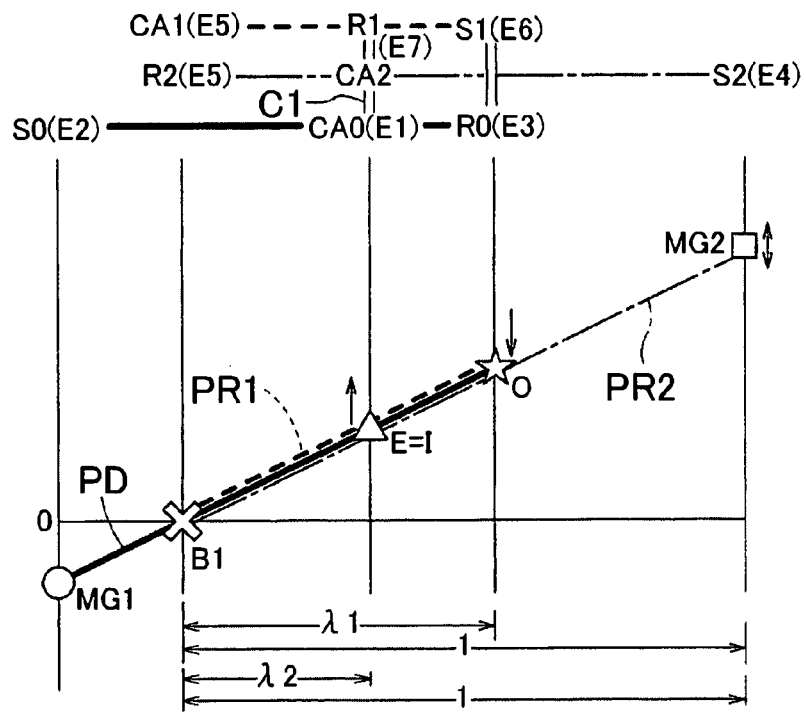
FIG. 27 is a velocity diagram of a second parallel mode according to the fourth embodiment of the present invention.

The second parallel mode is realized by engaging the first brake B1 and the first clutch C1, and releasing the second clutch C2, as shown in FIG. 22. FIG. 27 is a velocity diagram of this second parallel mode. As shown in the drawing, both the first brake B1 and the first clutch C1 are engaged, so both the first carrier CA1 and the second ring gear R2, which are two stationary elements E5 of the reduction gear PR, are held to a case CS which is a non-rotating member, and the power split device PD, the first differential gear unit PR1, and the second differential gear unit PR2 together form a differential gear unit having five elements in all. As a result, the ratios of the rotation speeds of all of the rotating elements of the reduction gear PR and the power split device PD are restricted to being constant. In this operating mode, running can be performed using the driving force from the engine E. The first rotating electrical machine MG1 is controlled to a state in which it neither generates power nor performs powering while it rotates at low speed, or a state in which it generates power to operate accessories. In this state, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

4-9. Switching Operating Modes

A switch between the third split mode and the first split mode is performed by changing over the first brake B1 and the second clutch C2. Adjusting the rotation speed of the second rotating electrical machine MG2 makes it possible to adjust the rotation speed of the first carrier CA1 that is held by the first brake B1 so that it is close to zero when switching from the third split mode to the first split mode, or adjust the rotation speeds of the first carrier CA1 and the first sun gear S1 that are engaged together by the second clutch C2 so that they are approximately the same when switching from the first split mode to the third split mode. However, in order switch modes rapidly, the first brake B1 and the second clutch C2 basically need to be engaged while there is a difference in the rotation speeds of the engagement members on both sides. Therefore, the first brake B1 and the second clutch C2 may be formed by friction engagement devices.

A switch between the third split mode and the first parallel mode is performed by engaging or releasing the first clutch C1 while the second clutch C2 remains engaged. As the rotation speed of the output member O increases while the vehicle is running in the third split mode, the rotation speed of the carrier CA0 of the power split device PD and the rotation speed of the first ring gear R1 and the second carrier CA2 of the reduction gear PR gradually approach one another. The switch to the first parallel mode can be made by engaging the first clutch C1 while these rotation speeds are the same. Also, a switch from the first parallel mode into the third split mode can be performed simply by releasing the first clutch C1. Accordingly, the switch between the third split mode and the first parallel mode can be a synchronized switch that engages the first clutch C1 when the rotation speeds of the carrier CA0 and the first ring gear R1 and the second carrier CA2, which are engaged together by the first clutch C1, are the same. Therefore, according to the structure in this application, with a switch between the third split mode and the first parallel mode, it is not necessary to place the speed change mechanism in a neutral state as is common with the related art.

Also, a switch between the second parallel mode and the first split mode or the second split mode is performed by switching the engagement or release of the first brake B1 and the first clutch C1. In the second parallel mode, the speed line of the power split device PD and the speed lines of the first differential gear unit PR1 and the second differential gear unit PR2 overlap, as is also shown in FIG. 27. Therefore, the switch when switching from the second split mode into the second parallel mode can be a synchronized switch that engages the first brake B1 while the rotation speed of the first carrier CA1 that is held by the first brake B1 is "0", or the switch when switching from the first split mode into the second parallel mode can be a synchronized switch that engages the first clutch C1 while the rotation speeds of the carrier CA0 and the first ring gear R1 and the second carrier CA2, which are engaged together by the first clutch C1, are the same. Also, a switch from the second parallel mode into the first split mode or the second split mode can be performed by simply releasing the first brake B1 or the first clutch C1. Therefore, according to the structure in this application, with a switch between the first split mode or the second split mode and the second parallel mode, it is not necessary to place the speed change mechanism in a neutral state as is common with the related art.

As described above, of the three engagement devices B1, C1, and C2, the first clutch C1 is always engaged when the rotation speeds of the engagement members on both sides are the same. Also, when engaging the first clutch C1 in this way, the torque of the second rotating electrical machine MG2 can be controlled to "0". Also at this time, fluctuation in the torque transmitted to the output member O can be suppressed by adjusting the torque of the engine E. Performing this type of control enables the first clutch C1 that serves as the second engagement device EE2 (i.e., the second split mode engagement device) to be formed by a mesh type engagement device.

4-10. MG2 Disconnected Mode

In the hybrid drive system H according to this embodiment, the MG2 disconnected mode that transmits driving force output from the engine E to the output member O can also be realized by releasing all of the engagement devices, i.e., the first brake B1, the first clutch C1, and the second clutch C2, and controlling the rotation and driving force of the first rotating electrical machine MG1. At this time, the first rotating electrical machine MG1 may be controlled to generate power to operate accessories, while outputting the reaction force of the engine torque.

5. Fifth Embodiment

Figure 28:
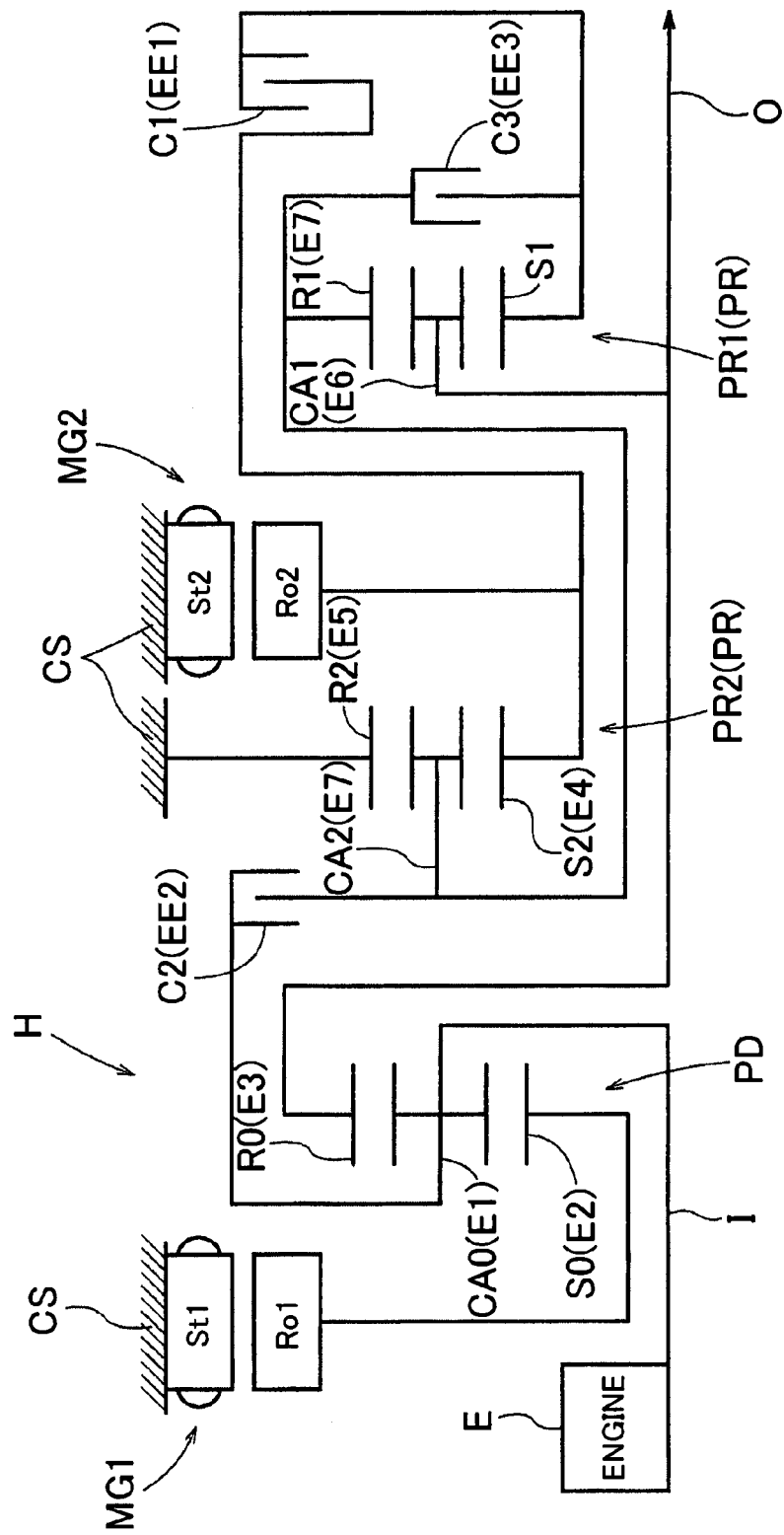
FIG. 28 is a skeleton view of the structure of a hybrid drive system according to a fifth embodiment of the present invention.

Next, a fifth embodiment of the present invention will be described. FIG. 28 is a skeleton view of the structure of the hybrid drive system H according to this embodiment. Incidentally, a portion of the axisymmetric structure is omitted in FIG. 28, just as it is FIG. 1. The hybrid drive system H according to this embodiment is able to realize a first split mode, a second split mode, a third split mode, a first parallel mode, and a second parallel mode, similar to the third embodiment described above. However, the structures of the reduction gear PR and the three engagement devices differ from those in the third embodiment described above. Hereinafter, mainly the differences between the hybrid drive system H according to this embodiment and the hybrid drive system H according to the third embodiment described above will be described. Incidentally, those points that are not specifically described are similar to those the third embodiment described above.

5-1. Mechanical Structure of the Hybrid Drive System

In this embodiment as well, the structure of the power split device PD is similar to that in the third embodiment (and the first embodiment) described above. However, the structure of the reduction gear PR differs from that in the third embodiment. That is, in this embodiment, the reduction gear PR is formed of a combination of a first differential gear unit PR1 and a second differential gear unit PR2, each of which has three rotating elements, as shown in FIG. 28.

The first differential gear unit PR1 is a differential gear unit that has three rotating elements. Here, the first differential gear unit PR1 is formed from a single pinion type planetary gear set. That is, the first differential gear unit PR1 has, as rotating elements, a first carrier CA1 that supports a plurality of pinion gears, and a first sun gear S1 and a first ring gear R1 that mesh with these pinion gears. The first sun gear S1 is selectively drivingly connected to the second sun gear S2 of the second differential gear unit PR2 and the rotor Rot of the second rotating electrical machine MG2 via the first clutch C1, and is also selectively drivingly connected to the first ring gear R1 and a second carrier CA2 of the second differential gear unit PR2 via a third clutch C3. The first carrier CA1 is drivingly connected to the ring gear R0 (i.e., an output rotating element E3) of the power split device PD so as to rotate together with the ring gear R0, and is also selectively drivingly connected to the output member O. Therefore, the first carrier CA1 is a first output rotating element E6 of the reduction gear PR. The first ring gear R1 is drivingly connected to the second carrier CA2 so as to rotate together with the second carrier CA2, and is also selectively drivingly connected to the carrier CA0 of the power split device PD and the input member I via the second clutch C2. Therefore, the first ring gear R1 of the first differential gear unit PR1 and the second carrier CA2 of the second differential gear unit PR2 constitute a second output rotating element E7 of the reduction gear PR. Also, the first ring gear R1 may also be selectively drivingly connected to the first sun gear S1 via the third clutch C3. The three rotating elements of the first differential gear unit PR1 are, in order of rotation speed, the first ring gear R1, the first carrier CA1, and the first sun gear S1. Accordingly, in this embodiment, the first ring gear R1 is a first rotating element of the first differential gear unit PR1, the first carrier CA1 is a second rotating element of the first differential gear unit PR1, and the first sun gear S1 is a third rotating element of the first differential gear unit PR1.

The second differential gear unit PR2 is a differential gear unit that has three rotating elements. In this case, the second differential gear unit PR2 is formed by a single pinion type planetary gear set. That is, the second differential gear unit PR2 has, as rotating elements, a second carrier CA2 that supports a plurality of pinion gears, and a second sun gear S2 and a second ring gear R2 that are both in mesh with those pinion gears. The second sun gear S2 is drivingly connected to the rotor Ro2 of the second rotating electrical machine MG2 so as to rotate together with the rotor Ro2. Therefore, the second sun gear S2 of the second differential gear unit PR2 is an input rotating element E4 of the reduction gear PR. Also, as described above, the second carrier CA2 is selectively drivingly connected to the first sun gear S1 of the first differential gear unit PR1 via the first clutch C1. As described above, the second carrier CA2 is drivingly connected to the first ring gear R1 of the first differential gear unit PR1 so as to rotate with the first ring gear R1, and is also selectively drivingly connected to the carrier CA0 of the power split device PD and the input member I via a second clutch C2, and thus is a second output rotating element E7 of the reduction gear PR. Also, the second carrier CA2 is selectively drivingly connected to the first ring gear R1, as well as to the first sun gear S1 via the third clutch C3. The second ring gear R2 is selectively held to a case CS which is a non-rotating member. Accordingly, this second ring gear R2 is a stationary element E5 of the reduction gear PR. The three rotating elements of the second differential gear unit PR2 are, in order of rotation speed, the second ring gear R2, the second carrier CA2, and the second sun gear S2. Accordingly, in this embodiment, the second ring gear R2 is a first rotating element of the second differential gear unit PR2, the second carrier CA2 is a second rotating element of the second differential gear unit PR2, and the second sun gear S2 is a third rotating element of the second differential gear unit PR2.

As described above, the reduction gear PR is formed by drivingly connecting one rotating element (the first ring gear R1 in this case) of the first differential gear unit PR1 that has three rotating elements to one rotating element (the second carrier CA2 in this case) of the second differential gear unit PR2 that has three rotating elements so that those two rotating elements rotate together. Accordingly, the reduction gear PR is a differential gear unit that has five rotating elements in all. As shown in the upper parts of the velocity diagrams in FIGS. 30 to 34, of these five rotating elements of the reduction gear PR, excluding the first sun gear S1, the four of the rotating elements are, in order of rotation speed, the second ring gear R2, the first ring gear R1 and the second carrier CA2 that rotate together, the first carrier CA1, and the second sun gear S2. In other words, the order of rotation speed of these four rotating elements of the reduction gear PR is i) the stationary element E5, ii) the second output rotating element E7, iii) the first output rotating element E6, and iv) the input rotating element E4.

The first clutch C1 selectively drivingly connects or disconnects the first sun gear S1 of the first differential gear unit PR1, to or from the second sun gear S2 of the second differential gear unit PR2 and the rotor Ro2 of the second rotating electrical machine MG2. Accordingly, the first clutch C1 constitutes a first engagement device EE1 of the present invention. When this first clutch C1 is engaged, the first sun gear S1 is drivingly connected to the second sun gear S2. When the first clutch C1 is released, the first sun gear S1 is drivingly disconnected from the second sun gear 52. As will be described later, a first split mode is realized by engaging this first clutch C1, so the first clutch C1 that is the first engagement device EE1 functions as a first split mode engagement device.

The second clutch C2 selectively drivingly connects or disconnects the carrier CA0 that is an input rotating element E1 of the power split device PD to or from the first ring gear R1 and the second carrier CA2 that constitute a second output rotating element E7 of the reduction gear PR. Accordingly, the second clutch C2 constitutes a second engagement device EE2 of the present invention. When this second clutch C2 is engaged, the first ring gear R1 and the second carrier CA2 are drivingly connected to the carrier CA0. When the second clutch C2 is released, the first ring gear R1 and the second carrier CA2 are drivingly disconnected from the carrier CA0. As will be described later, a second split mode is realized by engaging this second clutch C2, so the second clutch C2 that is the second engagement device EE2 functions as a second split mode engagement device.

The third clutch C3 is an engagement device that selectively drivingly connects two of the three rotating elements of the first differential gear unit PR1 that forms the reduction gear PR so that they rotate together, or disconnects two of the three rotating elements of the first differential gear unit PR1 that forms the reduction gear PR. In this embodiment, the third clutch C3 is structured to selectively drivingly connect or disconnect the first sun gear S1 to or from the first ring gear R1 of the first differential gear unit PR1. When this third clutch C3 is engaged, the first differential gear unit PR1 is in a directly connected state in which the three rotating elements all rotate together at the same speed. Accordingly, the first differential gear unit PR1 transmits the rotation and driving force of the second rotating electrical machine MG2 that have been decelerated by the second differential gear unit PR2 and transmitted to the second carrier CA2 to the output member O at the same speed via the first ring gear R1 that is drivingly connected to the second carrier CA2. In this embodiment, the third clutch C3 constitutes a third engagement device EE3 of the present invention. Also, as will be described later, a third split mode is realized by engaging this third clutch C3, so this third clutch C3 functions as a third split mode engagement device.

In this embodiment, the first clutch C1, the second clutch C2, and the third clutch C3 are all friction engagement devices. Multi-disc clutches that operate by hydraulic pressure may be used for these engagement devices. Similar to the first embodiment described with reference to FIG. 2, hydraulic pressure is supplied to these engagement devices C1, C2, and C3 from the hydraulic control apparatus 35 that operates in response to a control command from the main control unit 31. Engagement or release of these engagement devices C1, C2, and C3 is controlled by that hydraulic pressure. Hydraulic pressure generated by an oil pump, not shown, is supplied to this hydraulic control apparatus 35.

Incidentally, in the hybrid drive system H according to this embodiment, a mesh type engagement device may be used for the second clutch C2 that is the second engagement device EE2. As will be described later, in this embodiment, the second clutch C2 can be engaged when the second rotating electrical machine MG2 is not generating driving force. Therefore, even if the second clutch C2 is formed by a mesh type engagement device, it is able to switch to an engaged state nicely. Also, if the second clutch C2 is a mesh type engagement device, hydraulic pressure for generating engagement pressure or release pressure is not necessary so a loss of driving force due to the hydraulic pump can be suppressed and the transfer efficiency of the drive system can be easily increased compared with when this second clutch C2 is a friction engagement device. Incidentally, in order to obviate the need for a supply of hydraulic pressure, the operation to switch this mesh type engagement device between an engaged state and a released state may be performed by an electromagnetic actuator.

5-2. Structure of the Control System of the Hybrid Drive System

The control system in this embodiment has generally the same structure as that according to the third embodiment described above with reference to FIG. 2 according to the first embodiment described above, except that the engagement devices are changed from the brakes B1, B2, and B3 to the first clutch C1, the second clutch C2, and the third clutch C3.

5-3. Operating Modes of the Hybrid Drive System

Figures 29, 30:
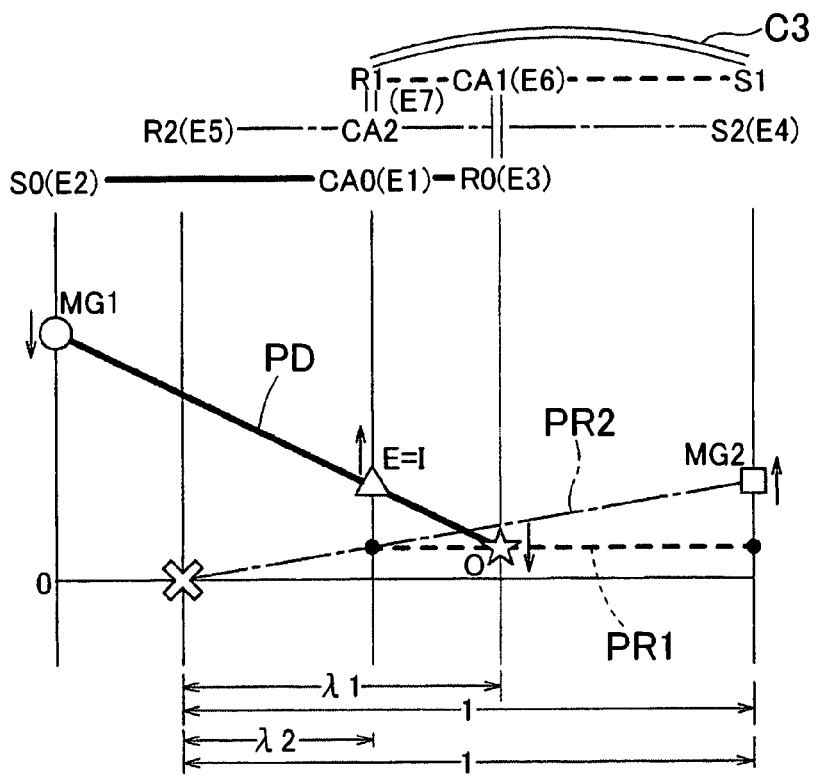
FIG. 29 is an operation table showing the operating states of a plurality of engagement devices in each mode according to the fifth embodiment of the present invention.
FIG. 30 is a velocity diagram of a third split mode according to the fifth embodiment of the present invention.

Next, the operating modes that can be realized by the hybrid drive system H according to this embodiment will be described. FIG. 29 is an operation table showing the operating states of the first clutch C1 (i.e., the first engagement device EE1), the second clutch C2 (i.e., the second engagement device EE2), and the third clutch C3 (i.e., the third engagement device EE3) in each operating mode. In the table, a circle indicates that the corresponding engagement device is engaged (i.e., connected), and the absence of a circle indicates that the corresponding device is released (i.e., disconnected).

FIGS. 30 to 34 are velocity diagrams that show the operating states of the power split device PD, the first differential gear unit PR1, and the second differential gear unit PR2 in each operating mode. The description method of these velocity diagrams is the same as it is with FIGS. 5A and 5B and the like according to the first embodiment described above. However, the plurality of vertical axes that are arranged parallel with one another correspond to the rotating elements of the power split device PD, the first differential gear unit PR1, and the second differential gear unit PR2. The "S0", "CA0", and "R0" above the vertical axes correspond to the sun gear S0, the carrier CA0, and the ring gear R0 of the power split device PD, respectively, the "S1", "CA1", and "R1" above the vertical axes correspond to the first sun gear S1, the first carrier CA1, and the first ring gear R1 of the first differential gear unit PR1, respectively, and the "S2", "CA2", and "R2" above the vertical axes correspond to the second sun gear S2, the second carrier CA2, and the second ring gear R2 of the second differential gear unit PR2, respectively. The "=" that connects the reference characters of rotating elements above the vertical axes indicates that a plurality of rotating elements are drivingly connected so as to rotate together. The reference character "C1", "C2", or "C3" accompanying that "=" indicates that those rotating elements are drivingly connected by the engagement of the first clutch C1, the second clutch C2, or the third clutch C3. Also, an "x" in the drawings indicates that the corresponding rotating element is held to a case CS which is a non-rotating member. Hereinafter, the operating state of the hybrid drive system H in each of the plurality of operating modes will be described in detail.

5-4. Third Split Mode

The third split mode is realized by engaging the third clutch C3, and releasing the first clutch C1 and the second clutch C2, as shown in FIG. 29. FIG. 30 is a velocity diagram of this third split mode. The driving force that is transmitted from the engine E to the carrier CA0 of the power split device PD via the input member I is split by the power split device PD and transmitted to the output member O. At this time, the first rotating electrical machine MG1 operates as a reaction force receiver.

In the third split mode, releasing the second clutch C2 places the second carrier CA2 and the first ring gear R1 in states in which they are able to rotate irrespective of the carrier CA0 of the power split device PD. Also, releasing the first clutch C1 places the first sun gear S1 in a state in which it can rotate irrespective of the second sun gear S2. Also, engaging the third sun gear S3 places the first differential gear unit PR1 in a directly connected state in which the three rotating elements all rotate together at the same speed. As a result, the rotation and driving force of the second sun gear S2 that rotates together with the rotor Rot of the second rotating electrical machine MG2 is decelerated by the second differential gear unit PR2 and transmitted to the first ring gear R1 of the first differential gear unit PR1, after which it is then transmitted to the output member O at the same speed by the first differential gear unit PR1. More specifically, as shown in the lower part of the velocity diagram in FIG. 30, the rotation speed of the second rotating electrical machine MG2 is decelerated "$\gamma 2$" times ($\gamma 2 < \gamma 1 < 1$) and then transmitted to the output member O. The reduction gear ratio at this time is "$1/\gamma 2$". Accordingly, the torque of the second rotating electrical machine MG2 is multiplied "$1/\gamma 2$" times and then transmitted to the output member O. In this third split mode, the rotation of the input rotating element E4 (i.e., the second sun gear S2) that is decelerated by the reduction gear PR and transmitted to the output member O via the first output rotating element E6 (i.e., the first carrier CA1) corresponds to third decelerated rotation of the present invention. This third decelerated rotation is decelerated more than first decelerated rotation (i.e., the reduction gear ratio is larger) of a first split mode that will be described later, so the third decelerated rotation is slower than the first decelerated rotation with respect to the same rotation of the input rotating element E4.

The effects from providing this kind of third split mode, as well as the operation of the first rotating electrical machine MG1 and the second rotating electrical machine MG2 in this third split mode, are the same as they are in the third embodiment described above.

5-5. First Split Mode

Figure 31:
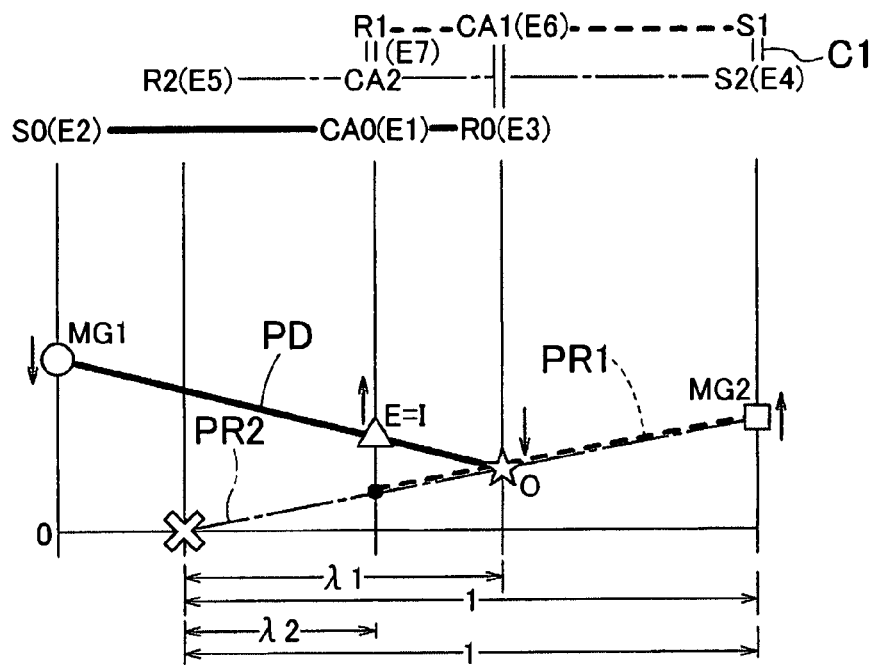
FIG. 31 is a velocity diagram of a first split mode according to the fifth embodiment of the present invention.

The first split mode is realized by engaging the first clutch C1, and releasing the second clutch C2 and the third clutch C3, as shown in FIG. 29. FIG. 31 is a velocity diagram of this first split mode. The driving force that is transmitted from the engine E to the carrier CA0 of the power split device PD via the input member I is split by the power split device PD and transmitted to the output member O. At this time, the first rotating electrical machine MG1 operates as a reaction force receiver.

In the first split mode, releasing the second clutch C2 places the second carrier CA2 and the first ring gear R1 in states in which they are able to rotate irrespective of the carrier CA0 of the power split device PD. Also, releasing the third clutch C3 takes the first differential gear unit PR1 out of a directly connected state and enables the rotating elements of the first differential gear unit PR1 to rotate freely. Also, engaging the first clutch C1 directly connects the first sun gear S1 of the first differential gear unit PR1 to the second sun gear S2 of the second differential gear unit PR2 and the rotor Ro2 of the second rotating electrical machine MG2 so that the first sun gear S rotates together with the second sun gear S2 and the rotor Ro2. In this state, the first differential gear unit PR1 and the second differential gear unit PR2 together form a differential gear unit having four elements in all, and of those rotating elements, the rotating element that is at one end (i.e., the second ring gear R2) is held to the case CS. As a result, the rotation and driving force of the second rotating electrical machine MG2 that is drivingly connected to the second sun gear S2 is decelerated by the first differential gear unit PR1 and the second differential gear unit PR2 and transmitted to the output member O. More specifically, as shown in the lower part of the velocity diagram in FIG. 31, in the first split mode, the rotation speed of the second rotating electrical machine MG2 is decelerated "$\gamma 1$" times ($\gamma 2 < \gamma 1 < 1$) and then transmitted to the output member O. The reduction gear ratio at this time is "$1/\gamma 1$". Accordingly, the torque of the second rotating electrical machine MG2 is multiplied "$1/\gamma 1$" times and then transmitted to the output member O. In this first split mode, the rotation of the input rotating element E4 (i.e., the second sun gear S2) that is decelerated by the reduction gear PR and transmitted to the output member O via the first output rotating element E6 (i.e., the first carrier CA1) corresponds to first decelerated rotation of the present invention. This first decelerated rotation is not decelerated as much as the third decelerated rotation or second decelerated rotation that will be described later (i.e., the reduction gear ratio is smaller), so the first decelerated rotation is faster than the third decelerated rotation and the second decelerated rotation with respect to the same rotation of the input rotating element E4. The operation of the first rotating electrical machine MG1 and the second rotating electrical machine MG2 in this kind of first split mode is the same as it is in the third embodiment described above.

5-6. Second Split Mode

Figure 32:
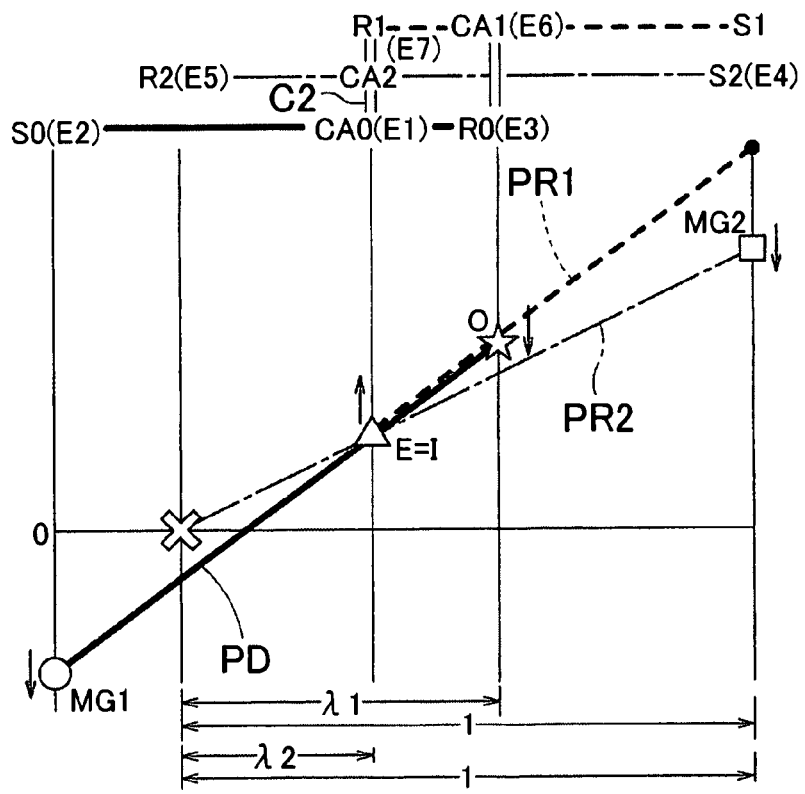
FIG. 32 is a velocity diagram of a second split mode according to the fifth embodiment of the present invention.

The second split mode is realized by engaging the second clutch C2, and releasing the first clutch C1 and the third clutch C3, as shown in FIG. 29. FIG. 32 is a velocity diagram of this second split mode. In this operating mode, the vehicle speed is a high speed and the running torque is relatively low. Similar to the first split mode and the third split mode, the driving force transmitted from the engine E to the carrier CA0 of the power split device PD via the input member I is split by the power split device PD and transmitted to the output member O. At this time, the first rotating electrical machine MG1 operates as a reaction force receiver.

In the second split mode, releasing the first clutch C1 places the first sun gear S1 in a state in which it is able to rotate irrespective of the second sun gear S2. Also, releasing the third clutch C3 takes the first differential gear unit PR1 out of a directly connected state and enables the rotating elements of the first differential gear unit PR1 to rotate freely. Also, engaging the second clutch C2 directly connects the carrier CA0 to the first ring gear R1 and the second carrier CA2 so that the carrier CA0 rotates together with the first ring gear R1 and the second carrier CA2. In this state, the power split device PD and the first differential gear unit PR1 of the reduction gear PR together form a differential gear unit having four elements in all. Also, the rotation and driving force of the second sun gear S2 that rotates together with the rotor Ro2 of the second rotating electrical machine MG2 are decelerated by the second differential gear unit PR2 and transmitted to the second carrier CA2. Here, the second carrier CA2 is drivingly connected to the carrier CA0 and the input member 1 so as to rotate together with the carrier CA0 and the input member 1, so the decelerated rotation and driving force of the second rotating electrical machine MG2 are transmitted to the carrier CA0 of the power split device PD and the input member I via the second carrier CA2. More specifically, as shown in the lower part of the velocity diagram in FIG. 32, in the second split mode, the rotation speed of the second rotating electrical machine MG2 is decelerated "$\gamma 2$" times ($\gamma 2 < \gamma 1 < 1$) and then transmitted to the carrier CA0 of the power split device PD. The reduction gear ratio at this time is "$1/\gamma 2$". Accordingly, the torque of the second rotating electrical machine MG2 is multiplied "$1/\gamma 2$" times and then transmitted to the carrier CA0 of the power split device PD. In this second split mode, the rotation of the input rotating element E4 (i.e., the second sun gear S2) that is decelerated by the reduction gear PR and transmitted to the input rotating element E1 (i.e., the carrier CA0) of the power split device PD via the second output rotating element E7 (i.e., the second carrier CA2) corresponds to second decelerated rotation of the present invention. This second decelerated rotation is decelerated more than the first decelerated rotation (i.e., the reduction gear ratio is larger), so the second decelerated rotation is slower than the first decelerated rotation with respect to the same rotation of the input rotating element E4.

The effects from providing this kind of second split mode, as well as the operation of the first rotating electrical machine MG1 and the second rotating electrical machine MG2 in this second split mode, are the same as they are in the third embodiment described above.

5-7. First Parallel Mode

Figure 33:
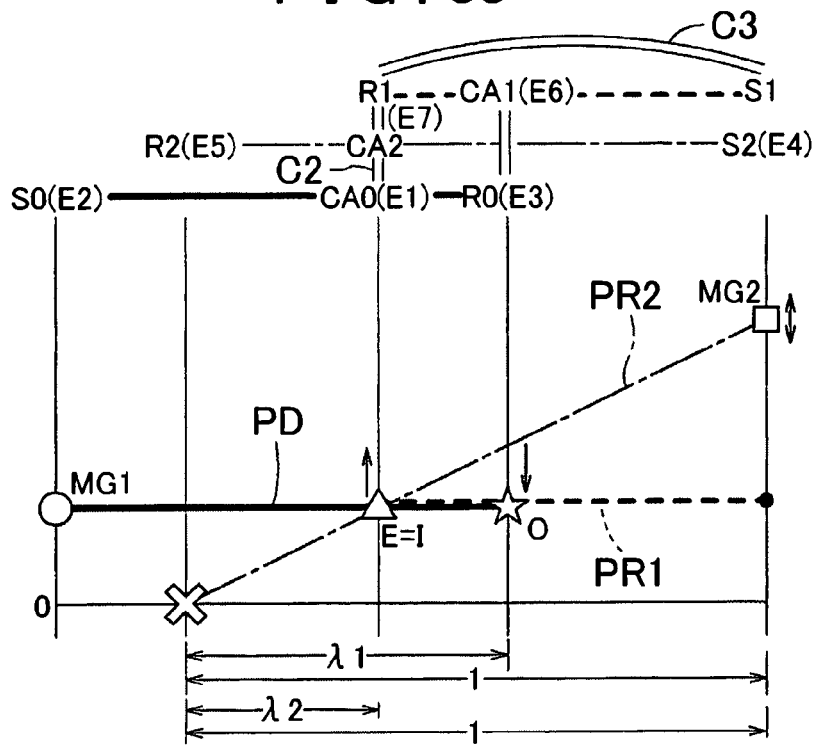
FIG. 33 is a velocity diagram of a first parallel mode according to the fifth embodiment of the present invention.

The first parallel mode is realized by engaging the second clutch C2 and the third clutch C3, and releasing the first clutch C1, as shown in FIG. 29. FIG. 33 is a velocity diagram of this first parallel mode. As shown in the drawing, the second clutch C2 is engaged, so the carrier CA0 is drivingly connected to the first ring gear R1 and the second carrier CA2 so as to rotate together with the first ring gear R1 and the second carrier CA2. In this state, the power split device PD and the first differential gear unit PR1 of the reduction gear PR together form a differential gear unit having four elements in all. Also, the third clutch C3 is engaged, which places the first differential gear unit PR1 in a directly connected state in which the three rotating elements all rotate together at the same speed. As a result, all of the rotating elements of the first differential gear unit PR1 and the power split device PD are in a directly connected state in which they rotate together at the same speed. At this time, the ratios of the rotation speed of the second sun gear S2 that is drivingly connected to the rotor Rot of the second rotating electrical machine MG2 with respect to the rotation speeds of the rotating elements of the first differential gear unit PR1 and the power split device PD via the second differential gear unit PR2 are restricted to being constant. As a result, the ratios of the rotation speeds of all of the rotating elements of the reduction gear PR and the power split device PD are restricted to being constant. Therefore, in this operating mode, running can be performed using the driving force from the engine E. The first rotating electrical machine MG1 is controlled to a state in which it neither generates power nor performs powering, or a state in which it generates power to operate accessories. Also, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

5-8. Second Parallel Mode

Figure 34:
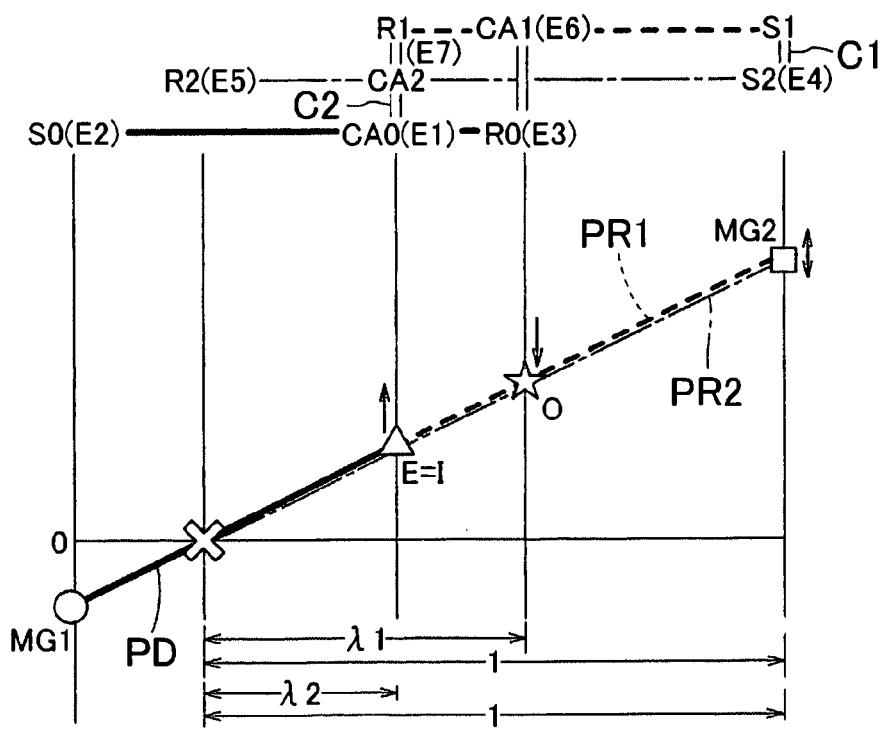
FIG. 34 is a velocity diagram of a second parallel mode according to the fifth embodiment of the present invention.

The second parallel mode is realized by engaging the first clutch C1 and the second clutch C2, and releasing the third clutch C3, as shown in FIG. 29. FIG. 34 is a velocity diagram of this second parallel mode. As shown in the drawing, both the first clutch C1 and the second clutch C2 are engaged, so the power split device PD, the first differential gear unit PR1, and the second differential gear unit PR2 together form a differential gear unit having five elements in all, with the second ring gear R2 held to a case CS which is a non-rotating member. As a result, the ratios of the rotation speeds of all of the rotating elements of the reduction gear PR and the power split device PD are restricted to being constant. In this operating mode, running can be performed using the driving force from the engine E. The first rotating electrical machine MG1 is controlled to a state in which it neither generates power nor performs powering while it rotates at low speed, or a state in which it generates power to operate accessories. In this state, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

5-9. Switching Operating Modes

A switch between the third split mode and the first split mode is performed by changing over the first clutch C1 and the third clutch C3. Adjusting the rotation speed of the second rotating electrical machine MG2 makes it possible to adjust the rotation speeds of the first sun gear S1 and the second sun gear S2 that are engaged together by the first clutch C1 so that they are approximately the same when switching from the third split mode to the first split mode, or adjust the rotation speeds of the first sun gear S1 and the first ring gear R1 that are engaged together by the third clutch C3 so that they are approximately the same when switching from the first split mode to the third split mode. However, in order switch modes rapidly, the first clutch C1 and the third clutch C3 basically need to be engaged while there is a difference in the rotation speeds of the engagement members on both sides. Therefore, the first clutch C1 and the third clutch C3 may be formed by friction engagement devices.

A switch between the third split mode and the first parallel mode is performed by engaging or releasing the second clutch C2 while the third clutch C3 remains engaged. As the rotation speed of the output member O increases while the vehicle is running in the third split mode, the rotation speed of the carrier CA0 of the power split device PD and the rotation speed of the first ring gear R1 and the second carrier CA2 of the reduction gear PR gradually approach one another. The switch to the first parallel mode can be made by engaging the second clutch C2 while these rotation speeds are the same. Also, a switch from the first parallel mode into the third split mode can be performed simply by releasing the second clutch C2. Accordingly, the switch between the third split mode and the first parallel mode can be a synchronized switch that engages the second clutch C2 when the rotation speeds of the carrier CA0 and the first ring gear R1 and the second carrier CA2, which are engaged together by the second clutch C2, are the same. Therefore, according to the structure in this application, with a switch between the third split mode and the first parallel mode, it is not necessary to place the speed change mechanism in a neutral state as is common with the related art.

Also, a switch between the second parallel mode and the first split mode or the second split mode is performed by switching the engagement or release of the first clutch C1 and the second clutch C2. In the second parallel mode, the speed line of the power split device PD and the speed lines of the first differential gear unit PR1 and the second differential gear unit PR2 that form the reduction gear PR overlap, as is also shown in FIG. 34. Therefore, the switch when switching from the second split mode into the second parallel mode can be a synchronized switch that engages the first clutch C1 while the rotation speeds of the first sun gear S1 and the second sun gear S2 that are engaged by the first clutch C1 are the same, and the switch when switching from the first split mode into the second parallel mode can be a synchronized switch that engages the second clutch C2 while the rotation speeds of the carrier CA0 and the first ring gear R1 and the second carrier CA2, which are engaged together by the second clutch C2, are the same. Also, a switch from the second parallel mode into the first split mode or the second split mode can be performed by simply releasing the first clutch C1 or the second clutch C2. Therefore, according to the structure in this application, with a switch between the first split mode or the second split mode and the second parallel mode, it is not necessary to place the speed change mechanism in a neutral state as is common with the related art.

As described above, of the three engagement devices C1, C2, and C3, the second clutch C2 is always engaged when the rotation speeds of the engagement members on both sides are the same. Also, when engaging the second clutch C2 in this way, the torque of the second rotating electrical machine MG2 can be controlled to "0". Also at this time, fluctuation in the torque transmitted to the output member O can be suppressed by adjusting the torque of the engine E. Performing this type of control enables the second clutch C2 that serves as the second engagement device EE2 (i.e., the second split mode engagement device) to be formed by a mesh type engagement device.

5-10. MG2 Disconnected Mode

In the hybrid drive system H according to this embodiment, the MG2 disconnected mode that transmits driving force output from the engine E to the output member O can also be realized by releasing all of the engagement devices, i.e., the first clutch C1, the second clutch C2, and the third clutch C3, and controlling the rotation and driving force of the first rotating electrical machine MG1. At this time, the first rotating electrical machine MG1 may be controlled to generate power to operate accessories, while outputting the reaction force of the engine torque.

6. Sixth Embodiment

Figure 35:
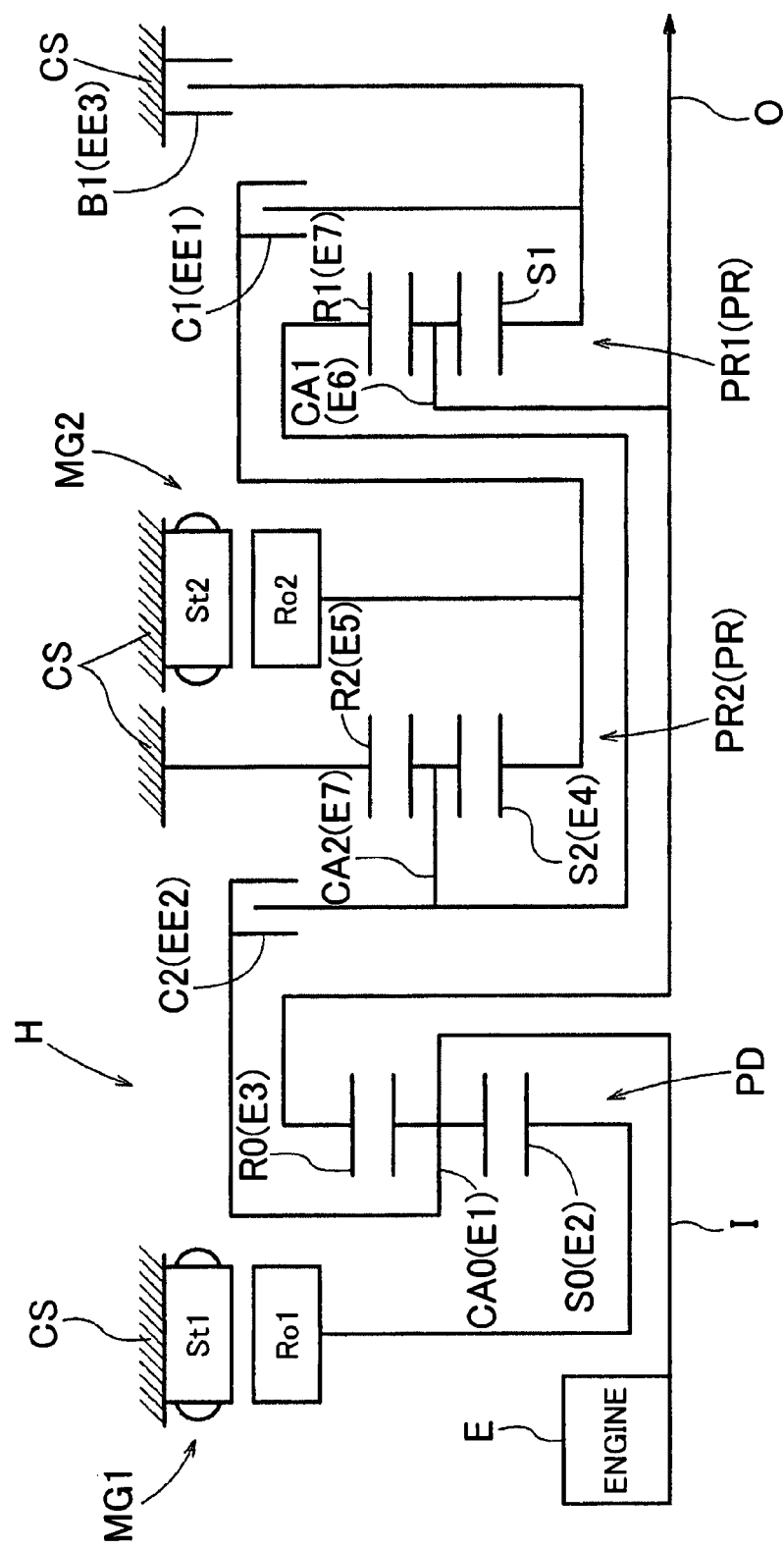
FIG. 35 is a skeleton view of the structure of a hybrid drive system according to a sixth embodiment of the present invention.

Next, a sixth embodiment of the present invention will be described. FIG. 35 is a skeleton view of the structure of the hybrid drive system H according to this embodiment. Incidentally, a portion of the axisymmetric structure is omitted in FIG. 35, just as it is FIG. 1. The hybrid drive system H according to this embodiment is able to realize a first split mode, a second split mode, a third split mode, a first parallel mode, and a second parallel mode, similar to the third embodiment described above. However, the structures of the reduction gear PR and the three engagement devices differ from those in the third embodiment described above. Hereinafter, mainly the differences between the hybrid drive system H according to this embodiment and the hybrid drive system H according to the third embodiment described above will be described. Incidentally, those points that are not specifically described are similar to those the third embodiment described above.

6-1. Mechanical Structure of the Hybrid Drive System

In this embodiment as well, the structure of the power split device PD is similar to that in the third embodiment (and the first embodiment) described above. However, the structure of the reduction gear PR differs from that in the third embodiment. That is, in this embodiment, the reduction gear PR is fanned of a combination of a first differential gear unit PR1 and a second differential gear unit PR2, each of which has three rotating elements, as shown in FIG. 35.

The first differential gear unit PR1 is a differential gear unit that has three rotating elements. Here, the first differential gear unit PR1 is formed from a single pinion type planetary gear set. That is, the first differential gear unit PR1 has, as rotating elements, a first carrier CA1 that supports a plurality of pinion gears, and a first sun gear S1 and a first ring gear R1 that mesh with these pinion gears. The first sun gear S1 is selectively drivingly connected to the second sun gear S2 of the second differential gear unit PR2 and the rotor Ro2 of the second rotating electrical machine MG2 via the first clutch C1, and is also selectively held to a case CS which is a non-rotating member by the first brake B1. The first carrier CA1 is drivingly connected to the ring gear R0 (i.e., an output rotating element E3) of the power split device PD so as to rotate together with the ring gear R0, and is also drivingly connected to the output member O. Therefore, this first carrier CA1 serves as a first output rotating element E6 of the reduction gear PR. The first ring gear R1 is drivingly connected to the second carrier CA2 of the second differential gear unit PR2 so as to rotate together with the second carrier CA2, and is also selectively drivingly connected to the carrier CA0 of the power split device PD and the input member I via the second clutch C2. Therefore, the first ring gear R1 of the first differential gear unit PR1 and the second carrier CA2 of the second differential gear unit PR2 serve as a second output rotating element E7 of the reduction gear PR. The three rotating elements of the first differential gear unit PR1 are, in order of rotation speed, the first ring gear R1, the first carrier CA1, and the first sun gear S1. Accordingly, in this embodiment, the first ring gear R1 is a first rotating element of the first differential gear unit PR1, the first carrier CA1 is a second rotating element of the first differential gear unit PR1, and the first sun gear S1 is a third rotating element of the first differential gear unit PR1.

The second differential gear unit PR2 is a differential gear unit that has three rotating elements. In this case, the second differential gear unit PR2 is formed by a single pinion type planetary gear set. That is, the second differential gear unit PR2 has, as rotating elements, a second carrier CA2 that supports a plurality of pinion gears, and a second sun gear S2 and a second ring gear R2 that are both in mesh with those pinion gears. The second sun gear S2 is drivingly connected to the rotor Ro2 of the second rotating electrical machine MG2 so as to rotate together with the rotor Ro2. Therefore, the second sun gear S2 of the second differential gear unit PR2 is an input rotating element E4 of the reduction gear PR. Also, as described above, the second sun gear S2 is selectively drivingly connected to the first sun gear S1 of the first differential gear unit PR1 via the first clutch C1. As described above, the second carrier CA2 is drivingly connected to the first ring gear R1 of the first differential gear unit PR1 so as to rotate with the first ring gear R1, and is also selectively drivingly connected to the carrier CA0 of the power split device PD and the input member I via a second clutch C2, and thus is a second output rotating element E7 of the reduction gear PR. The second ring gear R2 is held to a case CS which is a non-rotating member. Accordingly, this second ring gear R2 is a stationary element E5 of the reduction gear PR. The three rotating elements of the second differential gear unit PR2 are, in order of rotation speed, the second ring gear R2, the second carrier CA2, and the second sun gear S2. Accordingly, in this embodiment, the second ring gear R2 is a first rotating element of the second differential gear unit PR2, the second carrier CA2 is a second rotating element of the second differential gear unit PR2, and the second sun gear S2 is a third rotating element of the second differential gear unit PR2.

As described above, the reduction gear PR is formed by drivingly connecting one rotating element (the first ring gear R1 in this case) of the first differential gear unit PR1 that has three rotating elements to one rotating element (the second carrier CA2 in this case) of the second differential gear unit PR2 that has three rotating elements so that those two rotating elements rotate together. Accordingly, the reduction gear PR is a differential gear unit that has five rotating elements in all. As shown in the upper parts of the velocity diagrams in FIGS. 37 to 41, of these five rotating elements of the reduction gear PR, excluding the first sun gear S1, the four of the rotating elements are, in order of rotation speed, the second ring gear R2, the first ring gear R1 and the second carrier CA2 that rotate together, the first carrier CA1, and the second sun gear S2. In other words, the order of rotation speed of these four rotating elements of the reduction gear PR is i) the stationary element E5, ii) the second output rotating element E7, iii) the first output rotating element E6, and iv) the input rotating element E4.

The first clutch C1 selectively drivingly connects or disconnects the first sun gear S1 of the first differential gear unit PR1 to or from the second sun gear S2 of the second differential gear unit PR2 and the rotor Ro2 of the second rotating electrical machine MG2. Accordingly, the first clutch C1 constitutes a first engagement device EE1 of the present invention. When this first clutch C1 is engaged, the first sun gear S1 is drivingly connected to the second sun gear S2. When the first clutch C1 is released, the first sun gear S1 is drivingly disconnected from the second sun gear S2. As will be described later, a first split mode is realized by engaging this first clutch C1, so the first clutch C1 that is the first engagement device EE1 functions as a first split mode engagement device.

The second clutch C2 selectively drivingly connects or disconnects the carrier CA0 that is an input rotating element E1 of the power split device PD to or from the first ring gear R1 and the second carrier CA2 that constitute a second output rotating element E7 of the reduction gear PR. Accordingly, the second clutch C2 constitutes a second engagement device EE2 of the present invention. When this second clutch C2 is engaged, the first ring gear R1 and the second carrier CA2 are drivingly connected to the carrier CA0. When the second clutch C2 is released, the first ring gear R1 and the second carrier CA2 are drivingly disconnected from the carrier CA0. As will be described later, a second split mode is realized by engaging this second clutch C2, so the second clutch C2 that is the second engagement device EE2 functions as a second split mode engagement device.

The first brake B1 selectively holds the first sun gear S1 of the first differential gear unit PR1. When this first brake B1 is engaged, the rotation of the second rotating electrical machine MG2 that has been decelerated by the second differential gear unit PR2 and transmitted to the second carrier CA2 and the first ring gear R1 is further decelerated by the first differential gear unit PR1 and then transmitted from the first carrier CA1 to the output member O. In this embodiment, this first brake B1 constitutes a third engagement device EE3 of the present invention. Also, as will be described later, a third split mode is realized by engaging this first brake B1, so this first brake B1 functions as a third split mode engagement device.

In this embodiment, the first clutch C1, the second clutch C2, and the first brake B1 are all friction engagement devices. Multi-disc clutches or multi-disc brakes that operate by hydraulic pressure may be used for these engagement devices. Similar to the first embodiment described with reference to FIG. 2, hydraulic pressure is supplied to these engagement devices C1, C2, and B1 from the hydraulic control apparatus 35 that operates in response to a control command from the main control unit 31. Engagement or release of these engagement devices C1, C2, and 131 is controlled by that hydraulic pressure. Hydraulic pressure generated by an oil pump, not shown, is supplied to this hydraulic control apparatus 35.

Incidentally, in the hybrid drive system H according to this embodiment, a mesh type engagement device may be used for the second clutch C2 that is the second engagement device EE2. As will be described later, in this embodiment, the second clutch C2 can be engaged when the second rotating electrical machine MG2 is not generating driving force. Therefore, even if the second clutch C2 is formed by a mesh type engagement device, it is able to switch to an engaged state nicely. Also, if the second clutch C2 is a mesh type engagement device, hydraulic pressure for generating engagement pressure or release pressure is not necessary so a loss of driving force due to the hydraulic pump can be suppressed and the transfer efficiency of the drive system can be easily increased compared with when this second clutch C2 is a friction engagement device. Incidentally, in order to obviate the need for a supply of hydraulic pressure, the operation to switch this mesh type engagement device between an engaged state and a released state may be performed by an electromagnetic actuator.

6-2. Structure of the Control System of the Hybrid Drive System

The control system in this embodiment has generally the same structure as that according to the third embodiment described above with reference to FIG. 2 according to the first embodiment described above, except that the engagement devices are changed from the brakes B1, B2, and B3 to the first clutch C1, the second clutch C2, and the first brake B1.

6-3. Operating Modes of the Hybrid Drive System

Figures 36, 37:
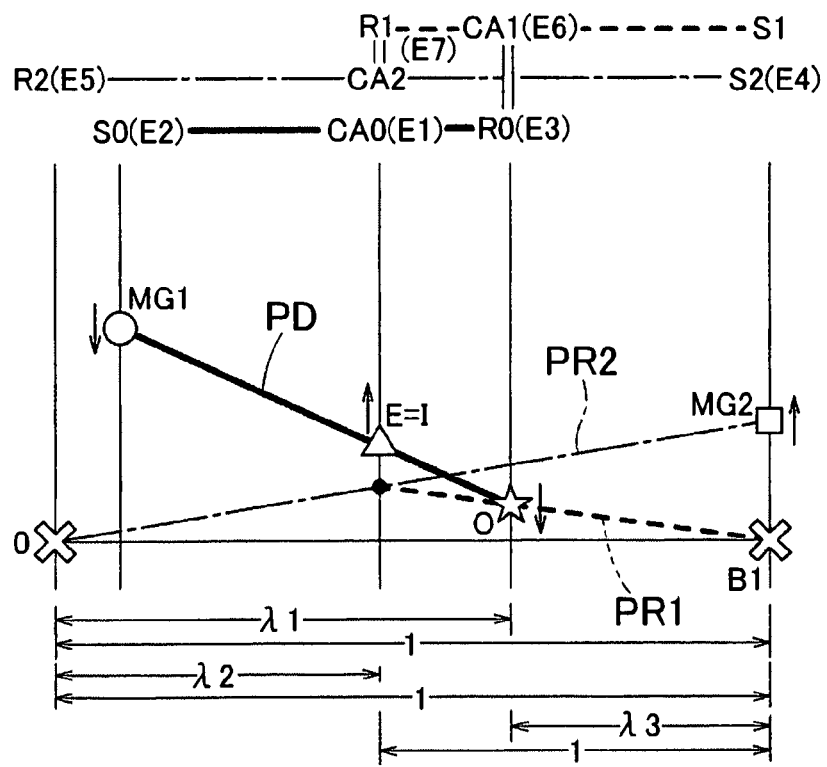
FIG. 36 is an operation table showing the operating states of a plurality of engagement devices in each mode according to the sixth embodiment of the present invention.
FIG. 37 is a velocity diagram of a third split mode according to the sixth embodiment of the present invention.

Next, the operating modes that can be realized by the hybrid drive system H according to this embodiment will be described. FIG. 36 is an operation table showing the operating states of the first clutch C1 (i.e., the first engagement device EE1), the second clutch C2 (i.e., the second engagement device EE2), and the first brake B1 (i.e., the third engagement device EE3) in each operating mode. In the table, a circle indicates that the corresponding engagement device is engaged (i.e., connected), and the absence of a circle indicates that the corresponding device is released (i.e., disconnected).

FIGS. 37 to 41 are velocity diagrams that show the operating states of the power split device PD, the first differential gear unit PR1, and the second differential gear unit PR2 in each operating mode. The description method of these velocity diagrams is the same as it is with FIGS. 5A and 5B and the like according to the first embodiment described above. However, the plurality of vertical axes that are arranged parallel with one another correspond to the rotating elements of the power split device PD, the first differential gear unit PR1, and the second differential gear unit PR2. The "S0", "CA0", and "R0" above the vertical axes correspond to the sun gear S0, the carrier CA0, and the ring gear R0 of the power split device PD, respectively, the "S1", "CA1", and "R1" above the vertical axes correspond to the first sun gear S1, the first carrier CA1, and the first ring gear R1 of the first differential gear unit PR1, respectively, and the "S2", "CA2", and "R2" above the vertical axes correspond to the second sun gear S2, the second carrier CA2, and the second ring gear R2 of the second differential gear unit PR2, respectively. The "=" that connects the reference characters of rotating elements above the vertical axes indicates that a plurality of rotating elements are drivingly connected so as to rotate together. The reference character "C1" or "C2" accompanying that "=" indicates that those rotating elements are drivingly connected by the engagement of the first clutch C1 or the second clutch C2. Also, an "x" in the drawings indicates that the corresponding rotating element is held to a case CS which is a non-rotating member. The reference character "B1" accompanying that "x" indicates that that rotating element is held by engagement of the first brake B1. Hereinafter, the operating state of the hybrid drive system H in each of the plurality of operating modes will be described in detail.

6-4. Third Split Mode

The third split mode is realized by engaging the first brake B1, and releasing the first clutch C1 and the second clutch C2, as shown in FIG. 36. FIG. 37 is a velocity diagram of this third split mode. The driving force that is transmitted from the engine E to the carrier CA0 of the power split device PD via the input member I is split by the power split device PD and transmitted to the output member O. At this time, the first rotating electrical machine MG1 operates as a reaction force receiver.

In the third split mode, releasing the second clutch C2 places the second carrier CA2 and the first ring gear R1 in states in which they are able to rotate irrespective of the carrier CA0 of the power split device PD. Also, releasing the first clutch C1 places the first sun gear S1 in a state in which it can rotate irrespective of the second sun gear S2. Also, engaging the first brake B1 holds the first sun gear S1 of the first differential gear unit PR1 to a case CS that is a non-rotating member. In this state, the rotation of the first ring gear R1 that is drivingly connected to the second carrier CA2 of the second differential gear unit PR2 is decelerated by the first differential gear unit PR1 and transmitted to the first carrier CA1 and the output member O. Here, the rotation of the second rotating electrical machine MG2 that is drivingly connected to the second sun gear S2 so as to rotate together with the second sun gear S2 is decelerated by the second differential gear unit PR2 and then transmitted. Therefore, in this state, the rotation and driving force of the second rotating electrical machine MG2 are decelerated by both the second differential gear unit PR2 and the first differential gear unit PR1, and then transmitted from the first carrier CA1 to the output member O. More specifically, as shown in the lower part of the velocity diagram in FIG. 37, in the third split mode, the rotation speed of the second rotating electrical machine MG2 is decelerated "γ2" times (γ2<γ1<1) and then transmitted to the second carrier CA2 and the first ring gear R1, after which it is further decelerated "γ3" times (γ3<1) by the first differential gear unit PR1, and then transmitted to the first carrier CA1 and the output member O. Therefore, the rotation speed of the second rotating electrical machine MG2 is ultimately decelerated "γ2×γ3" times and then transmitted to the output member O. The reduction gear ratio at this time is "1/(γ2×γ3)". Accordingly, the torque of the second rotating electrical machine MG2 is multiplied "1/(γ2×γ3)" times and then transmitted to the output member O. In this third split mode, the rotation of the input rotating element E4 (i.e., the second sun gear S2) that is decelerated by the reduction gear PR and transmitted to the output member O via the first output rotating element E6 (i.e., the first carrier CA1) corresponds to third decelerated rotation of the present invention. This third decelerated rotation is decelerated more than first decelerated rotation (i.e., the reduction gear ratio is larger) of a first split mode that will be described later, so the third decelerated rotation is slower than the first decelerated rotation with respect to the same rotation of the input rotating element E4.

The effects from providing this kind of third split mode, as well as the operation of the first rotating electrical machine MG1 and the second rotating electrical machine MG2 in this third split mode, are the same as they are in the third embodiment described above.

6-5. First Split Mode

Figure 38:
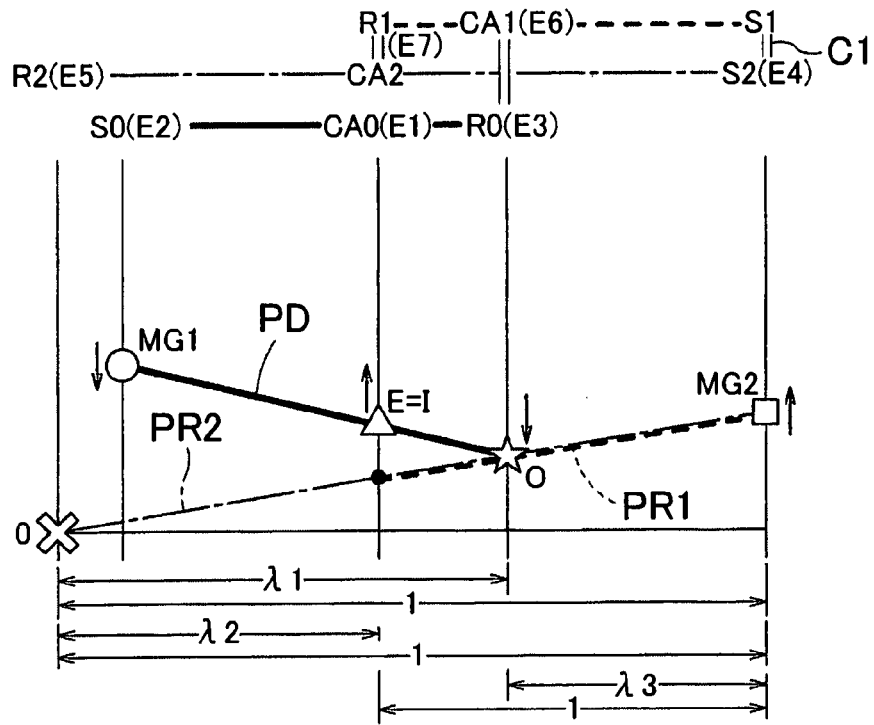
FIG. 38 is a velocity diagram of a first split mode according to the sixth embodiment of the present invention.

The first split mode is realized by engaging the first clutch C1, and releasing the second clutch C2 and the first brake B1, as shown in FIG. 36. FIG. 38 is a velocity diagram of this first split mode. The driving force that is transmitted from the engine E to the carrier CA0 of the power split device PD via the input member I is split by the power split device PD and transmitted to the output member O. At this time, the first rotating electrical machine MG1 operates as a reaction force receiver.

In the first split mode, releasing the second clutch C2 places the second carrier CA2 and the first ring gear R1 in states in which they are able to rotate irrespective of the carrier CA0 of the power split device PD. Also, releasing the first brake B1 enables the first sun gear S1 to rotate freely. Also, engaging the first clutch C1 directly connects the first sun gear S1 of the first differential gear unit PR1 to the second sun gear S2 of the second differential gear unit PR2 and the rotor Ro2 of the second rotating electrical machine MG2 so that the first sun gear S1 rotates together with the second sun gear S2 and the rotor Ro2. In this state, the first differential gear unit PR1 and the second differential gear unit PR2 together form a differential gear unit having four elements in all, and of those rotating elements, the rotating element that is at one end (i.e., the second ring gear R2) is held to the case CS. As a result, the rotation and driving force of the second rotating electrical machine MG2 that is drivingly connected to the second sun gear S2 is decelerated by the first differential gear unit PR1 and the second differential gear unit PR2 and transmitted to the output member O. More specifically, as shown in the lower part of the velocity diagram in FIG. 38, in the first split mode, the rotation speed of the second rotating electrical machine MG2 is decelerated "γ1" times (γ2<γ1<1) and then transmitted to the output member O. The reduction gear ratio at this time is "1/γ1". Accordingly, the torque of the second rotating electrical machine MG2 is multiplied "1/γ1" times and then transmitted to the output member O. In this first split mode, the rotation of the input rotating element E4 (i.e., the second sun gear S2) that is decelerated by the reduction gear PR and transmitted to the output member O via the first output rotating element E6 (i.e., the first carrier CA1) corresponds to first decelerated rotation of the present invention. This first decelerated rotation is not decelerated as much as the third decelerated rotation or second decelerated rotation that will be described later (i.e., the reduction gear ratio is smaller), so the first decelerated rotation is faster than the third decelerated rotation and the second decelerated rotation with respect to the same rotation of the input rotating element E4. The operation of the first rotating electrical machine MG1 and the second rotating electrical machine MG2 in this kind of first split mode is the same as it is in the third embodiment described above.

6-6. Second Split Mode

Figure 39:
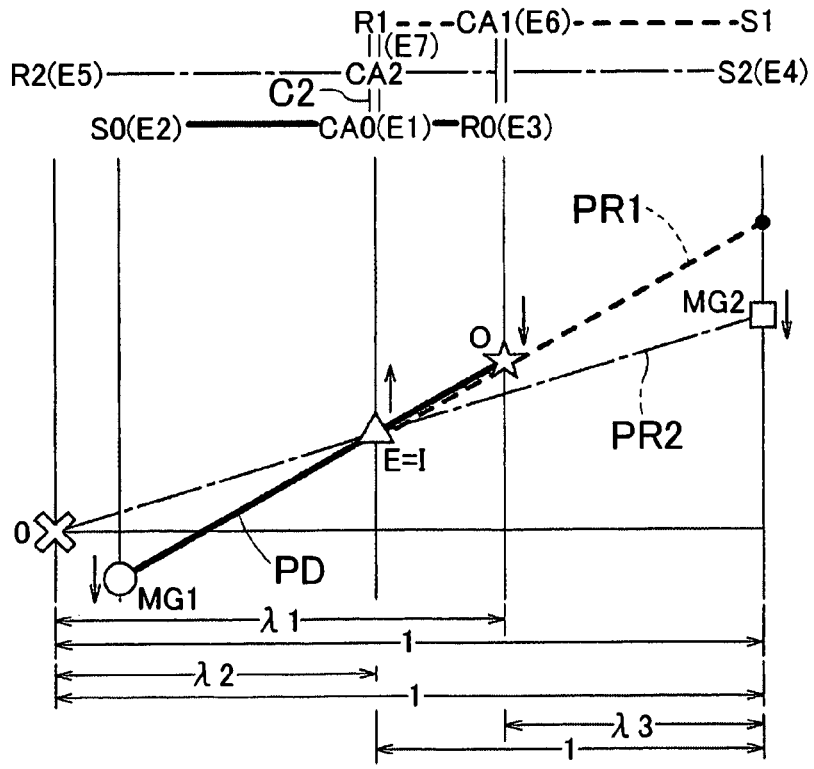
FIG. 39 is a velocity diagram of a second split mode according to the sixth embodiment of the present invention.

The second split mode is realized by engaging the second clutch C2, and releasing the first clutch C1 and the first brake B1, as shown in FIG. 36. FIG. 39 is a velocity diagram of this second split mode. In this operating mode, the vehicle speed is a high speed and the running torque is relatively low. Similar to the first split mode and the third split mode, the driving force transmitted from the engine E to the carrier CA0 of the power split device PD via the input member I is split by the power split device PD and transmitted to the output member O. At this time, the first rotating electrical machine MG1 operates as a reaction force receiver.

In the second split mode, releasing the first clutch C1 places the first sun gear S1 in a state in which it is able to rotate irrespective of the second sun gear S2. Also, releasing the first brake B1 enables the first sun gear S1 to rotate freely. Also, engaging the second clutch C2 directly connects the carrier CA0 to the first ring gear R1 and the second carrier CA2 so that the carrier CA0 rotates together with the first ring gear R1 and the second carrier CA2. In this state, the power split device PD and the first differential gear unit PR1 of the reduction gear PR together form a differential gear unit having four elements in all. Also, the rotation and driving force of the second sun gear S2 that rotates together with the rotor Ro2 of the second rotating electrical machine MG2 are decelerated by the second differential gear unit PR2 and transmitted to the second carrier CA2 that is a second output rotating element E7 of the reduction gear PR. Here, the second carrier CA2 is drivingly connected to the carrier CA0 and the input member I so as to rotate together with the carrier CA0 and the input member I, so the decelerated rotation and driving force of the second rotating electrical machine MG2 are transmitted to the carrier CA0 of the power split device PD and the input member I via the second carrier CA2. More specifically, as shown in the lower part of the velocity diagram in FIG. 39, in the second split mode, the rotation speed of the second rotating electrical machine MG2 is decelerated "γ2" times (γ2<γ1<1) and then transmitted to the carrier CA0 of the power split device PD. The reduction gear ratio at this time is "1/γ2". Accordingly, the torque of the second rotating electrical machine MG2 is multiplied "1/γ2" times and then transmitted to the carrier CA0 of the power split device PD. In this second split mode, the rotation of the input rotating element E4 (i.e., the second sun gear S2) that is decelerated by the reduction gear PR and transmitted to the input rotating element E1 (i.e., the carrier CA0) of the power split device PD via the second output rotating element E7 (i.e., the second carrier CA2) corresponds to second decelerated rotation of the present invention. This second decelerated rotation is decelerated more than the first decelerated rotation (i.e., the reduction gear ratio is larger), so the second decelerated rotation is slower than the first decelerated rotation with respect to the same rotation of the input rotating element E4.

The effects from providing this kind of second split mode, as well as the operation of the first rotating electrical machine MG1 and the second rotating electrical machine MG2 in this second split mode, are the same as they are in the third embodiment described above.

6-7. First Parallel Mode

Figure 40:
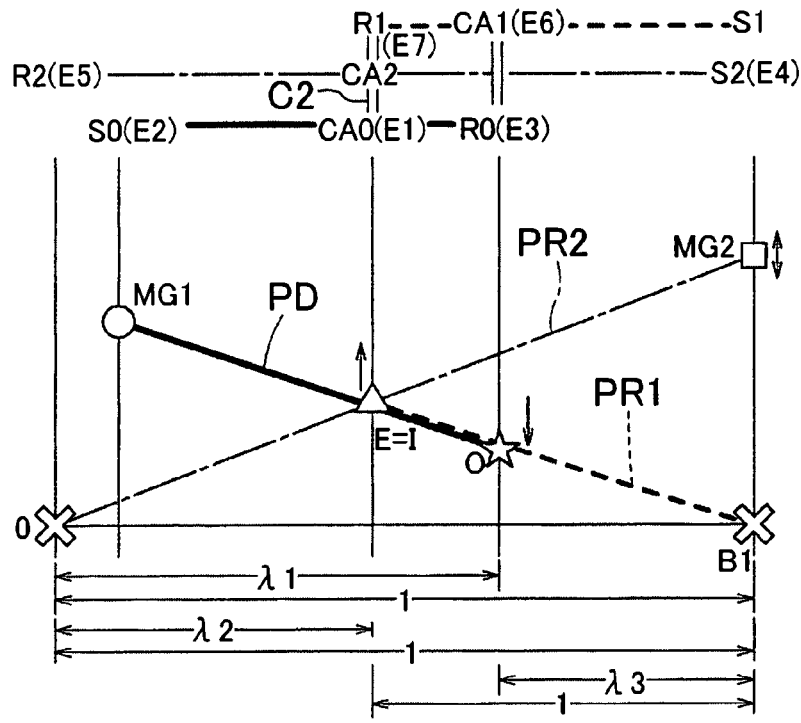
FIG. 40 is a velocity diagram of a first parallel mode according to the sixth embodiment of the present invention.

The first parallel mode is realized by engaging the second clutch C2 and the first brake B1, and releasing the first clutch C1, as shown in FIG. 36. FIG. 40 is a velocity diagram of this first parallel mode. As shown in the drawing, the second clutch C2 is engaged, so the carrier CA0 is drivingly connected to the first ring gear R1 and the second carrier CA2 so as to rotate together with the first ring gear R1 and the second carrier CA2. In this state, the power split device PD and the first differential gear unit PR1 of the reduction gear PR together form a differential gear unit having four elements in all. Also, the first brake B1 is engaged, so the first sun gear S1 of the first differential gear unit PR1 is held to a case CS which is a non-rotating member. In this state, the rotation and driving force of the carrier CA0 of the power split device PD and the input member I that are drivingly connected to the second carrier CA2 and the first ring gear R1 of the reduction gear PR so as to rotate together with the second carrier CA2 and the first ring gear R1 are decelerated by a fixed reduction gear ratio by the first differential gear unit PR1 and transmitted to the output member O. At this time, the ratios of the rotation speed of the second sun gear S2 that is drivingly connected to the rotor Rot of the second rotating electrical machine MG2 with respect to the rotation speeds of the rotating elements of the first differential gear unit PR1 and the power split device PD via the second differential gear unit PR2 are restricted to being constant. As a result, the ratios of the rotation speeds of all of the rotating elements of the reduction gear PR and the power split device PD are restricted to being constant. Therefore, in this operating mode, running can be performed using the driving force from the engine E. The first rotating electrical machine MG1 is controlled to a state in which it neither generates power nor performs powering, or a state in which it generates power to operate accessories. Also, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

6-8. Second Parallel Mode

Figure 41:
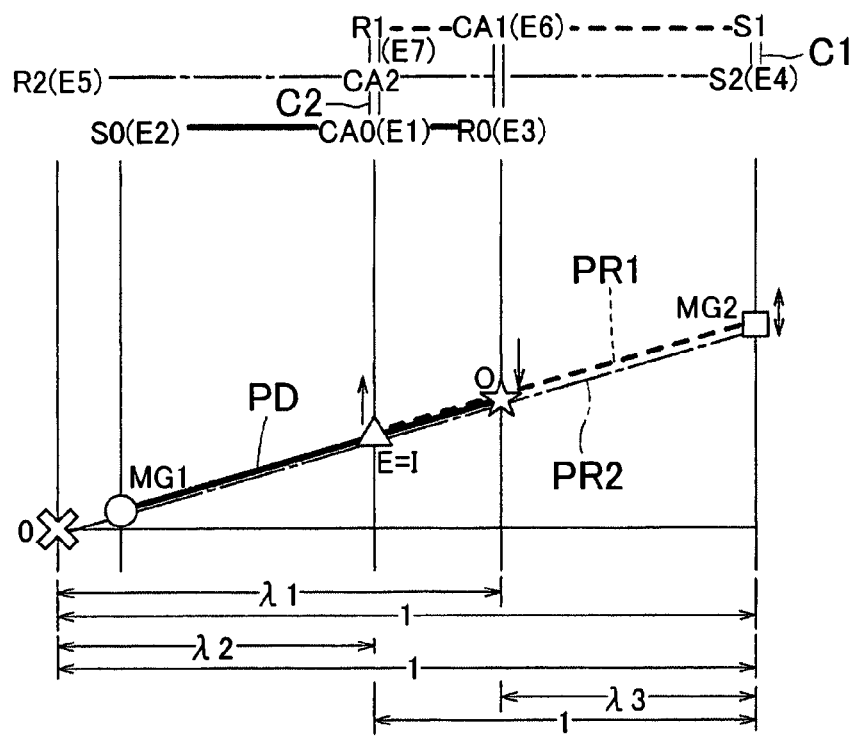
FIG. 41 is a velocity diagram of a second parallel mode according to the sixth embodiment of the present invention.

The second parallel mode is realized by engaging the first clutch C1 and the second clutch C2, and releasing the first brake B1, as shown in FIG. 36. FIG. 41 is a velocity diagram of this second parallel mode. As shown in the drawing, both the first clutch C1 and the second clutch C2 are engaged, so the power split device PD, the first differential gear unit PR1, and the second differential gear unit PR2 together form a differential gear unit having five elements in all, with the second ring gear R2 held to a case CS which is a non-rotating member. As a result, the ratios of the rotation speeds of all of the rotating elements of the reduction gear PR and the power split device PD are restricted to being constant. In this operating mode, running can be performed using the driving force from the engine E. The first rotating electrical machine MG1 is controlled to a state in which it neither generates power nor performs powering while it rotates at low speed, or a state in which it generates power to operates accessories. In this state, the second rotating electrical machine MG2 fundamentally neither generates power nor performs powering. However, when necessary, the second rotating electrical machine MG2 may be used for powering using power from the battery 21, or may be used to regenerate power (i.e., generate power) using the inertia force of the vehicle.

6-9. Switching Operating Modes

A switch between the third split mode and the first split mode is performed by changing over the first clutch C1 and the first brake B1. Adjusting the rotation speed of the second rotating electrical machine MG2 makes it possible to adjust the rotation speeds of the first sun gear S1 and the second sun gear S2 that are engaged together by the first clutch C1 so that they are approximately the same when switching from the third split mode to the first split mode, or adjust the rotation speed of the first carrier CA1 that is held by the first brake B1 so that it is close to zero when switching from the first split mode to the third split mode. However, in order switch modes rapidly, the first clutch C1 and the first brake B1 basically need to be engaged while there is a difference in the rotation speeds of the engagement members on both sides. Therefore, the first clutch C1 and the first brake B1 may be formed by friction engagement devices.

A switch between the third split mode and the first parallel mode is performed by engaging or releasing the second clutch C2 while the first brake B1 remains engaged. As the rotation speed of the output member O increases while the vehicle is running in the third split mode, the rotation speed of the carrier CA0 of the power split device PD and the rotation speed of the first ring gear R1 and the second carrier CA2 of the reduction gear PR gradually approach one another. The switch to the first parallel mode can be made by engaging the second clutch C2 while these rotation speeds are the same. Also, a switch from the first parallel mode into the third split mode can be performed simply by releasing the second clutch C2. Accordingly, the switch between the third split mode and the first parallel mode can be a synchronized switch that engages the second clutch C2 when the rotation speeds of the carrier CA0 and the first ring gear R1 and the second carrier CA2 of the reduction gear PR, which are engaged together by the second clutch C2, are the same. Therefore, according to the structure in this application, with a switch between the third split mode and the first parallel mode, it is not necessary to place the speed change mechanism in a neutral state as is common with the related art.

Also, a switch between the second parallel mode and the first split mode or the second split mode is performed by switching the engagement or release of the first clutch C1 and the second clutch C2. In the second parallel mode, the speed line of the power split device PD and the speed lines of the first differential gear unit PR1 and the second differential gear unit PR2 that form the reduction gear PR overlap, as is also shown in FIG. 41. Therefore, the switch when switching from the second split mode into the second parallel mode can be a synchronized switch that engages the first clutch C1 while the rotation speeds of the first sun gear S1 and the second sun gear S2 of the reduction gear PR that are engaged by the first clutch C1 are the same, and the switch when switching from the first split mode into the second parallel mode can be a synchronized switch that engages the second clutch C2 while the rotation speeds of the carrier CA0 of the power split device PD and the first ring gear R1 and the second carrier CA2 of the reduction gear PR, which are engaged together by the second clutch C2, are the same. Also, a switch from the second parallel mode into the first split mode or the second split mode can be performed by simply releasing the first clutch C1 or the second clutch C2. Therefore, according to the structure in this application, with a switch between the first split mode or the second split mode and the second parallel mode, it is not necessary to place the speed change mechanism in a neutral state as is common with the related art.

As described above, of the three engagement devices C1, C2, and B1, the second clutch C2 is always engaged when the rotation speeds of the engagement members on both sides are the same. Also, when engaging the second clutch C2 in this way, the torque of the second rotating electrical machine MG2 can be controlled to "0". Also at this time, fluctuation in the torque transmitted to the output member o can be suppressed by adjusting the torque of the engine E. Performing this type of control enables the second clutch C2 that serves as the second engagement device EE2 (i.e., the second split mode engagement device) to be formed by a mesh type engagement device.

6-10. MG2 Disconnected Mode

In the hybrid drive system H according to this embodiment, the MG2 disconnected mode that transmits driving force output from the engine E to the output member O can also be realized by releasing all of the engagement devices, i.e., the first clutch C1, the second clutch C2, and the first brake B1, and controlling the rotation and driving force of the first rotating electrical machine MG1. At this time, the first rotating electrical machine MG1 may be controlled to generate power to operate accessories, while outputting the reaction force of the engine torque.

Figure 42:
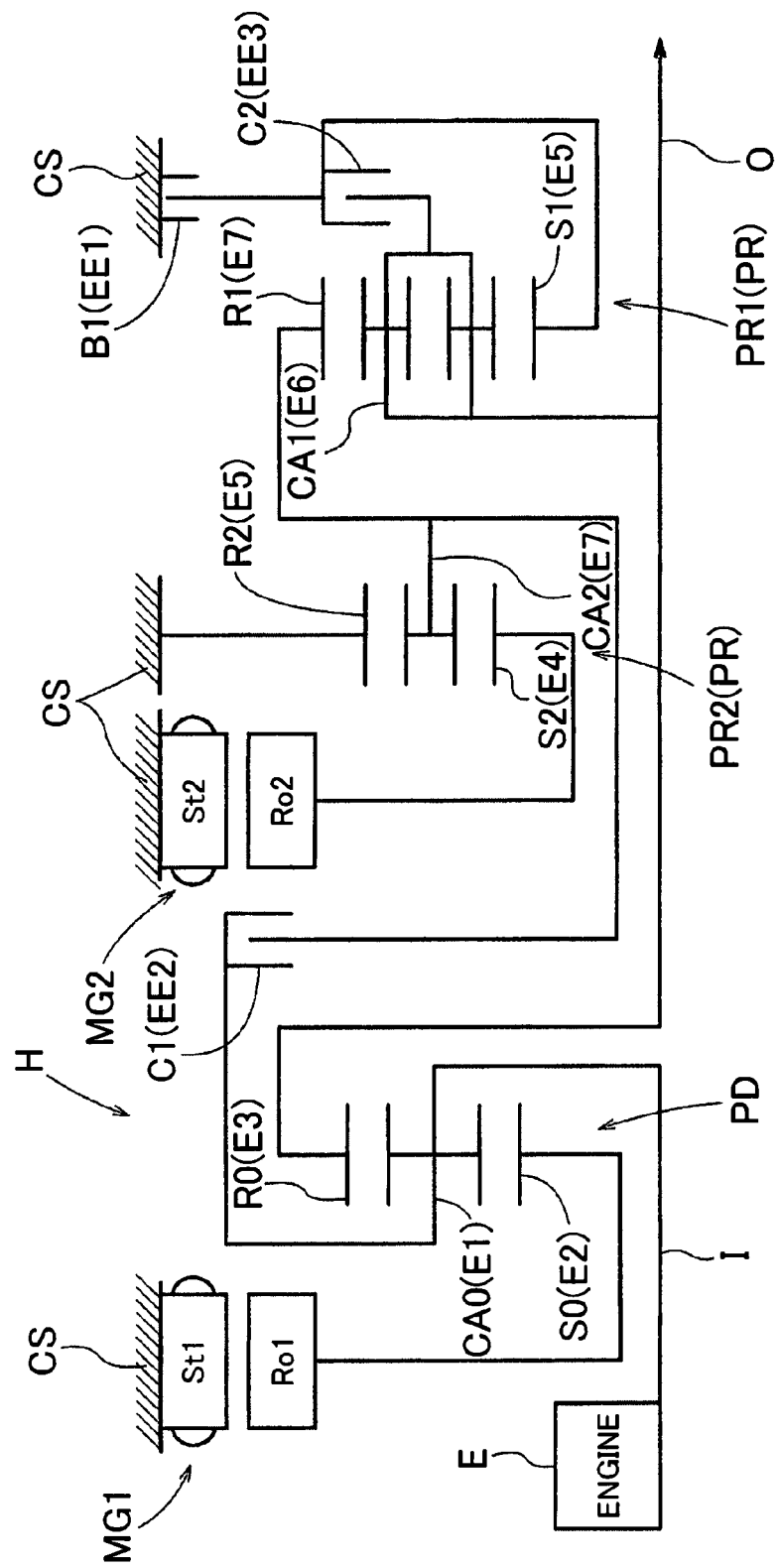
FIG. 42 is a skeleton view of the structure of a hybrid drive system according to another embodiment of the present invention.

7. Other Embodiments (1) The specific structure of the reduction gear PR and the connective structures of the engagement devices with respect to the rotating elements of the reduction gear PR described in the foregoing embodiments are simply examples. All structures, even structures other than those described above, in which the structure of the present invention is able to be realized are included in the scope of the present invention. For example, structuring the reduction gear PR as shown in FIG. 42 is also an embodiment of the present invention. The structure of the reduction gear PR shown in FIG. 42 resembles the structure of the reduction gear PR of the hybrid drive system H according to the fourth embodiment described above except that the first rotating element and the third rotating element of the first differential gear unit PR1 are changed. That is, with the reduction gear PR shown in FIG. 42, the first sun gear S1 is the first rotating element and serves as the stationary element E5 of the reduction gear PR, and the first carrier CA1 is the third rotating element and serves as the first output rotating element E6 of the reduction gear PR. The other structure is the same as that of the fourth embodiment described above.

(2) In the first embodiment described above, the rotation speed of the first rotating electrical machine MG1 is zero in the parallel mode. In the second to fifth embodiments, the rotation speed of the first rotating electrical machine MG1 is negative in the parallel mode or the second parallel mode. In the sixth embodiment, the rotation speed of the first rotating electrical machine MG1 is positive in the second parallel mode. However, the rotation speed of the first rotating electrical machine MG1 may also be set appropriately to zero, positive, or negative in the parallel mode or the second parallel mode according to the structure of the vehicle or the like. The rotation speed of the first rotating electrical machine MG1 in the parallel mode or the second parallel mode may be set by adjusting the gear ratio of the differential gear unit that constitutes the power split device PD and the reduction gear PR. That is, the rotation speed of the first rotating electrical machine MG1 in the same mode can be made zero by making the position of the reaction force rotating element E2 of the power split device PD on the velocity diagram the same as that of the stationary element E5 of the reduction gear PR. On the other hand, if the position of the reaction force rotating element E2 is on the same side of the stationary element E5 as the input rotating element E1 of the power split device PD, the rotation speed of the first rotating electrical machine MG1 in the same mode can be made positive, and if the position of the reaction force rotating element E2 is on the opposite side of the stationary element E5 as the input rotating element E1 of the power split device PD, the rotation speed of the first rotating electrical machine MG1 in the same mode can be made negative.

(3) In the first and second embodiments described above, for the hybrid operating modes, basically, the first split mode, the parallel mode, and the second split mode are selected in that order as the vehicle speed increases. However, the order in which the modes are selected that is described in these embodiments is simply an example. The modes may also be selected in another order may so that driving can performed appropriately according to the running state of the vehicle. For example, a structure in which the first split mode, the second split mode, and the parallel mode are selected in that order as the vehicle speed increases is also an embodiment of the present invention. Similarly, in the third to sixth embodiments, for the hybrid operating modes, basically the third split mode, the first split mode, the second parallel mode, and the second split mode are selected in that order. However, these modes may also be selected in another order. For example, a structure in which the modes are selected in the order of the third split mode, the first split mode, the second split mode, and the second parallel mode as the vehicle speed increases is also an embodiment of the present invention. Also, the order in which the modes are selected may also be changed appropriately according to the required driving force or the state-of-charge of the battery 21 or the like, rather than the vehicle speed.

(4) In the first and second embodiments described above, for the hybrid operating modes, three modes, i.e., the first split mode, the second split mode, and the parallel mode, are switchably provided. However, the present invention is not limited to this. For example, a structure in which the first split mode and the second split mode are switchably provided, but the parallel mode is not, is also an embodiment of the present invention. Also, in the third to sixth embodiments, for the hybrid operating modes, five modes, i.e., the first split mode, the second split mode, the third split mode, the first parallel mode, and the second parallel mode, are switchably provided. However, the present invention is not limited to this. For example, a structure in which the first split mode, the second split mode, and the third split mode are switchably provided, but the two parallel modes are not, or a structure in which the first split mode, the second split mode, the third split mode, and the second parallel mode are provided, but the first parallel mode is not, is also an embodiment of the present invention. Also, a mode or modes other than those described above may also be provided.

The present invention can be used as a drive system for a hybrid vehicle in which two rotating electrical machines are provided, in addition to an engine, as driving force sources.

The invention claimed is:

1. A hybrid drive system comprising:
    an input member that is connected to an engine so that driving force is transmitted;
    an output member that is connected to a wheel so that driving force is transmitted;
    a first rotating electrical machine;
    a second rotating electrical machine;
    a power split device that performs a differential operation with at least three rotating elements including an input rotating element that is connected to the input member so that driving force is transmitted, a reaction force rotating element that is connected to the first rotating electrical machine so that driving force is transmitted, and an output rotating element that is connected to the output member so that driving force is transmitted;
    a reduction gear that performs a differential operation with at least four rotating elements including an input rotating element that is connected to the second rotating electrical machine so that driving force is transmitted, a stationary element that is held against rotation or selectively held against rotation, one of remaining rotating elements of the at least four rotating elements, other than the input rotating element and the stationary element, is a first output rotating element and another of the remaining rotating elements is a second output rotating element; and
    a control portion that selects an operating mode of the hybrid drive system, from among:
        a first split mode wherein a first decelerated rotation, from which rotation of the second rotating electrical machine is decelerated by the reduction gear, and driving force thereof are transmitted to the output rotating element of the power split device via the first output rotating element without going through the input rotating element of the power split device, and
        a second split mode wherein a second decelerated rotation, from which rotation of the second rotating electrical machine is decelerated by the reduction gear at a decelerated gear ratio that is larger than the first decelerated rotation, and driving force thereof are transmitted to the input rotating element of the power split device via the second output rotating element without going through the output rotating element of the power split device.

2. The hybrid drive system according to claim 1, wherein the order of the rotation speeds of the input rotating element, the stationary element, the first output rotating element, and the second output rotating element of the reduction gear is i) the stationary element, ii) the second output rotating element, iii) the first output rotating element, and iv) the input rotating element.

3. The hybrid drive system according to claim 1, further comprising:
    a first split mode engagement device that is engaged to realize the first split mode; and
    a second split mode engagement device that is engaged to realize the second split mode.

4. The hybrid drive system according to claim 3, wherein the switch from the first split mode into the second split mode is performed by engaging the second split mode engagement device when the rotation speeds of engagement members on both sides of the second split mode engagement device are the same; and
the switch from the second split mode into the first split mode is performed by engaging the first split mode engagement device when the rotation speeds of engagement members on both sides of the first split mode engagement device are the same.

5. The hybrid drive system according to claim 3, wherein at least the second split mode engagement device is a mesh type engagement device wherein engaging members on both sides of the second split mode engagement device are meshed with each other.

6. The hybrid drive system according to claim 1, wherein the control portion selects a parallel mode that transmits the rotation of the first output rotating element of the reduction gear to the output member, and transmits the rotation of the second output rotating element to the input rotating element of the power split device.

7. The hybrid drive system according to claim 1, wherein the control portion selects a third split mode wherein third rotation of the input rotating element of the reduction gear is transmitted to the output member via the first output rotating element of the reduction gear and is slower than the first rotation.

8. The hybrid drive system according to claim 1, wherein the reduction gear is a differential gear unit that includes four rotating elements which are, in order of rotation speed, a first rotating element, a second rotating element, a third rotating element, and a fourth rotating element; the first rotating element is held to a non-rotating member;
the second rotating element is the second output rotating element;
the third rotating element is the first output rotating element;
the fourth rotating element is connected to the second rotating electrical machine so that driving force is transmitted; and
the hybrid drive system further includes a first engagement device that selectively connects the first output rotating element to the output member so that driving force is transmitted or disconnects the first output rotating element from the output member; and a second engagement device that selectively connects the second output rotating element to the input rotating element of the power split device so that driving force is transmitted or disconnects the second output rotating element from the input rotating element of the power split device.

9. The hybrid drive system according to claim 8, wherein the reduction gear is formed by a Ravigneaux type planetary gear set that includes four rotating elements which are, in order of rotation speed, a first sun gear, a common carrier, a common ring gear, and a second sun gear;
the first sun gear is held to a non-rotating member;
the second sun gear is connected to the second rotating electrical machine so that driving force is transmitted;
the common carrier is the second output rotating element; and
the common ring gear is the first output rotating element.

10. The hybrid drive system according to claim 1, wherein the reduction gear is formed by a first differential gear unit and a second differential gear unit, each of which has three rotating elements which are, in order of rotation speed, a first rotating element, a second rotating element, and a third rotating element;
the third rotating element of the first differential gear unit is connected to the second rotating electrical machine so that driving force is transmitted;
the second rotating element of the first differential gear unit is connected to the output member so that driving force is transmitted;
the third rotating element of the second differential gear unit is connected to the second rotating electrical machine so that driving force is transmitted;
the second rotating element of the second differential gear unit is connected to the input member so that driving force is transmitted; and
the hybrid drive system further includes a first engagement element that holds or releases the first rotating element of the first differential gear unit to or from a non-rotating member; and a second engagement device that holds or releases the first rotating element of the second differential gear unit to or from a non-rotating member.

11. The hybrid drive system according to claim 10, wherein the first differential gear unit is a double pinion type planetary gear set;
the first rotating element of the first differential gear unit is a carrier, the second rotating element of the first differential gear unit is a ring gear, and the third rotating element of the first differential gear unit is a sun gear;
the second differential gear unit is a single pinion type planetary gear set; and
the first rotating element of the second differential gear unit is a ring gear; the second rotating element of the second differential gear unit is a carrier, and the third rotating element of the second differential gear unit is a sun gear.

12. The hybrid drive system according to claim 1, wherein the reduction gear is formed by a first differential gear unit that includes four rotating elements which are, in order of rotation speed, a first rotating element, a second rotating element, a third rotating element, and a fourth rotating element, and a second differential gear unit that includes three rotating elements which are, in order of rotation speed, a first rotating element, a second rotating element, and a third rotating element;
the third rotating element of the first differential gear unit is connected to the output member so that driving force is transmitted;
the fourth rotating element of the first differential gear unit is connected to the second rotating electrical machine so that driving force is transmitted;
the second rotating element of the second differential gear unit is connected to the input member so that driving force is transmitted;
the third rotating element of the second differential gear unit is connected to the second rotating electrical machine so that driving force is transmitted; and
the hybrid drive system further includes a first engagement device that holds or releases the first rotating element of the first differential gear unit to or from a non-rotating member; a second engagement device that holds or releases the first rotating element of the second differential gear unit to or from a non-rotating member; and a third engagement device that holds or releases the second rotating element of the first differential gear unit to or from a non-rotating member.

13. The hybrid drive system according to claim 12, wherein the first differential gear unit is a Ravigneaux type planetary gear set that has four rotating elements which are, in order of rotation speed, a first sun gear, a common carrier, a common ring gear, and a second sun gear; the first rotating element of the first differential gear unit is the second sun gear, the second rotating element of the first differential gear unit is the common ring gear, the third rotating element of the first differential gear unit is the common carrier, and the fourth rotating element of the first differential gear unit is the first sun gear;
the second differential gear unit is a single pinion type planetary gear set; and
the first rotating element of the second differential gear unit is a ring gear, the second rotating element of the second differential gear unit is a carrier, and the third rotating element of the second differential gear unit is a sun gear.

14. The hybrid drive system according to claim 1, wherein the reduction gear is formed by a first differential gear unit and a second differential gear unit, each of which has three rotating elements which are, in order of rotation speed, a first rotating element, a second rotating element, and a third rotating element;

the second rotating element of the first differential gear unit is connected to the second rotating element of the second differential gear unit so that driving force is transmitted;

the third rotating element of the first differential gear unit is connected to the output member so that driving force is transmitted;

the first rotating element of the second differential gear unit is held to a non-rotating member;

the third rotating element of the second differential gear unit is connected to the second rotating electrical machine so that driving force is transmitted; and the hybrid drive system further includes a first engagement device that holds or releases the first rotating element of the first differential gear unit to or from a non-rotating member; a second engagement device that selectively connects the second rotating element of the first differential gear unit and the second rotating element of the second differential gear unit to the input member so that driving force is transmitted or disconnects the second rotating element of the first differential gear unit and the second rotating element of the second differential gear unit from the input member; and a third engagement device that selectively connects the first rotating element of the first differential gear unit to the output member so that driving force is transmitted or disconnects the first rotating element of the first differential gear unit from the output member.

15. The hybrid drive system according to claim 14, wherein the first differential gear unit is a double pinion planetary gear set;

the first rotating element of the first differential gear unit is a carrier or a sun gear, the second rotating element of the first differential gear unit is a ring gear, and the third rotating element of the first differential gear unit is a sun gear or a carrier;

the second differential gear unit is a single pinion type planetary gear set; and the first rotating element of the second differential gear unit is a ring gear, the second rotating element of the second differential gear unit is a carrier, and the third rotating element of the second differential gear unit is a sun gear.

16. The hybrid drive system according to claim 1, wherein the reduction gear is formed by a first differential gear unit and a second differential gear unit, each of which has three rotating elements which are, in order of rotation speed, a first rotating element, a second rotating element, and a third rotating element;

the first rotating element of the first differential gear unit is connected to the second rotating element of the second differential gear unit so that driving force is transmitted;

the second rotating element of the first differential gear unit is connected to the output member so that driving force is transmitted;

the first rotating element of the second differential gear unit is held to a non-rotating member;

the third rotating element of the second differential gear unit is connected to the second rotating electrical machine so that driving force is transmitted; and the hybrid drive system further includes a first engagement device that selectively connects the third rotating element of the first differential gear unit to the third rotating element of the second differential gear unit so that driving force is transmitted or disconnects the third rotating element of the first differential gear unit from the third rotating element of the second differential gear unit; a second engagement device that selectively connects the first rotating element of the first differential gear unit and the second rotating element of the second differential gear unit to the input member so that driving force is transmitted or disconnects the first rotating element of the first differential gear unit and the second rotating element of the second differential gear unit from the input member; and a third engagement device that selectively connects the first rotating element of the first differential gear unit to the third rotating element of the first differential gear unit so that driving force is transmitted or disconnects the first rotating element of the first differential gear unit from the third rotating element of the first differential gear unit.

17. The hybrid drive system according to claim 1, wherein the reduction gear is formed by a first differential gear unit and a second differential gear unit, each of which has three rotating elements which are, in order of rotation speed, a first rotating element, a second rotating element, and a third rotating element;

the first rotating element of the first differential gear unit is connected to the second rotating element of the second differential gear unit so that driving force is transmitted;

the second rotating element of the first differential gear unit is connected to the output member so that driving force is transmitted;

the first rotating element of the second differential gear unit is held to a non-rotating member;

the third rotating element of the second differential gear unit is connected to the second rotating electrical machine so that driving force is transmitted; and the hybrid drive system further includes a first engagement device that selectively connects the third rotating element of the first differential gear unit to the third rotating element of the second differential gear unit so that driving force is transmitted or disconnects the third rotating element of the first differential gear unit from the third rotating element of the second differential gear unit; a second engagement device that selectively connects the first rotating element of the first differential gear unit and the second rotating element of the second differential gear unit to the input member so that driving force is transmitted or disconnects the first rotating element of the first differential gear unit and the second rotating element of the second differential gear unit from the input member; and a third engagement device that holds or releases the third rotating element of the first differential gear unit to or from a non-rotating member.

18. The hybrid drive system according to claim 16, wherein the first differential gear unit is a single pinion type planetary gear set;

the first rotating element of the first differential gear unit is a ring gear, the second rotating element of the first differential gear unit is a carrier, and the third rotating element of the first differential gear unit is a sun gear;

the second differential gear unit is a single pinion type planetary gear unit; and the first rotating element of the second differential gear unit is a ring gear, the second rotating element of the second differential gear unit is a carrier, and the third rotating element of the second differential gear unit is a sun gear.

19. The hybrid drive system according to claim 2, wherein the control portion selects a parallel mode that transmits the rotation of the first output rotating element of the reduction gear to the output member, and transmits the rotation of the second output rotating element to the input rotating element of the power split device.

20. The hybrid drive system according to claim 2, wherein
the control portion selects a third split mode wherein third rotation of the input rotating element of the reduction gear is transmitted to the output member via the first output rotating element of the reduction gear and is slower than the first rotation.

21. The hybrid drive system according to claim 2, wherein
the reduction gear is a differential gear unit that includes four rotating elements which are, in order of rotation speed, a first rotating element, a second rotating element, a third rotating element, and
a fourth rotating element; the first rotating element is held to a non-rotating member;
the second rotating element is the second output rotating element;
the third rotating element is the first output rotating element;
the fourth rotating element is connected to the second rotating electrical machine so that driving force is transmitted; and
the hybrid drive system further includes a first engagement device that selectively connects the first output rotating element to the output member so that driving force is transmitted or disconnects the first output rotating element from the output member; and a second engagement device that selectively connects the second output rotating element to the input rotating element of the power split device so that driving force is transmitted or disconnects the second output rotating element from the input rotating element of the power split device.

22. The hybrid drive system according to claim 2, wherein
the reduction gear is formed by a first differential gear unit and a second differential gear unit, each of which has three rotating elements which are, in order of rotation speed, a first rotating element, a second rotating element, and a third rotating element;
the third rotating element of the first differential gear unit is connected to the second rotating electrical machine so that driving force is transmitted;
the second rotating element of the first differential gear unit is connected to the output member so that driving force is transmitted;
the third rotating element of the second differential gear unit is connected to the second rotating electrical machine so that driving force is transmitted;
the second rotating element of the second differential gear unit is connected to the input member so that driving force is transmitted; and
the hybrid drive system further includes a first engagement element that holds or releases the first rotating element of the first differential gear unit to or from a non-rotating member; and a second engagement device that holds or releases the first rotating element of the second differential gear unit to or from a non-rotating member.

23. The hybrid drive system according to claim 2, wherein
the reduction gear is formed by a first differential gear unit and a second differential gear unit, each of which has three rotating elements which are, in order of rotation speed, a first rotating element, a second rotating element, and a third rotating element;
the second rotating element of the first differential gear unit is connected to the second rotating element of the second differential gear unit so that driving force is transmitted;
the third rotating element of the first differential gear unit is connected to the output member so that driving force is transmitted;
the first rotating element of the second differential gear unit is held to a non-rotating member;
the third rotating element of the second differential gear unit is connected to the second rotating electrical machine so that driving force is transmitted; and
the hybrid drive system further includes a first engagement device that holds or releases the first rotating element of the first differential gear unit to or from a non-rotating member; a second engagement device that selectively connects the second rotating element of the first differential gear unit and the second rotating element of the second differential gear unit to the input member so that driving force is transmitted or disconnects the second rotating element of the first differential gear unit and the second rotating element of the second differential gear unit from the input member; and a third engagement device that selectively connects the first rotating element of the first differential gear unit to the output member so that driving force is transmitted or disconnects the first rotating element of the first differential gear unit from the output member.

24. The hybrid drive system according to claim 3, wherein
the control portion selects a parallel mode that transmits the rotation of the first output rotating element of the reduction gear to the output member, and transmits the rotation of the second output rotating element to the input rotating element of the power split device.

25. The hybrid drive system according to claim 3, wherein
the control portion selects a third split mode wherein third rotation of the input rotating element of the reduction gear is transmitted to the output member via the first output rotating element of the reduction gear and is slower than the first rotation.

26. The hybrid drive system according to claim 3, wherein
the reduction gear is a differential gear unit that includes four rotating elements which are, in order of rotation speed, a first rotating element, a second rotating element, a third rotating element, and
a fourth rotating element; the first rotating element is held to a non-rotating member;
the second rotating element is the second output rotating element;
the third rotating element is the first output rotating element;
the fourth rotating element is connected to the second rotating electrical machine so that driving force is transmitted; and
the hybrid drive system further includes a first engagement device that selectively connects the first output rotating element to the output member so that driving force is transmitted or disconnects the first output rotating element from the output member; and a second engagement device that selectively connects the second output rotating element to the input rotating element of the power split device so that driving force is transmitted or disconnects the second output rotating element from the input rotating element of the power split device.

27. The hybrid drive system according to claim 3, wherein
the reduction gear is formed by a first differential gear unit and a second differential gear unit, each of which has three rotating elements which are, in order of rotation speed, a first rotating element, a second rotating element, and a third rotating element;
the third rotating element of the first differential gear unit is connected to the second rotating electrical machine so that driving force is transmitted;

the second rotating element of the first differential gear unit is connected to the output member so that driving force is transmitted;
the third rotating element of the second differential gear unit is connected to the second rotating electrical machine so that driving force is transmitted;
the second rotating element of the second differential gear unit is connected to the input member so that driving force is transmitted; and
the hybrid drive system further includes a first engagement element that holds or releases the first rotating element of the first differential gear unit to or from a non-rotating member; and a second engagement device that holds or releases the first rotating element of the second differential gear unit to or from a non-rotating member.

28. The hybrid drive system according to claim 3, wherein
the reduction gear is formed by a first differential gear unit that includes four rotating elements which are, in order of rotation speed, a first rotating element, a second rotating element, a third rotating element, and a fourth rotating element, and a second differential gear unit that includes three rotating elements which are, in order of rotation speed, a first rotating element, a second rotating element, and a third rotating element;
the third rotating element of the first differential gear unit is connected to the output member so that driving force is transmitted;
the fourth rotating element of the first differential gear unit is connected to the second rotating electrical machine so that driving force is transmitted;
the second rotating element of the second differential gear unit is connected to the input member so that driving force is transmitted;
the third rotating element of the second differential gear unit is connected to the second rotating electrical machine so that driving force is transmitted; and
the hybrid drive system further includes a first engagement device that holds or releases the first rotating element of the first differential gear unit to or from a non-rotating member; a second engagement device that holds or releases the first rotating element of the second differential gear unit to or from a non-rotating member; and a third engagement device that holds or releases the second rotating element of the first differential gear unit to or from a non-rotating member.

29. The hybrid drive system according to claim 3, wherein
the reduction gear is formed by a first differential gear unit and a second differential gear unit, each of which has three rotating elements which are, in order of rotation speed, a first rotating element, a second rotating element, and a third rotating element;
the second rotating element of the first differential gear unit is connected to the second rotating element of the second differential gear unit so that driving force is transmitted;
the third rotating element of the first differential gear unit is connected to the output member so that driving force is transmitted;
the first rotating element of the second differential gear unit is held to a non-rotating member;
the third rotating element of the second differential gear unit is connected to the second rotating electrical machine so that driving force is transmitted; and
the hybrid drive system further includes a first engagement device that holds or releases the first rotating element of the first differential gear unit to or from a non-rotating member; a second engagement device that selectively connects the second rotating element of the first differential gear unit and the second rotating element of the second differential gear unit to the input member so that driving force is transmitted or disconnects the second rotating element of the first differential gear unit and the second rotating element of the second differential gear unit from the input member; and a third engagement device that selectively connects the first rotating element of the first differential gear unit to the output member so that driving force is transmitted or disconnects the first rotating element of the first differential gear unit from the output member.

30. The hybrid drive system according to claim 3, wherein
the reduction gear is formed by a first differential gear unit and a second differential gear unit, each of which has three rotating elements which are, in order of rotation speed, a first rotating element, a second rotating element, and a third rotating element;
the first rotating element of the first differential gear unit is connected to the second rotating element of the second differential gear unit so that driving force is transmitted;
the second rotating element of the first differential gear unit is connected to the output member so that driving force is transmitted;
the first rotating element of the second differential gear unit is held to a non-rotating member;
the third rotating element of the second differential gear unit is connected to the second rotating electrical machine so that driving force is transmitted; and
the hybrid drive system further includes a first engagement device that selectively connects the third rotating element of the first differential gear unit to the third rotating element of the second differential gear unit so that driving force is transmitted or disconnects the third rotating element of the first differential gear unit from the third rotating element of the second differential gear unit; a second engagement device that selectively connects the first rotating element of the first differential gear unit and the second rotating element of the second differential gear unit to the input member so that driving force is transmitted or disconnects the first rotating element of the first differential gear unit and the second rotating element of the second differential gear unit from the input member; and a third engagement device that selectively connects the first rotating element of the first differential gear unit to the third rotating element of the first differential gear unit so that driving force is transmitted or disconnects the first rotating element of the first differential gear unit from the third rotating element of the first differential gear unit.

31. The hybrid drive system according to claim 2, further comprising:
a first split mode engagement device that is engaged to realize the first split mode; and
a second split mode engagement device that is engaged to realize the second split mode.

32. The hybrid drive system according to claim 31, wherein
the switch from the first split mode into the second split mode is performed by engaging the second split mode engagement device when the rotation speeds of engagement members on both sides of the second split mode engagement device are the same; and
the switch from the second split mode into the first split mode is performed by engaging the first split mode engagement device when the rotation speeds of engagement members on both sides of the first split mode engagement device are the same.

33. The hybrid drive system according to claim 4, wherein at least the second split mode engagement device is a mesh type engagement device wherein engaging members on both sides of the second split mode engagement device are meshed with each other.

34. The hybrid drive system according to claim 1, wherein the second split mode is selected in a range where the rotation speed of the output member is high as compared to the first split mode.

35. The hybrid drive system according to claim 1, wherein:
in the first split mode, the first rotating electrical machine generates reaction force against driving force transmitted from the engine to the input member while generating electric power, and at least a state where the second rotating electrical machine performs an auxiliary operation for diving force transmitted from the output rotating element of the power split device to the output member is included, and
in the second split mode, the first rotating electrical machine generates reaction force against driving force transmitted from the engine to the input member while performing powering, and at least a state where the second rotating electrical machine generates electric power by driving force transmitted from the input member to the second rotating electrical machine is included.

36. The hybrid drive system according to claim 1, comprising:
a constitution that the first output rotating element and the output rotating element of the power split device are connected so as to rotate together with each other, or the first output rotating element and the output rotating element of the power split device are selectively connected so as to rotate together with each other, and
a constitution that the second output rotating element and the input rotating element of the power split device are connected so as to rotate together with each other, or the second output rotating element and the input rotating element of the power split device are selectively connected so as to rotate together with each other.

* * * * *